INVENTORS: H. R. BANKS
G. R. SORENSON
H. J. WALSH
J. G. WALSH
BY [signature]
ATTORNEY April 9, 1968 H. R. BANKS ETAL 3,377,434

SWITCHING LINK

Filed Oct. 8, 1964 55 Sheets-Sheet 2

April 9, 1968 H. R. BANKS ETAL 3,377,434

SWITCHING LINK

Filed Oct. 8, 1964 55 Sheets-Sheet 4

April 9, 1968 H. R. BANKS ETAL 3,377,434

SWITCHING LINK

Filed Oct. 8, 1964 55 Sheets-Sheet 5

April 9, 1968 H. R. BANKS ETAL 3,377,434

SWITCHING LINK

Filed Oct. 8, 1964

55 Sheets-Sheet 9

April 9, 1968

H. R. BANKS ET AL

SWITCHING LINK 3,377,434

Filed Oct. 8, 1964

55 Sheets-Sheet 10

April 9, 1968 H. R. BANKS ET AL 3,377,434

SWITCHING LINK

Filed Oct. 6, 1964 55 Sheets-Sheet 11

April 9, 1968 H. R. BANKS ETAL 3,377,434

SWITCHING LINK

Filed Oct. 8, 1964 55 Sheets-Sheet 12

April 9, 1968 H. R. BANKS ETAL 3,377,434

SWITCHING LINK

Filed Oct. 8, 1964 55 Sheets-Sheet 13

April 9, 1968 H. R. BANKS ET AL 3,377,434

SWITCHING LINK

Filed Oct. 8, 1964

55 Sheets-Sheet 17

April 9, 1968 H. R. BANKS ET AL 3,377,434

SWITCHING LINK

Filed Oct. 6, 1964

55 Sheets-Sheet 27

April 9, 1968 H. R. BANKS ETAL 3,377,434

SWITCHING LINK

Filed Oct. 5, 1964

55 Sheets-Sheet 28

April 9, 1968 H. R. BANKS ET AL 3,377,434

SWITCHING LINK

Filed Oct. 5, 1964 55 Sheets-Sheet 29

POSITION CALLING

April 9, 1968 H. R. BANKS ETAL 3,377,434

SWITCHING LINK

Filed Oct. 8, 1964

55 Sheets-Sheet 32

April 9, 1968 H. R. BANKS ETAL 3,377,434

SWITCHING LINK

Filed Oct. 6, 1964

55 Sheets-Sheet 39

April 9, 1968

H. R. BANKS ETAL 3,377,434

SWITCHING LINK

Filed Oct. 8, 1964

55 Sheets-Sheet 45

April 9, 1968 H. R. BANKS ET AL 3,377,434

SWITCHING LINK

Filed Oct. 8, 1964 55 Sheets-Sheet 48

SWITCHING LINK

Filed Oct. 8, 1964

April 9, 1968 H. R. BANKS ET AL 3,377,434

SWITCHING LINK

Filed Oct. 8, 1964 55 Sheets-Sheet 52

April 9, 1968 H. R. BANKS ETAL 3,377,434

SWITCHING LINK

Filed Oct. 8, 1964 55 Sheets-Sheet 54

POSITION PREFERENCE

United States Patent Office 3,377,434
Patented Apr. 9, 1968

3,377,434

SWITCHING LINK

Harry R. Banks, Neptune, N.J., Gerald R. Sorenson, Royal Oak, Mich., and Henry J. Walsh, New Monmouth, and John G. Walsh, Middletown, N.J., assignors to Bell Telephone Laboratories, Incorporated, New York, N.Y., a corporation of New York Filed Oct. 8, 1964, Ser. No. 402,531
19 Claims. (Cl. 179—27)

ABSTRACT OF THE DISCLOSURE

A private branch exchange is provided with crossbar switch linkage and control circuitry whereby full two-way access is afforded between fifty trunks and three attendant consoles. Each console telephone circuit has access by means of keys to six lines corresponding to six verticals of the switch array. Each trunk corresponds to a horizontal of the array. A pair of select magnet control circuits and a pair of hold magnet control circuits are provided. A calling trunk uses one control circuit from each pair to select an idle attendant line in an available console and to operate the calling trunk select magnet and the idle line hold magnet. A calling line uses the other control circuit from each pair to select an idle trunk and to operate the idle trunk select magnet and the calling line hold magnet. Traffic regulating circuitry allows only one calling trunk or calling line at a time to use the magnet control circuits. The consoles are arranged for the usual private branch exchange functions such as night connections, busy verification, call holding, circuit splitting, audible signaling, exclusion, and the like.

This invention relates generally to switching arrangements, more particularly to switching links for interconnecting circuits terminating therein and specifically to control circuitry for regulating traffic through such links.

The present invention, while not necessarily so limited in scope, finds particular utility in private branch exchange (PBX) telephone switching systems as a two-way, single-stage concentrating type of switching link for interconnecting trunk circuits with PBX attendant equipments. The invention contemplates switching link apparatus, such as a crossbar switch structure; two sets of lines, such as trunks and attendant or operator lines, terminating in the link; and, control or regulating circuitry for permitting and regulating two-way traffic through the switching link; whereby, a calling trunk may effect a connection through the link to an idle operator line and whereby a calling operator line may effect a connection through the link to an idle trunk, either without interference with the other.

One object of the present invention is to permit and to regulate two-way traffic through a single-stage switching link between trunks and operator lines.

A feature of the invention whereby the foregoing object is attained is link control means (a) controlled by a calling trunk to interconnect the calling trunk with an idle available line as a called line and (b) controlled by a calling line to interconnect the calling line with an idle available trunk, with the provision of regulating means for permitting the control means to be controlled by only one calling trunk or line at a time.

A further aspect of the foregoing feature is the provision of terminating and originating portions of the control means and a portion common thereto for effecting the respective termination connections of calling trunks to idle operator lines and origination connections of calling operator lines to idle trunks, where the regulating means establishes a preference between the terminating and originating portions as to the use of the common portion.

A still further aspect of the foregoing features is the provision of relatively few operator or attendant equipments, each connectable under the control of an operator to one of several operator lines individual to each equipment, whereby the control means can terminate a calling trunk at, or connect an idle trunk to any one of the several lines spread among the operator equipments.

A still further aspect of the foregoing features is means in the common portion of the control means for selectively operating the switching apparatus according to a trunk and a line which have been designated for interconnection, means in the terminating portion of the control means for designating a calling trunk and for selecting and designating an idle operator line at an idle operator equipment, and means in the originating portion of the control means for designating a calling operator line and for selecting and designating an idle trunk.

Another object of the invention is to permit and to regulate two-way traffic through a switching link between two sets of lines terminating therein, where the link is not necessarily a single-stage link.

A feature of the invention whereby the immediately foregoing object is attained is the provision of control means for operating the link, two gate circuits for allowing one calling line at a time from the two sets of lines to seize control, two selecting circuits for selecting an idle line in the other set of lines, and regulating means for enabling only one gate circuit and one selecting circuit at a time.

A further aspect of the immediately foregoing feature is a preference circuit for each gate circuit whereby only one line at a time can control the gate circuit, and a preference circuit for the regulating means whereby only one line at a time can control the enabling of a pair of gate and selecting circuits.

The foregoing features of the invention are embodied in the exemplary disclosure of a two-way, single-stage, crossbar switching link for interconnecting trunk circuits with attendant lines in a PBX. The link consists in effect of a single, large crossbar switch array of ten switches wherein two sets of five switches are arranged (a) so that their fifty horizontals are substantially in multiple providing fifty horizontal terminations and (b) so that their eighteen (two are not used) verticals are substantially in multiple providing eighteen vertical terminations. There are fifty trunks associated with the fifty horizontal terminations and eighteen operator or attendant lines or loops associated with the eighteen vertical terminations.

The eighteen loops are divided into three groups of six, each group appearing before one of the attendant consoles. By a key operation, an attendant can connect her telephone circuit with any one of her six loops. As is well known, a connection can be established through the crossbar switch array between a trunk and a loop by the operation of a select magnet (corresponding to a horizontal) followed by the operation of a hold magnet (corresponding to a vertical). Two select magnet circuits are provided and two hold magnet circuits are provided. One select magnet operating circuit is used to operate a select magnet for one of a number of calling trunks and one hold magnet operating circuit is used to select an idle console and an idle attendant loop therein as a called loop. The other hold magnet operating circuit is used to identify one of the eighteen attendant loops as a calling loop and the other select magnet operating circuit is used to select an idle trunk as a called trunk. The common control for the link regulates the inward (trunk to operator loop) and outward (operator loop to trunk) traffic so as to choose the proper pair of select magnet and hold magnet operating circuits depending on the direction of traffic.

The exemplary embodiment is shown in the drawings, briefly described as follows.

INTRODUCTORY MATTER

Figure 1A:
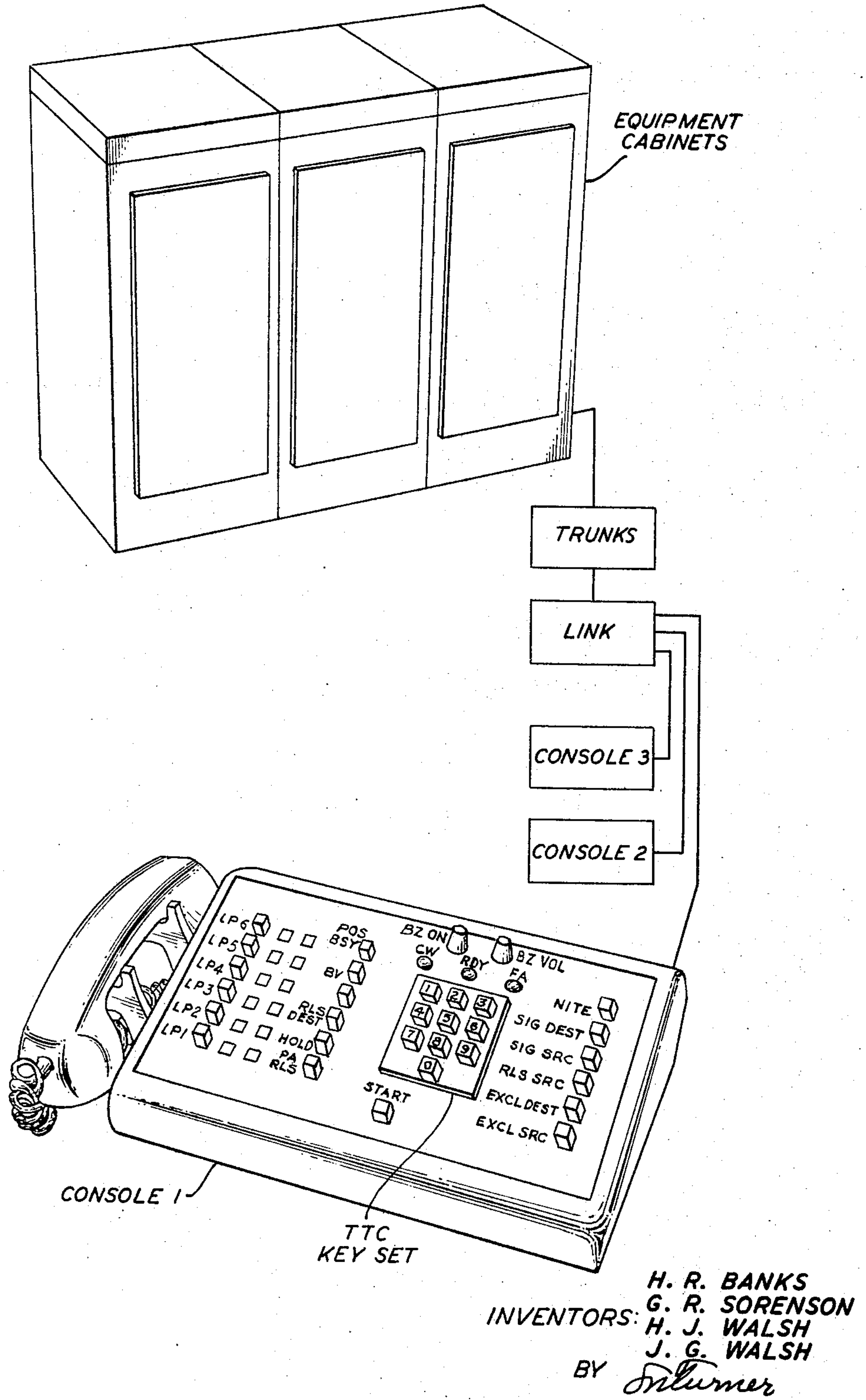
FIG. 1A is a general perspective showing the PBX equipment cabinets, trunks, the attendant consoles, and the link interconnecting the trunks and the consoles.

Before proceeding with any degree of detailed or general description it seems advisable to present explanations for certain conventions or symbols employed in the circuit showing. Immediately below are presented explanations for such conventions as the detached contact type of disclosure, the symbols for battery and ground potentials, the use of dotted lines, the type of presentation used to indicate a crossbar switch crosspoint, double box circuits, single box circuits, and cabled contacts.

The detached contact type of detailed circuit showing used in this description is characterized by the showing of a relay winding physically disassociated, for the most part, from the contacts controlled thereby. For instance, in FIG. 23, which depicts certain details of an Attendant (ATT) Trunk Circuit, the energizing winding for relay AS0 is shown in one part of the figure and contacts controlled by this relay AS0 are located elsewhere on the drawing but are similarly designated AS0 with small numerals such as 1, 2, 3. Contact No. 1 of relay AS0 is represented by a short, single line across the circuit, thus indicating a break or back contact of relay AS0 which is well known in the art as a contact which is normally closed when the relay is unoperated and which is opened when the relay is operated. Contacts 2 of relay AS0 are shown on the drawing as a make-break-transfer pair. One contact 2 of relay AS0 is shown as an X across the circuit line, thereby designating a make or front contact which is a contact that is open when the relay is unoperated and which is closed when the relay is operated. The other contact 2 of relay AS0 is a break contact. Contact 3 of relay AS0 is so designated and is an X appearing across the circuit line thereby depicting a make or front contact. The following tables, 1, 2, and 3, list in alphabetical order with their functional designations all of the relays of the link circuit, the trunk circuits and the position circuits, with the figure number indicated whereupon that relay winding occurs.

TABLE 1.—LOOP CIRCUIT RELAYS

| Desg. | Fig. | Function |
|---|---|---|
| BT1 | 26 | Position 1—Busy Tone. |
| BT2 | 27 | Postion 2—Busy Tone. |
| BT3 | 27 | Position 3—Busy Tone. |
| CST | 10 | Call Start. |
| CTR | 24 | Call Waiting Transfer. |
| DEL | 11 | Delay. |
| DELA | 10 | Delay Auxillary. |
| DO1 | 25 | Position 1—Dial Out. |
| DO2 | 25 | Position 2—Dial Out. |
| DO3 | 25 | Position 3—Dial Out. |
| DOA | 10 | Dial Out Auxiliary. |
| DOGT | 10 | Dial Out Gate. |
| DS0-7 | 8 | Dial Select. |
| END1 | 12 | Position 1—End Pick Up. |
| END2 | 13 | Position 2—End Pick Up. |
| END3 | 14 | Position 3—End Pick Up. |
| GP0 | 2 | Trunk Group 0. |
| GP1 | 3 | Trunk Group 1. |
| GP2 | 3 | Trunk Group 2. |
| GP3 | 4 | Trunk Group 3. |
| GP4 | 4 | Trunk Group 4. |
| GT | 11 | Gate. |
| GTA | 9 | Gate Auxiliary. |
| GTB | 9 | Do. |
| HMA00-09 | 40 | A0 Switch—Hold Magnets. |
| HMA10-19 | 39 | A1 Switch—Hold Magnets. |
| HMA20—29 | 39 | A2 Switch—Hold Magnets. |
| HMA30-39 | 38 | A3 Switch—Hold Magnets. |
| HMA40-49 | 38 | A4 Switch—Hold Magnets. |
| HMB00-07 | 40 | B0 Switch—Hold Magnets. |
| HMB10-17 | 39 | B1 Switch—Hold Magnets. |
| HMB20-27 | 39 | B2 Switch—Hold Magnets. |
| HMB30-37 | 38 | B3 Switch—Hold Magnets. |
| HMB40-47 | 38 | B4 Switch—Hold Magnets. |
| LHA1-6 | 12 | Position 1—Loop Hold. |
| LHB1-6 | 13 | Position 2—Loop Hold. |
| LHC1-6 | 14 | Position 3—Loop Hold. |
| NS8-49 | 28-31 | Night Service—Trunks 0 to 49. |
| NSC | 11 | Night Service Control. |
| PP1 | 52 | Position 1—Preference. |
| PP2 | 52 | Position 2—Preference. |
| PP3 | 52 | Position 3—Preference. |
| PPC | 52 | Position Preference Control. |
| PRL1 | 52 | Position 1—Release. |
| PRL2 | 53 | Position 2—Release. |
| PRL3 | 53 | Position 3—Release. |
| PSAA1-6 | 12 | Postion 1—Select. |
| PSAB1-6 | 13 | Position 2—Select. |
| PSAC1-6 | 14 | Position 3—Select. |
| PUA1-6 | 12 | Position 1—Pick Up. |
| PUB1-6 | 13 | Position 2—Pick Up. |
| PUC1-6 | 14 | Position 3—Pick Up. |
| SMA00-09 | 5 & 6 | A0 Switch—Select Magnets. |
| SMA10-19 | 6 | A1 Switch—Select Magnets. |
| SMA20-29 | 6 | A2 Switch_Select Magnets. |
| SMA30-39 | 7 | A3 Switch—Select Magnets. |
| SMA40-49 | 7 | A4 Switch—Select Magnets. |
| SMB00-09 | 5 & 6 | B0 Switch—Select Magnets. |
| SMB10-19 | 6 | B1 Switch—Select Magnets. |
| SMB20-29 | 6 | B2 Switch—Select Magnets. |
| SMB30-39 | 7 | B3 Switch—Select Magnets. |
| SMB40-49 | 7 | B4 Switch—Select Magnets. |
| STA1-6 | 12 | Position 1—Step. |
| STB1-6 | 13 | Position 2—Step. |
| STC1-6 | 14 | Position 3—Step. |
| TA0-9 | 32 & 31 | Trunk Attach—Trunks 0 to 9. |
| TA10-19 | 31 & 30 | Trunk Attach—Trunks 10 to 19. |
| TA20-29 | 30 & 29 | Trunk Attach—Trunks 20 to 29. |
| TA30-39 | 29 | Trunk Attach—Trunks 30 to 39. |
| TA40-49 | 28 | Trunk Attach—Trunks 40 to 49. |
| TKA | 9 | Trunk Auxiliary. |
| TP0-9 | 2 | Trunk Preference—Trunks 0 to 9. |
| TP10-29 | 3 | Trunk Preference—Trunks 10 to 29. |
| TP30-49 | 4 | Trunk Preference—Trunks 30 to 49. |
| TR | 24 | Transfer. |
| W, Z | 10 | Sequence. |

TABLE 2.—TRUNK CIRCUIT RELAYS

| Desg. | Fig. | Attendant Trunk Function (Trunk No. 0) |
|---|---|---|
| AC0 | 23 | Position Connect. |
| AC10 | 23 | Position Connect Auxiliary. |
| ACA10 | 23 | Position 1—Connector. |
| ACA20 | 23 | Position 2—Connector. |
| ACA30 | 23 | Position 3—Connector. |
| AS0 | 23 | Source Supervisory. |
| BS0 | 23 | Do. |
| FFS0 | 23 | Fast Flash Source. |
| HD0 | 23 | Hold. |
| IN0 | 23 | Incoming Seizure. |
| MCS0 | 23 | Marker Connect Source. |
| MCSA0 | 23 | Marker Connect Source Auxiliary. |
| | | Central Office Trunk Functions (Trunk No. 8) |
| AC8 | 21 | Position Connect. |
| AC18 | 21 | Do. |
| ACA18 | 21 | Position 1—Connector. |
| ACA28 | 21 | Position 2—Connector. |
| ACA38 | 21 | Position 3—Connector. |
| DR8 | 21 | Delay Ringing. |
| FF8 | 21 | Fast Flash. |
| FFA8 | 21 | Fast Flash Auxiliary. |
| HD8 | 21 | Hold. |
| N8 | 21 | Night Connection. |
| N18 | 21 | Night Connection Auxiliary. |
| R18 | 21 | Ringing. |
| RSA8 | 21 | Ring Start Auxiliary. |
| RTA8 | 21 | Ringing Trip Auxiliary. |
| S18 | 21 | Supervisory. |
| | | Tie Trunk Functions (Trunk No. 20) |
| AC20 | 18 | Position Connect. |
| AC120 | 18 | Do. |
| ACA120 | 18 | Position 1—Connector. |
| ACA220 | 18 | Position 2—Connector. |
| ACA320 | 18 | Position 3—Connector. |
| FF20 | 18 | Flash. |
| FFA20 | 18 | Flash Auxiliary. |
| HD20 | 18 | Hold. |
| R120 | 18 | Ringing Lock. |
| RTA20 | 18 | Ring Trip Auxiliary. |
| S120 | 18 | Supervisory. |
| | | Direct Inward Dial Trunk Functions (Trunk No. 49) |
| AC49 | 15 | Position Connect. |
| AC149 | 15 | Position Connect Auxiliary. |
| ACA149 | 15 | Position 1—Connector. |
| ACA249 | 15 | Position 2—Connector. |
| ACA349 | 15 | Position 3—Connector. |
| CO49 | 15 | Continuity. |
| D49 | 15 | Disconnect. |
| F49 | 15 | Flash. |
| FF49 | 15 | Do. |
| FF149 | 15 | Do. |
| HLD49 | 15 | Hold. |
| OPA49 | 15 | Operator. |
| OPR49 | 15 | Do. |

TABLE 3.—POSITION CIRCUIT RELAYS

| Desg. | Fig. | Function (Positions 1, 2 and 3) |
|---|---|---|
| ACL1, 2 | 43, 48 | Alternating Current Lamp Supply. |
| AS1, 2 | 45, 46 | Audible Signal. |
| EXS1, 2 | 43, 47 | Exclude Source. |
| EXD1, 2 | 43, 48 | Exclude Destination. |
| HD1, 2 | 42, 47 | Hold. |
| HD11, 22 | 42, 47 | Hold Auxiliary. |
| ON1, 2 | 41, 46 | Off Normal. |
| ON11, 22 | 41, 46 | Do. |
| PA1, 2 | 41, 46 | Position. |
| PA11, 22 | 41, 46 | Do. |
| PB1, 2 | 44, 48 | Position Busy. |
| RA1, 2 | 42, 47 | Register Attached. |
| RD1, 2 | 42, 47 | Release Destination. |
| RLS1, 2 | 42, 47 | Release. |
| RS1, 2 | 42, 47 | Release Source. |
| SIGD1, 2 | 45, 49 | Signal to Destination. |
| SIGS1, 2 | 45, 49 | Signal to Source. |
| ST1, 2 | 45, 47 | Start. |
| TR1, 2, 3 | 42, 46, 50 | Transmission. |
| | | Function (Position 1 Only) |
| N1 | 45 | Night. |
| NA1 | 45 | Night Auxiliary. |
| NS1 | 45 | Night Start. |

Energizing potentials for the circuit operation are generally indicated by a ground symbol or a circle with a plus or a minus inside the circle, indicating the positive or negative terminal of a direct-current source of energy (48 volts unless otherwise indicated). Wherever such direct-current source terminal is shown, it is understood, unless otherwise indicated, that the opposite terminal is grounded.

In certain cases in the detailed disclosure dotted lines are used to indicate the omission of a part or parts of certain circuits where the structural components that are missing are not particularly significant. For instance in FIG. 21, which depicts certain details of a Central Office trunk circuit, a dotted line is shown interconnecting break contact 3 of relay AC8 and make contact 1 of relay R8 in the operating circuit for relay R18. This dotted line indicates that there is other circuitry involved between these two contacts but it is not of particular significance with respect to the point under consideration.

Figure 2:
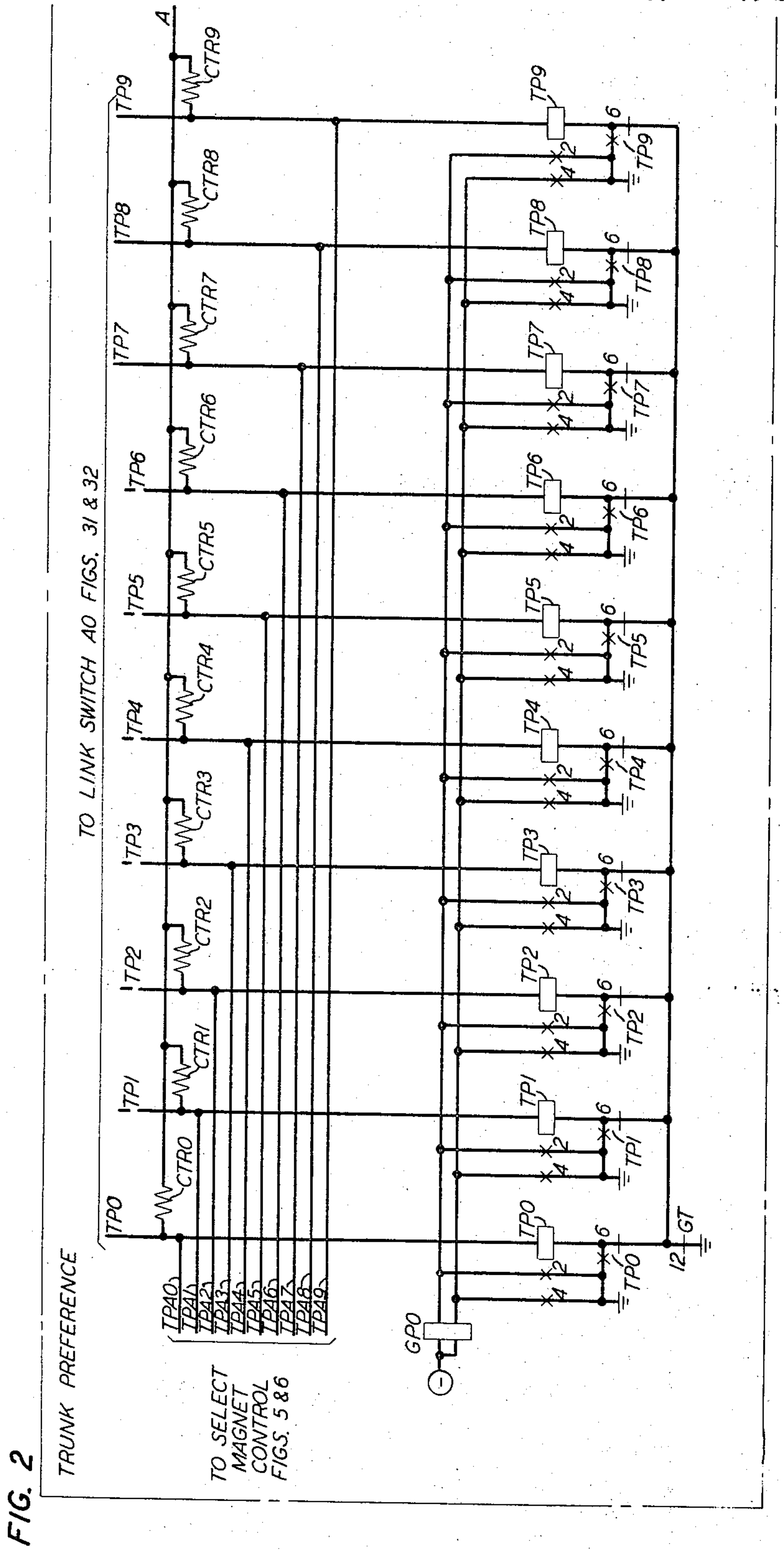
FIGS. 2 through 53, arranged as shown generally in FIG. 1D, disclose the link arrangement in detail, along with fifty trunks and three consoles, a detailed description being provided hereinafter of the various portions of this drawing layout.
Figure 3:
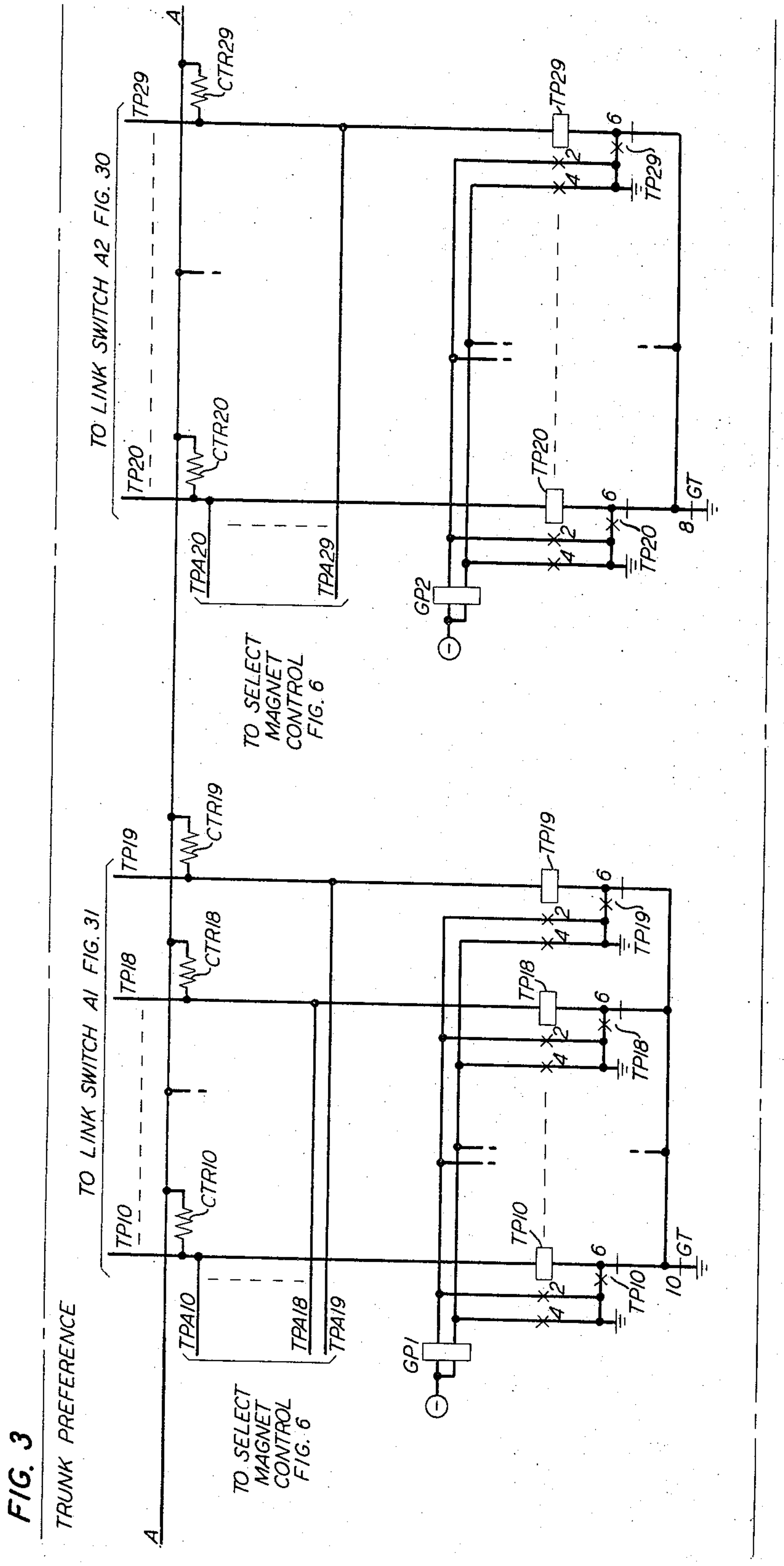

In a number of places in the detailed showing dotted lines are used to indicate circuits which have been omitted because the detailed showing of these circuits is unnecessary since they are substantially duplicates of circuits shown in other places. For instance in FIGS. 2 and 3 showing parts of the trunk preference circuitry, leads TPA11 through TPA17 extending from FIG. 3 into the select magnet control circuit of FIG. 6 have been indicated by dotted lines because the structure of this particular circuit is the same as the corresponding conductors of FIG. 2 such as conductors TPA1 through TPA7.

Figure 31:
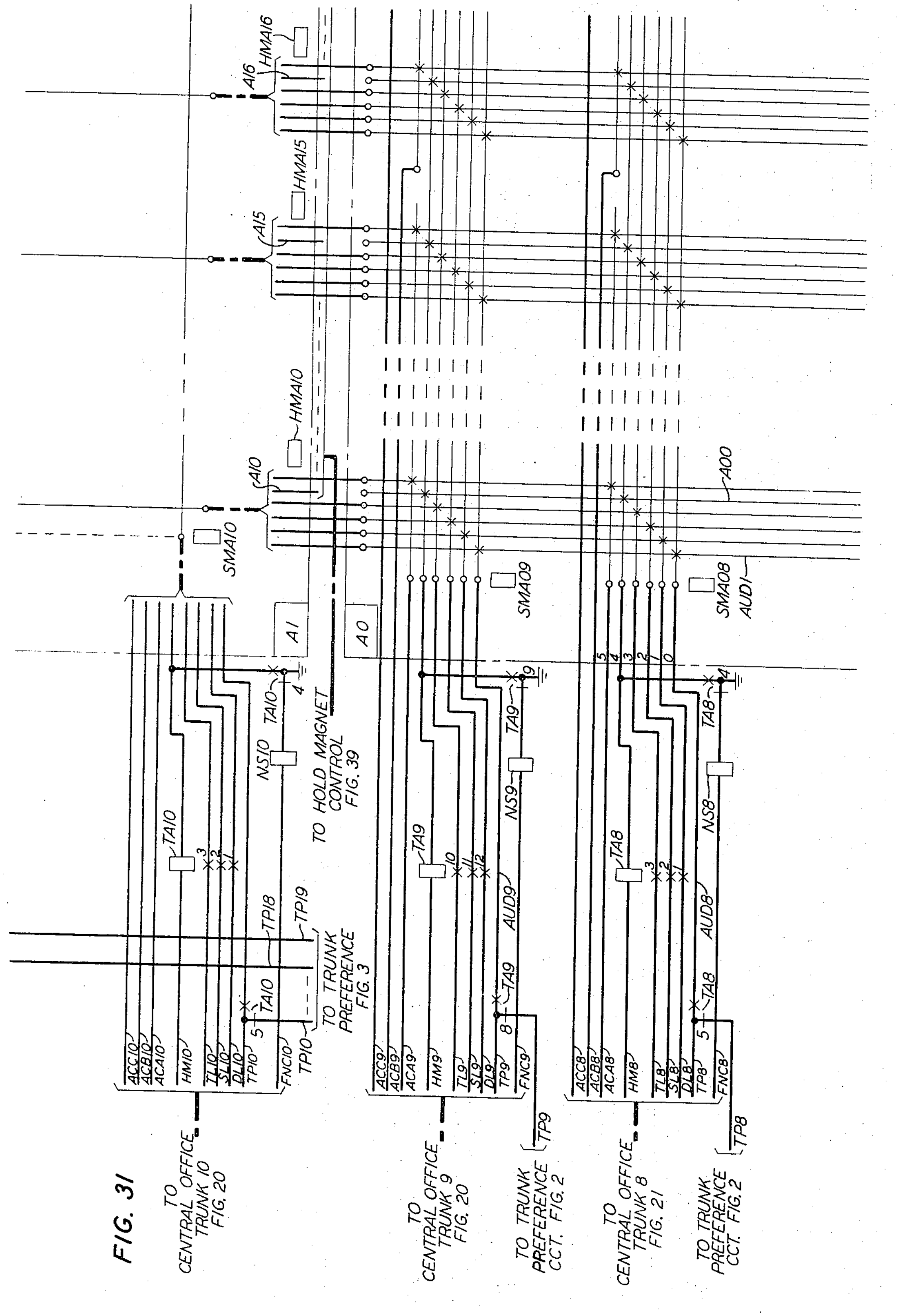
Figure 32:
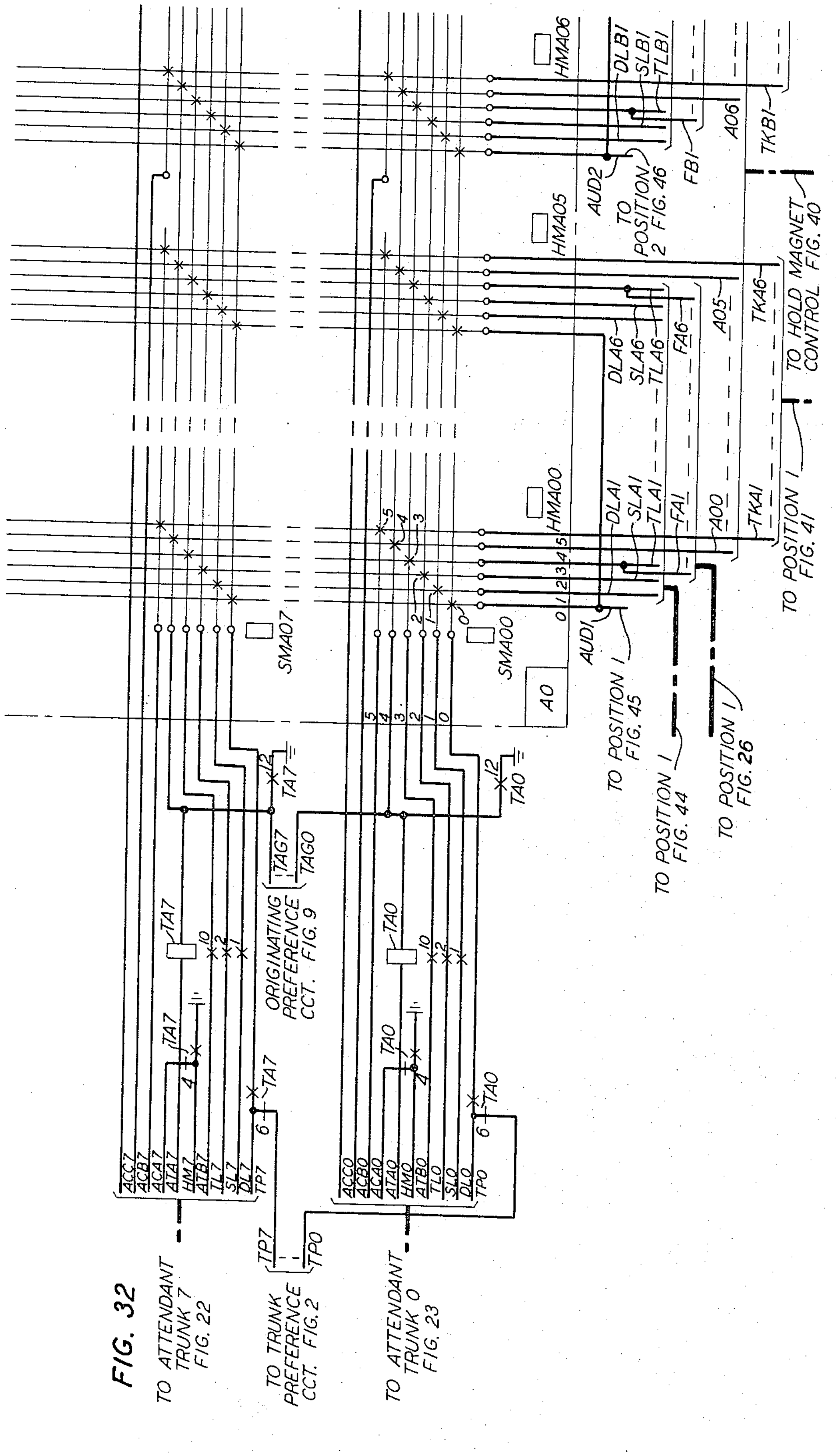
Figure 33:
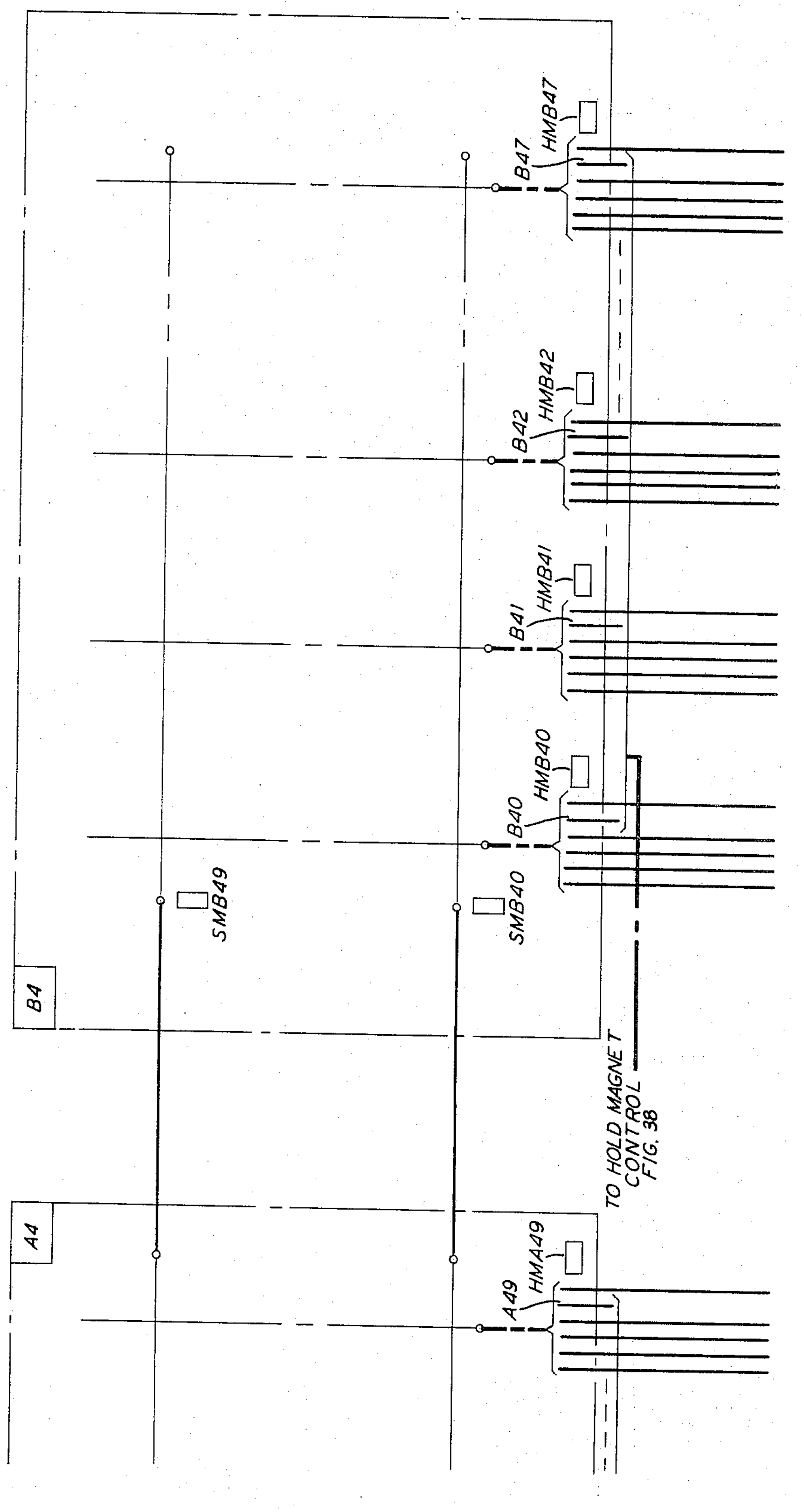
Figure 34:
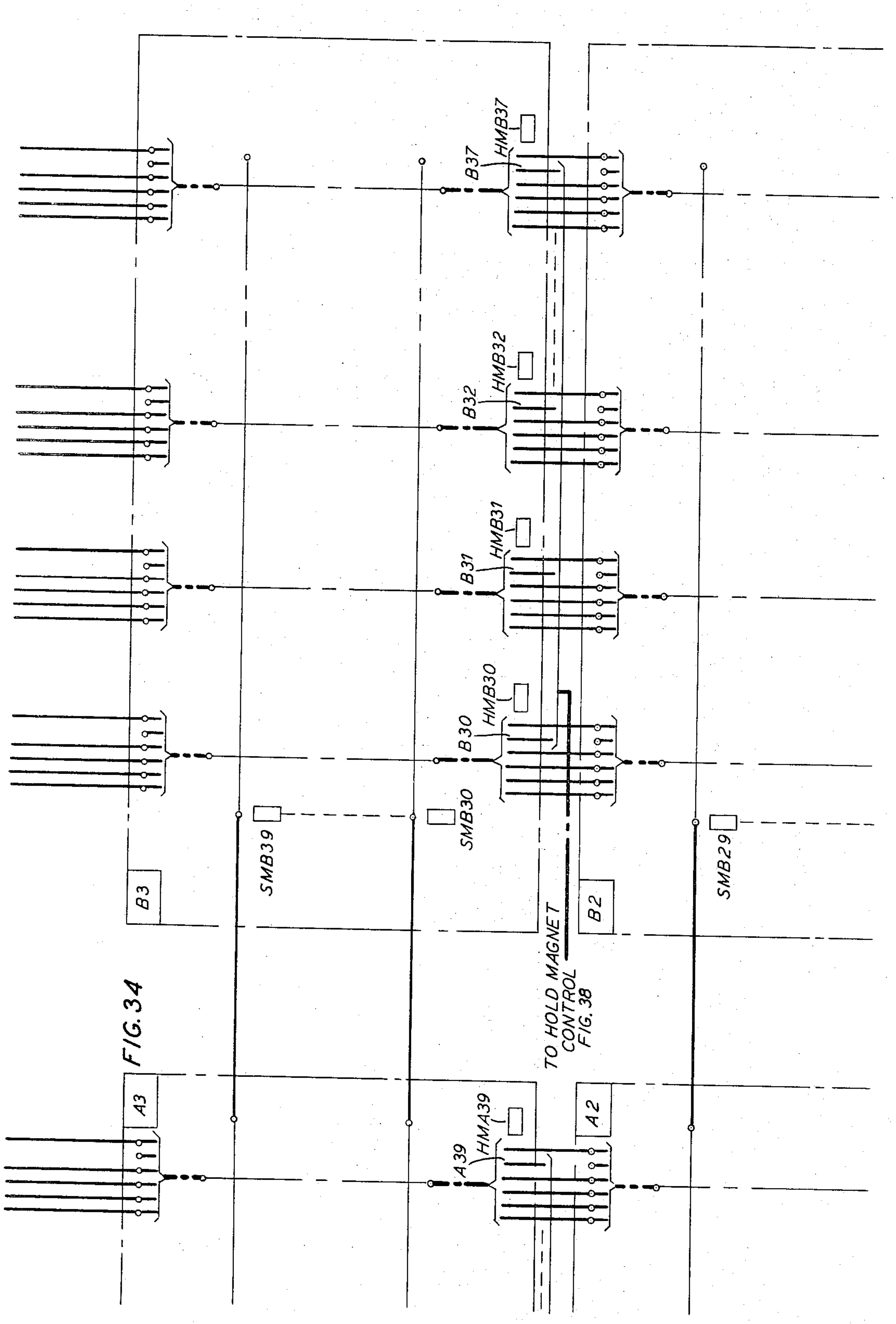
Figure 35:
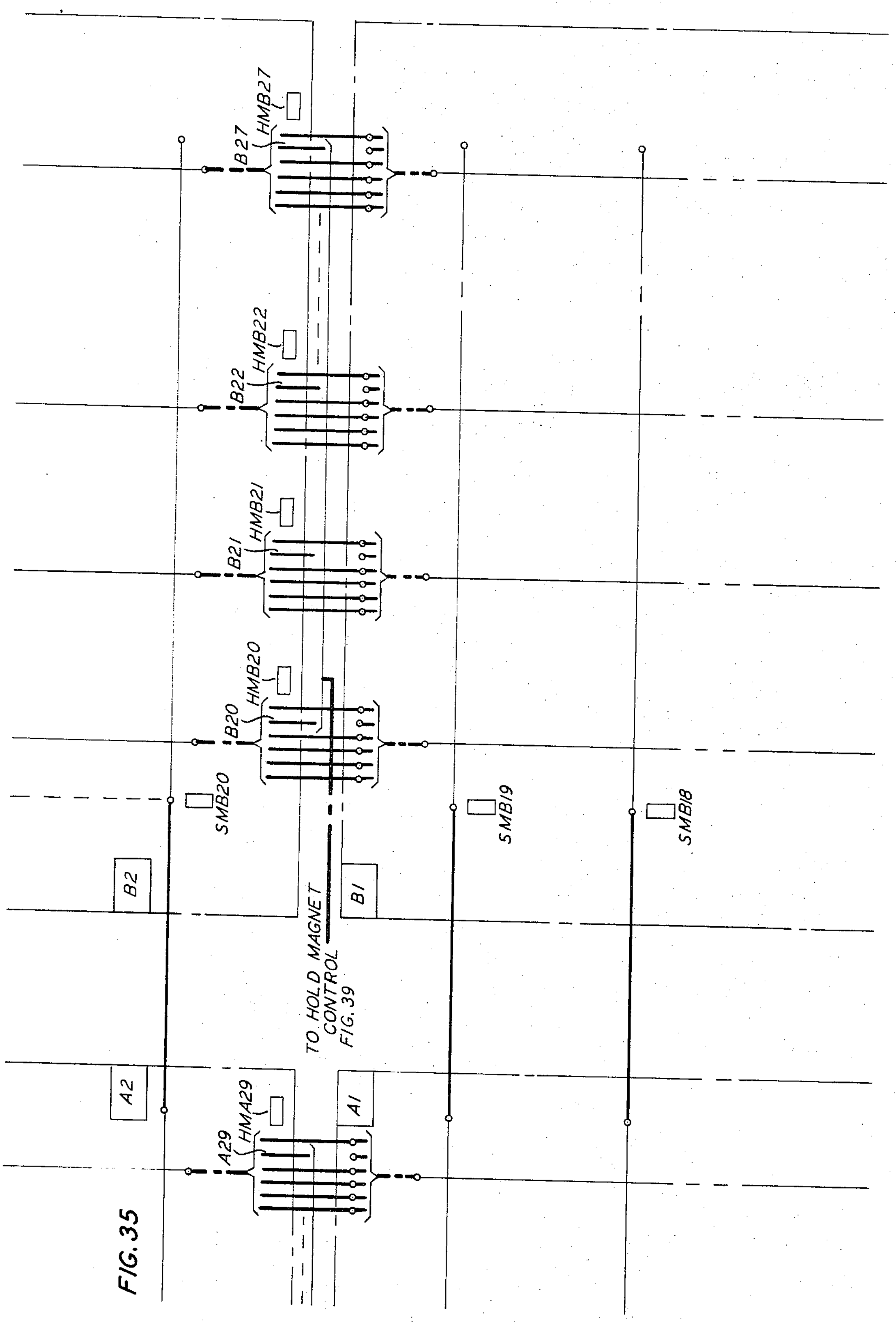

The well-known crosspoint of a crossbar switch has been shown in a manner as indicated in FIG. 32. The small box designated SMA00 is the select magnet for position 0 on switch A0 and the box designated HMA00 is the hold magnet for position 0 on switch A0. A number of vertical conductors designated 0, 1, 2, 3, 4 and 5 are shown intersecting a number of horizontal conductors designated 0, 1, 2, 3, 4 and 5 with X's marking the intersections of these vertical and horizontal conductors. According to well-known crossbar switch operation whenever a select magnet is operated, followed by a hold magnet, the six vertical wires are in effect connected to the six horizontal wires at what is familiarly known in the art as a crosspoint. A number of the crosspoints in the crossbar switch structure of FIGS. 28 through 37 have been shown in the manner of the ones in FIG. 32; whereas, others of the crosspoints have been rather cryptically indicated in a very shorthand manner such as the ones for switch A4 shown in FIG. 28. It will be understood however that the details of the cryptically shown crosspoints are intended to be the same as those shown for the ones in detail such as in FIGS. 32 and 37.

Figure 23:
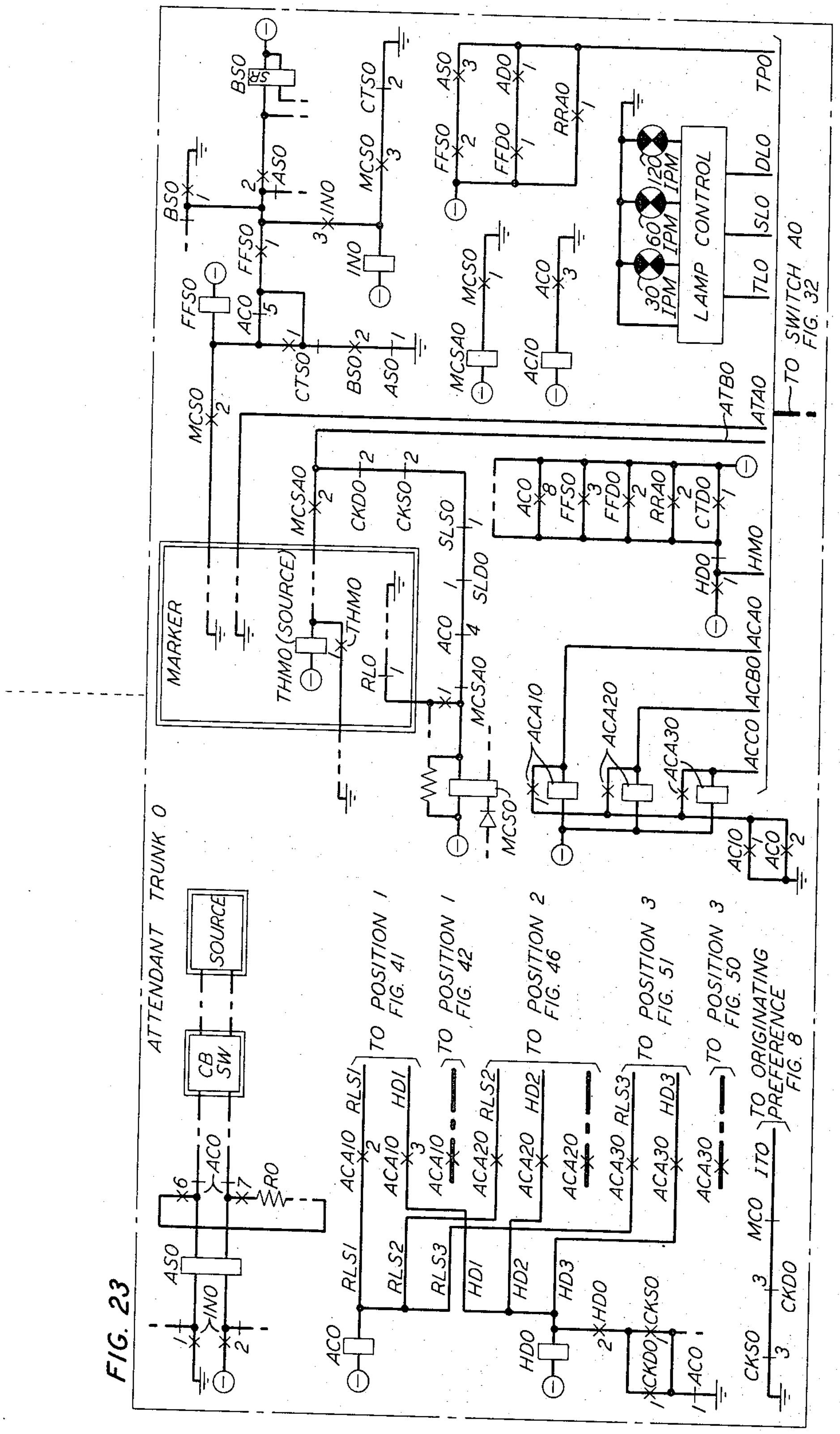

In a few places in the disclosure double lined boxes are shown such as in the Attendant Trunk Circuit of FIG. 23. In FIG. 23 part of a Marker circuit is shown enclosed within double lined boxes. These double lined boxes indicate the existence of parts of circuits which are completely separate from the immediate circuit situation but which are deemed advisable to show for purposes of clarity.

Also in FIG. 23 is shown a single line box designated "Lamp Control." This circuitry has not been shown in detail because it is not considered necessary to a complete understanding of the circuit operation. The lamp control circuit of the Attendant trunk No. 0 of FIG. 23 includes a number of relays which will be operated under certain circumstances to control the three lamp leads DL0, SL0 and TL0 leading into the attendants' positions to either provide direct ground on these lamp leads for steady indications or to provide 30, 60 or 120 IPM (interruptions per minute) interruptions to cause various degrees of flashing of these lamps.

In a few instances in the circuitry a cable will be shown passing through a contact of a relay, such as the cables in FIG. 23 passing through X's which mark make contacts of the connectors ACA10, ACA20 and ACA30. The use of this particular symbolization is merely to simplify what otherwise would amount to showing a considerable number of leads passing through a considerable number of contacts. Therefore, the showing of a cable passing through a make contact of a relay merely means that this represents a considerable number of conductors passing through individual make contacts of that particular relay.

GENERAL DESCRIPTION

In the following general description certain aspects of the present disclosure will be described under appropriate subheadings such as the Switching System Context wherein the present invention finds utility; the Link Arrangement embodying the present invention; the various Trunks; the Crossbar Switches; the Attendant Position-Consoles; and various Control Circuits of the link itself.

SWITCHING SYSTEM CONTEXT (FIGS. 1A, 1B AND 1C)

Figure 1B:
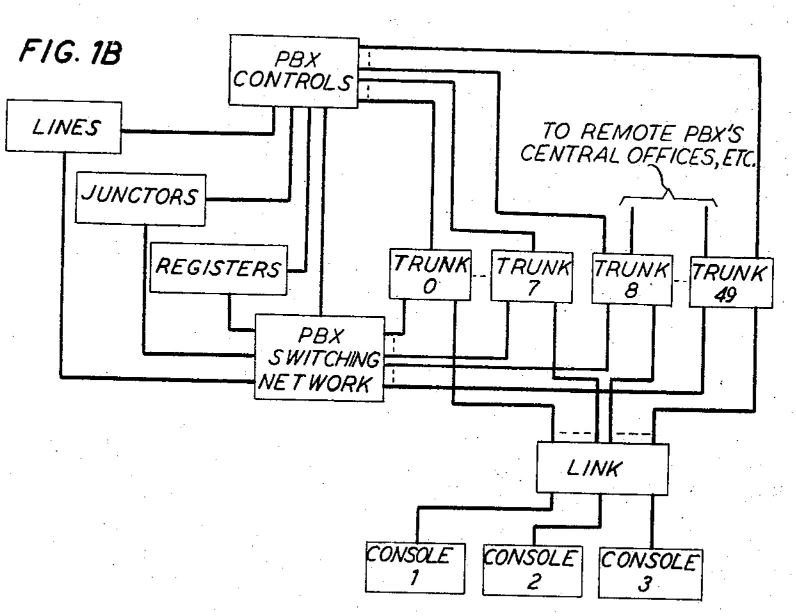
FIG. 1B is a block diagram showing a known type of crossbar PBX as a typical switching system context wherein the link of the present invention may find use.

With reference to FIGS. 1A, and 1B, the type of switching system used as an exemplary embodiment of the present invention is a private branch exchange (PBX) of the type known as a Western Electric Company Crossbar PBX No. 757A. The No. 757A PBX is somewhat similar to the Western Electric Company Crossbar PBX No. 756A, an early version of which is disclosed in Patent 2,904,637 to R. D. Williams of Sept. 15, 1959; however, the No. 757A PBX is quite a bit larger than the No. 756A PBX and is somewhat more sophisticated in its circuit control operations. Basically, both of the No. 756A and the No. 757A PBX's involve comparable switching philosophy and comparable switching parts. FIG. 1 of the Williams patent shows the basic components of the No. 756A PBX comprising a number of equipment cabinets connected to a number of attendant consoles and to a number of stations and trunks, et cetera. In the Williams disclosure all trunk circuits are directly terminated on keys at the attendant consoles. FIG. 1A of the instant disclosure illustrates the No. 757A type of PBX switching system involving equipment cabinets connected to attendant consoles through a link circuit. In this particular system the trunk circuits do not terminate directly at the attendant consoles but must be switched thereto under control of the link circuit. However, the No. 757A PBX may use direct termination, as in the No. 756A PBX, instead of the link circuit of the present disclosure.

In FIG. 1B the three consoles are shown connected to a link circuit which in turn terminates fifty trunks. All of the trunk circuits, the lines, the junctors, the registers, the various controls and the main switching network of the PBX are all shown interconnected functionally by single line diagrams to indicate that the No. 757A PBX functions as a completely integrated and self-contained automatic PBX, the connections indicated from the fifty trunk circuits through the link to one of the three consoles merely indicating the existence of facilities whereby an attendant at one of these consoles may be called in by a trunk circuit for one or more purposes to be described hereinafter.

During the normal automatic operation of this PBX, with reference to FIG. 1B, PBX station lines may connect to other PBX station lines automatically without the assistance of an attendant, lines may be connected to trunks, trunks may be connected to trunks, and trunks may be connected to lines—again all without the assistance of an attendant. However, there are circumstances, as is well known in the art, whereby a trunk circuit may need the assistance of an attendant. For instance, if a PBX line circuit tries to place a call outside of the PBX under circumstances where that particular line is not authorized to do so, a trunk circuit wil intercept the call and route it to an attendant: certain PBX lines may actually desire the assistance of an attendant whereupon, by dialing a proper digital code, the particular PBX line may seize an attendant trunk which in turn will present a calling condition toward an attendant console: certain incoming trunks to this PBX, such as Central Office trunks, will always be answered by an attendant, in which case such a trunk will need to initiate a calling condition through the link circuit of FIG. 1B to one of the attendant consoles. The present detailed disclosure involves the link circuit of FIG. 1B and three attendant consoles, along with sufficient details of representative ones of fifty trunk circuits.

LINK ARRANGEMENT (FIG. 1C)

Figure 1C:
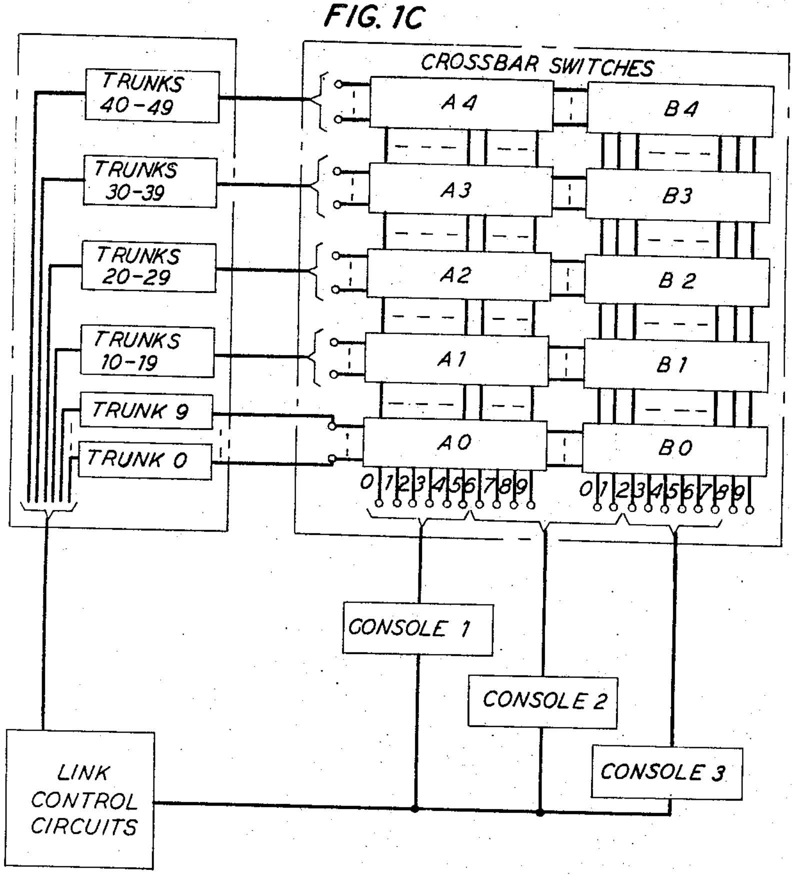
FIG. 1C is a block diagram arrangement of the link showing the general arrangement of trunks, consoles and controls therewith.
Figure 1D:
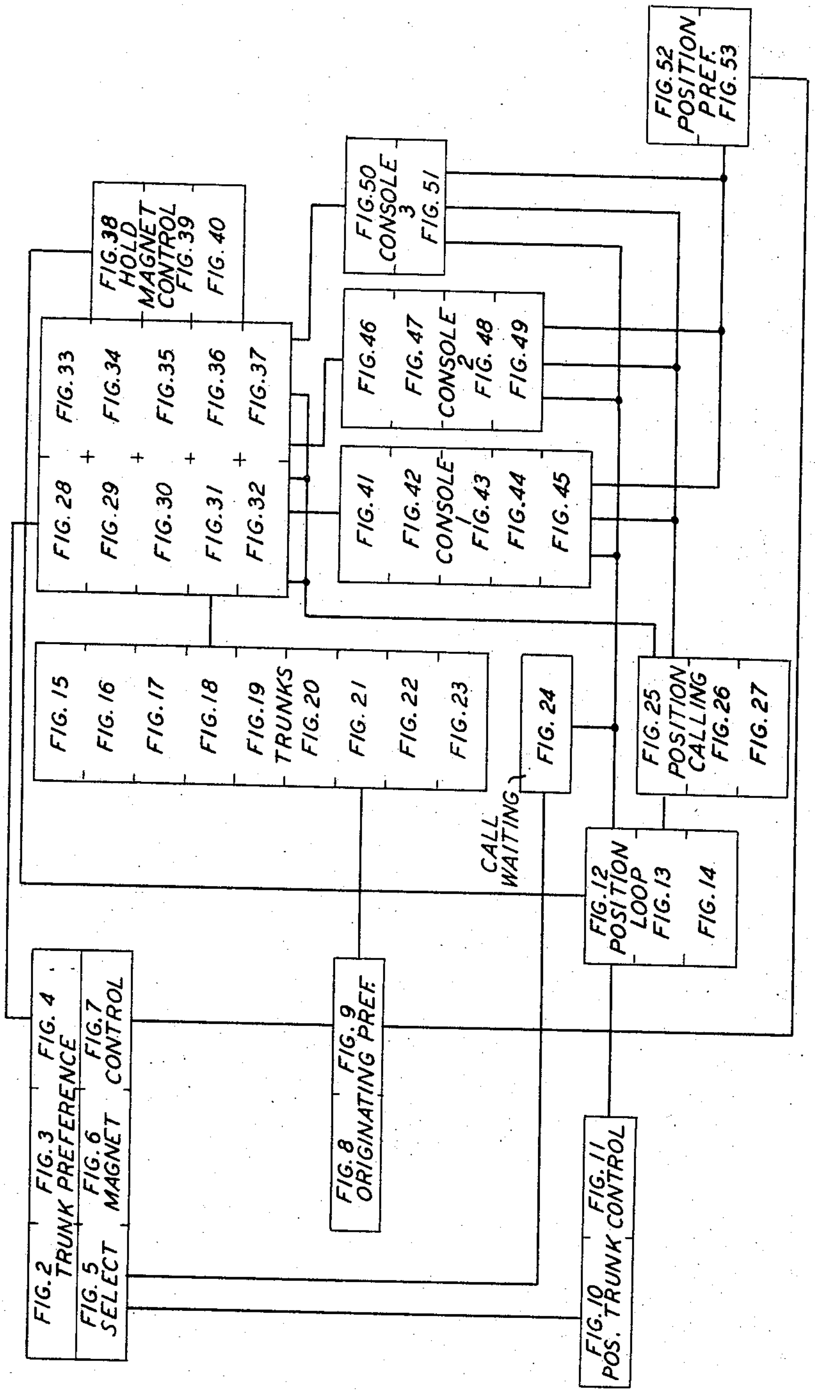

FIG. 1C depicts in block diagram form the general relationship between fifty trunk circuits and three attendant consoles whereby any one of the trunks may secure access to any one of the consoles under control of the control circuits and by way of the crossbar switch array comprising ten crossbar switches A0 through A4 and B0 through B4. This crossbar switch array is the one depicted in detail in FIGS. 28 through 37 of the detailed disclosure. Each of these ten crossbar switches is of the usual ten-by-ten arrangement of six wires: this means that each of the ten horizontals on switch A0 for instance terminates six conductors individual to one of ten trunks, such as the trunks numbered 0 through 9; and, each of the ten verticals of switch A0, indicated by the numerals 0 through 9, consists of six wires. The horizontal conductors of switch A0 are in essence multipled to the horizontal conductors of switch B0 and the select magnets corresponding to the various horizontal levels of these two switches are in effect operated in parallel, followed by the operation of one of the eighteen hold magnets, thereby to complete a crosspoint connection between the trunk on a horizontal to one of the eighteen verticals on switches A0 and B0 (verticals 8 and 9 on switch B0 not being needed for present purposes).

It will be noted in FIG. 1C that each of the three consoles is associated with six of the eighteen verticals of switches A0 and B0, which verticals are in effect multipled vertically throughout all of the A and B switches. Console 1 for instance includes six loop circuits designated 0 through 5, each consisting of six vertical wires and associated with one of the six crossbar switch verticals designated for that particular console. Consoles 2 and 3 likewise include six loop circuits arranged similarly to the six loop circuits for console 1. This in effect provides eighteen circuits for serving fifty trunks where, of the eighteen circuits, each of three consoles has six circuits. An attendant at console 1 is capable of selecting any one of the six loop circuits at her console and can answer any one of the fifty calling trunks over any one of these six circuits.

Figure 53:
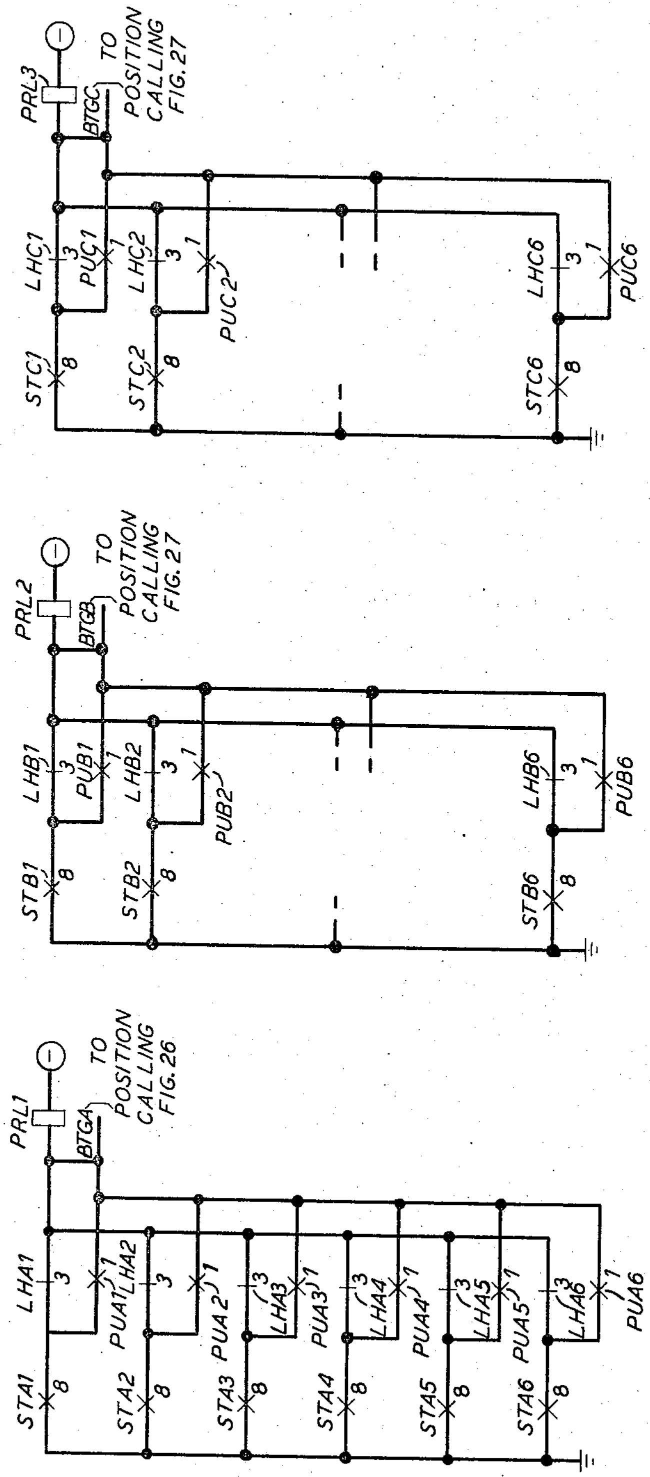

The crossbar switch array of FIG. 1C and the control circuits making up the link of FIG. 1B are disclosed in complete detail in FIGS. 2 through 53, along with sufficient details of some of the trunk circuits and of the three consoles in order to make clearly understandable the various circuit operations involved in this link circuit.

TRUNKS (FIGS. 15 THROUGH 23)

Figure 15:
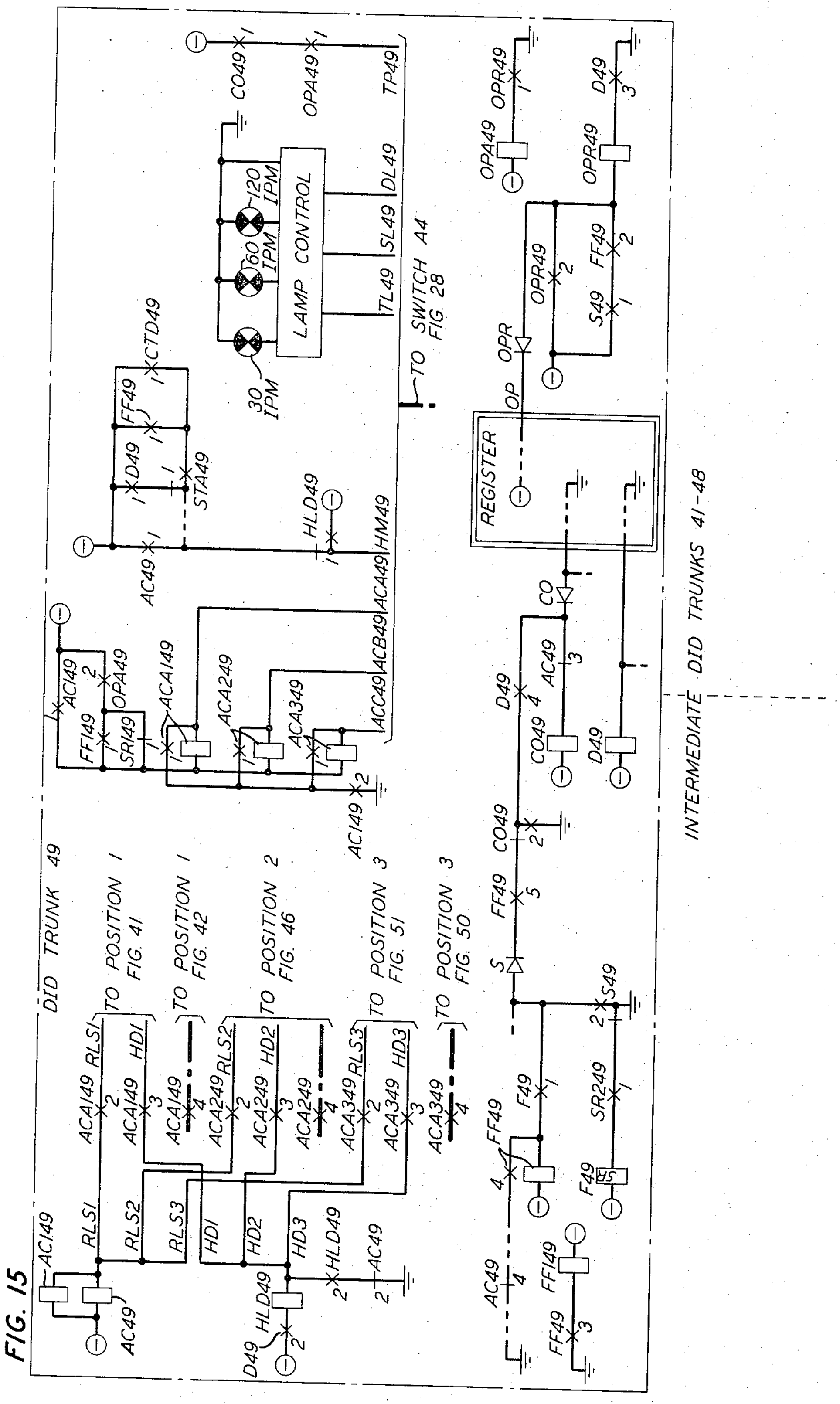
Figure 16:
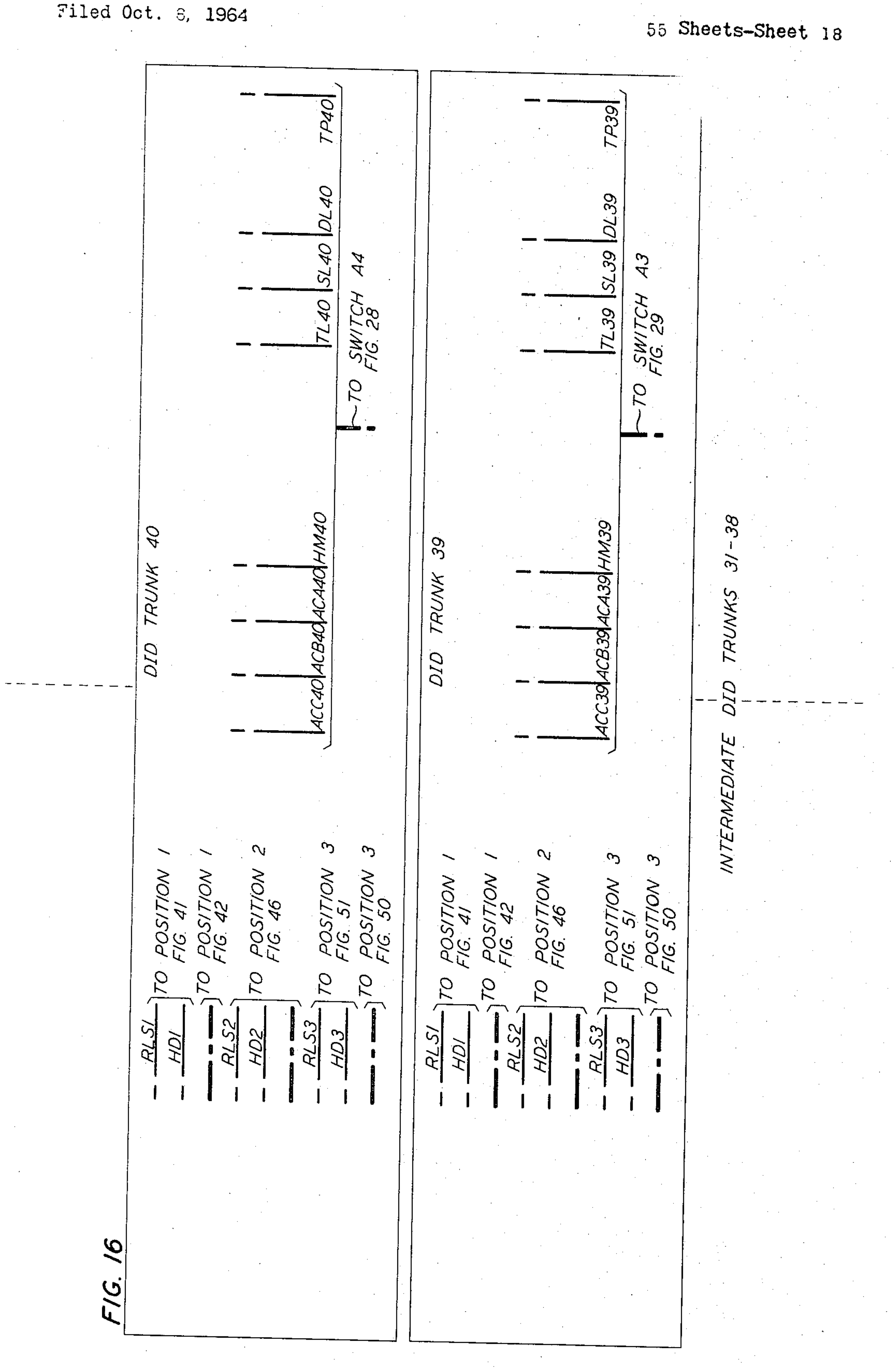
Figure 17:
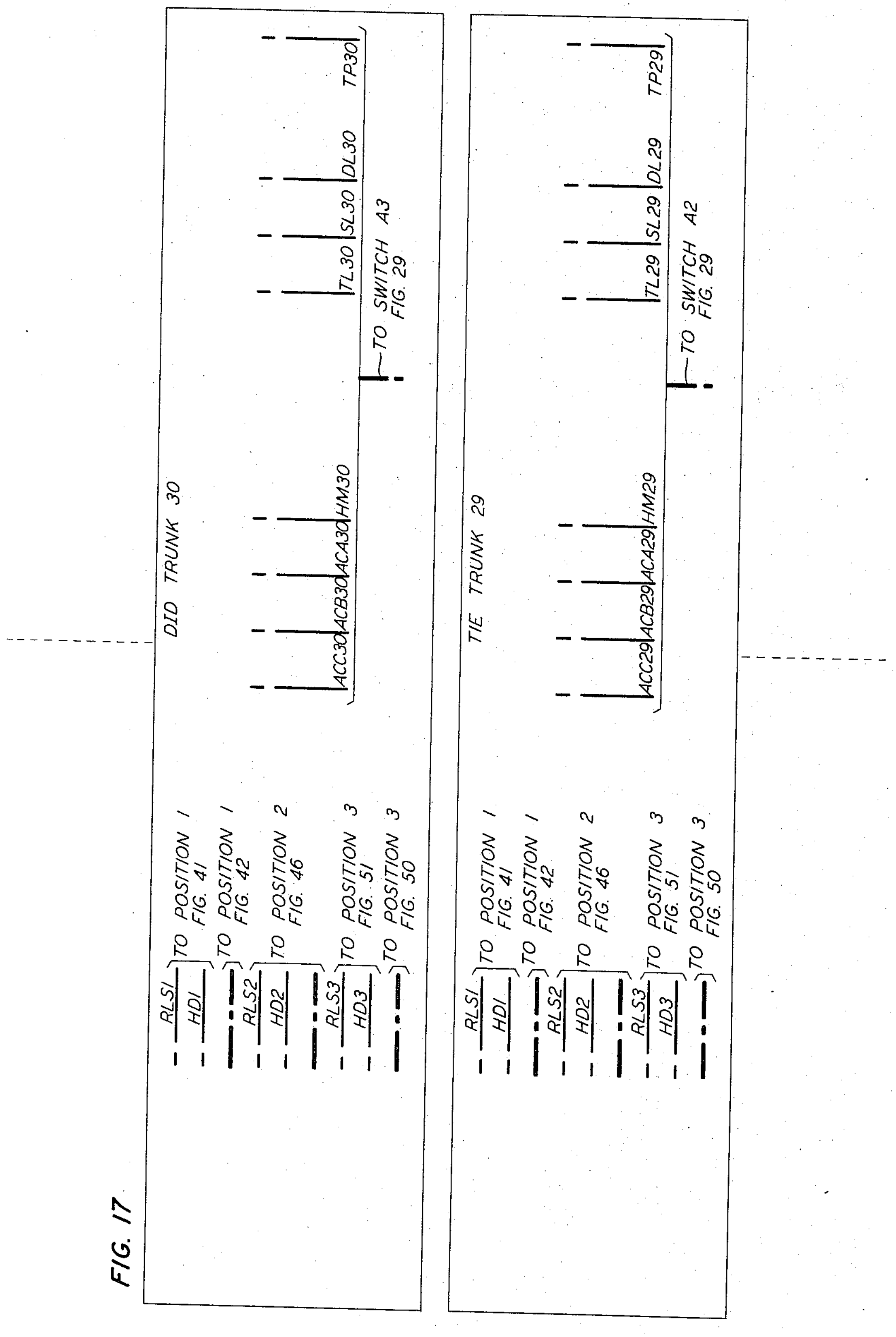
Figure 18:
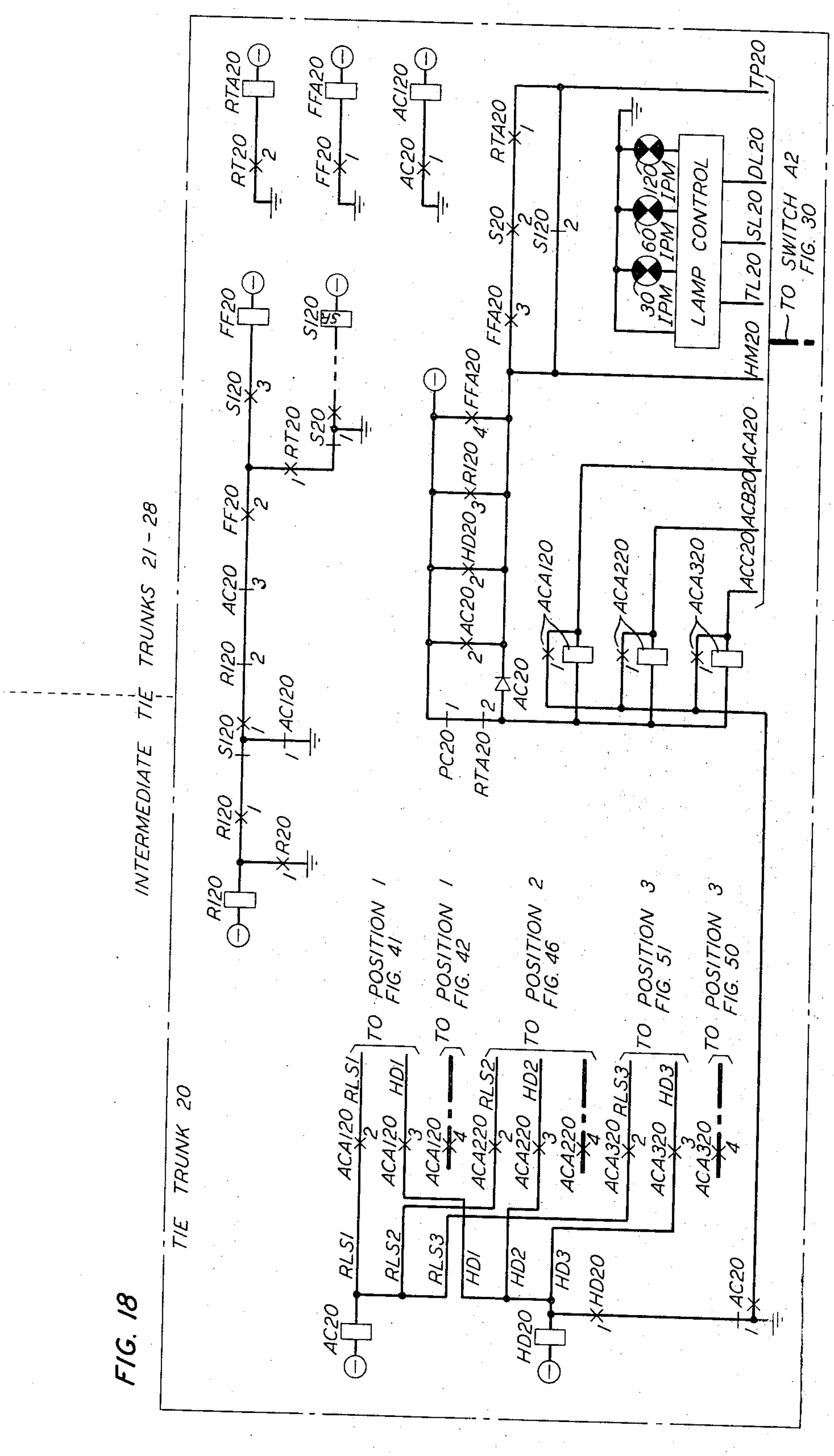
Figure 19:
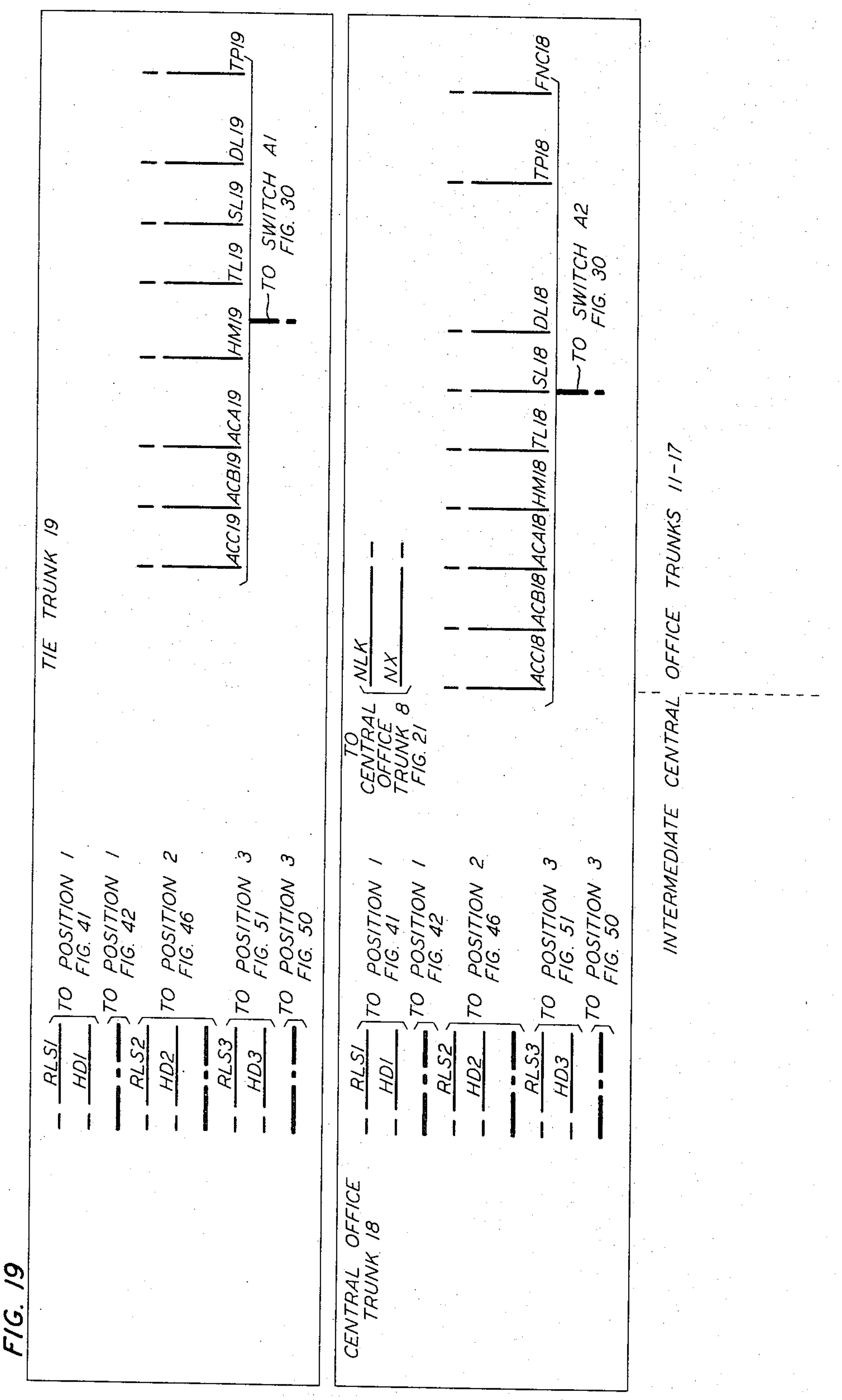
Figure 20:
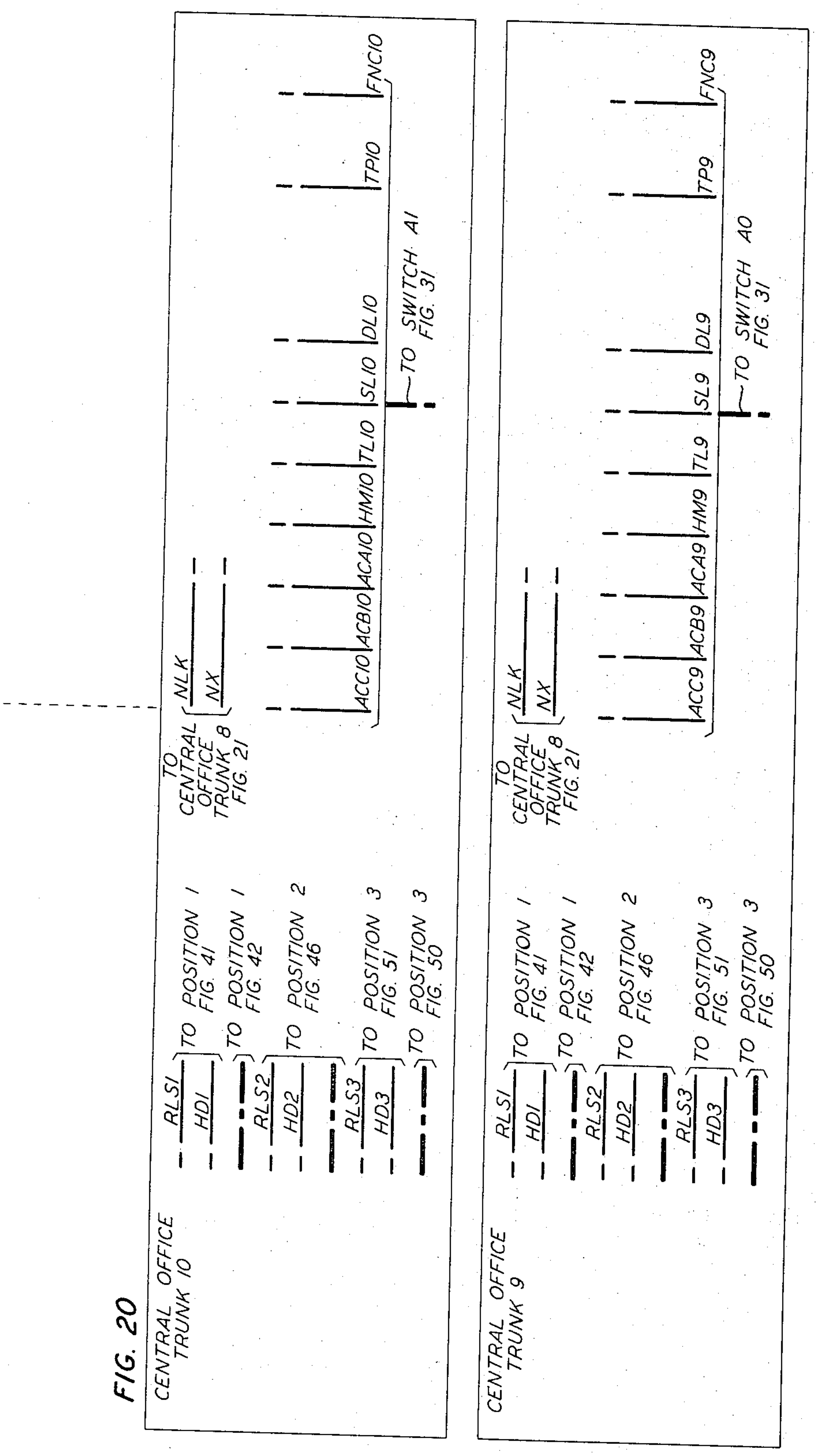
Figure 21:
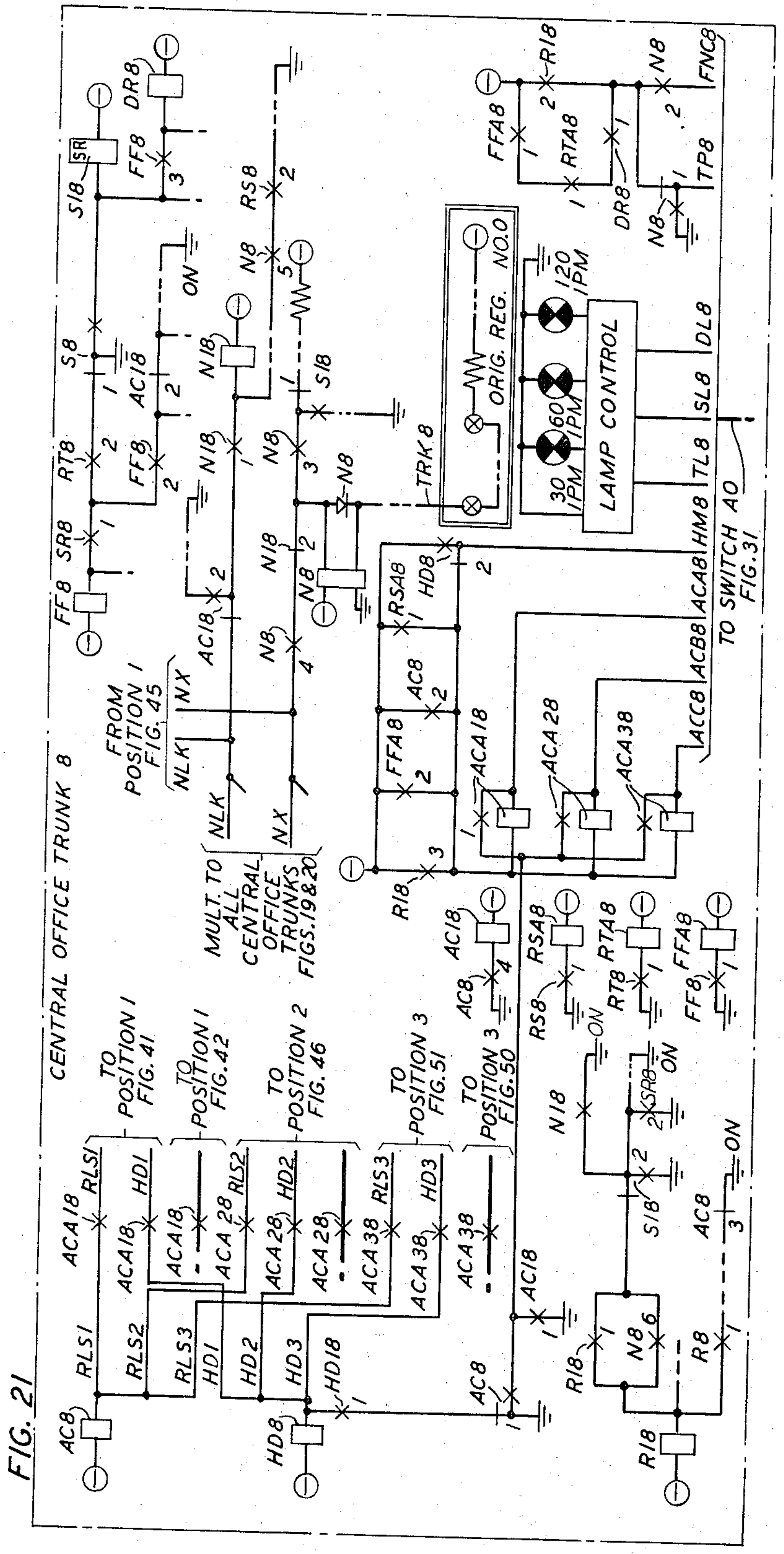
Figure 22:
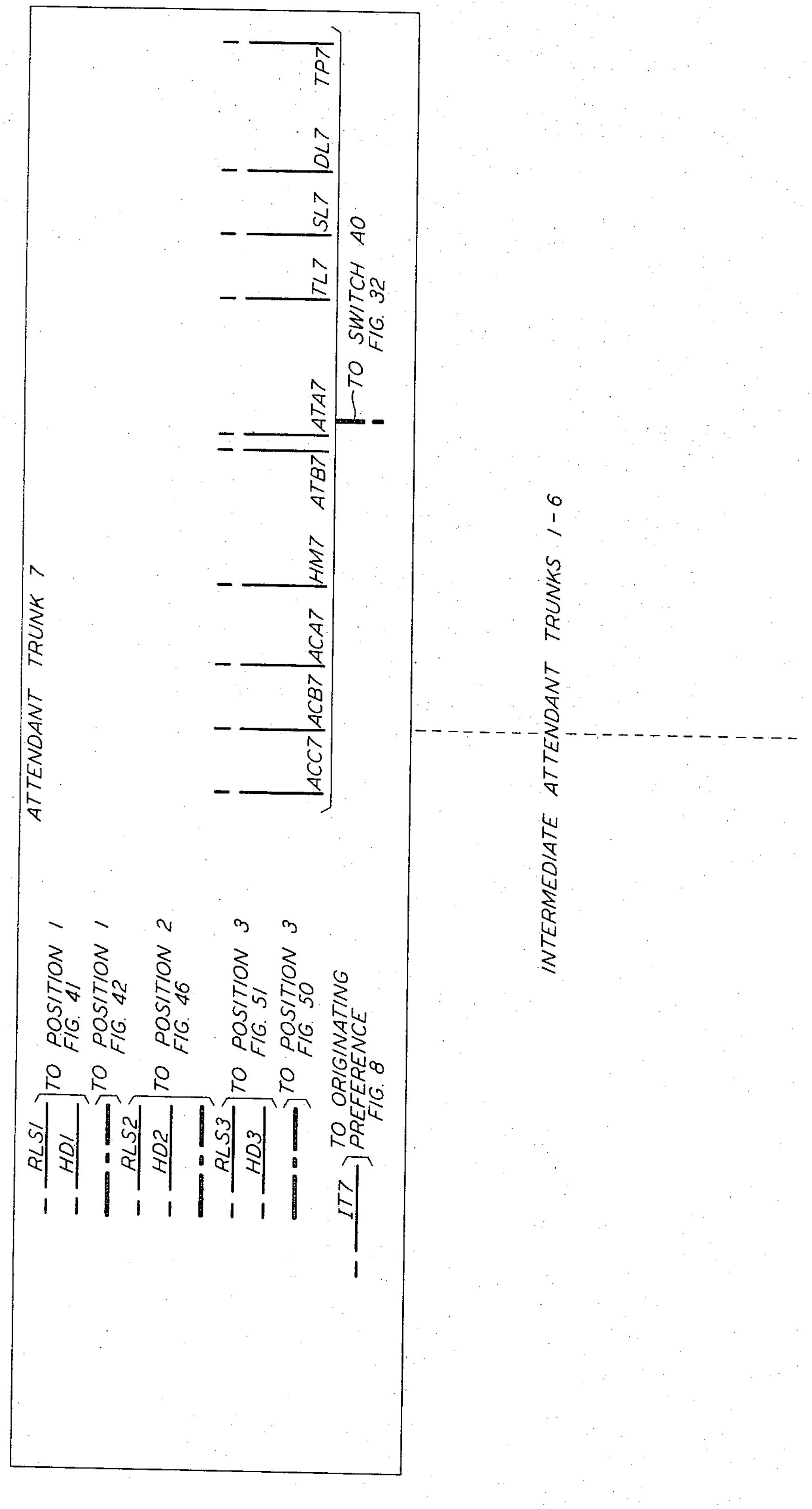

The fifty trunk circuits shown in FIG. 1C are disclosed in some detail in FIGS. 15 through 23 in such a manner as to distribute over the horizontals of the crossbar switch array a representative number of Direct Inward Dialing (DID) trunks, Tie (TIE) trunks, Central Office (CO) trunks, and Attendant (ATT) trunks. FIGS. 22 and 23 depict eight ATT trunks numbered 0 through 7 appearing on horizontals 0 through 7 of switches A0 and B0 of the crossbar switch network of FIG. 1C; FIGS. 19 20 and 31 depict eleven CO trunks numbered 8 through 18 appearing in horizontal levels 8 and 9 of switches A0 and B0 and horizontals 9 through 8 of switches A1 and B1; FIGS. 17, 18 and 19 depict eleven tie trunks numbered 19 through 29 and appearing before horizontals 9 of switches A1 and B1 and horizontals 0 through 9 of switches A2 and B2; FIGS. 15, 16 and 17 depict twenty DID trunks numbered 30 through 49 appearing before horizontal levels 0 through 9 of switches A3 and B3 and horizontal levels 0 through 9 of switches A4 and B4.

The direct inward dialing (DID) trunks are circuits intended to handle direct inward dialing from a tandem switching center to a PBX station or to a PBX attendant.

With respect to the TIE trunks, any call incoming to the PBX over a TIE trunk is answered by a PBX attendant and any outgoing call from a PBX to this TIE trunk may be dial selected by a PBX station, by another dial tie trunk or by the PBX attendant through the use of an ATT trunk.

All CO trunk circuits, for the purposes of the present disclosure, have been assumed to be one-way incoming trunks from central offices and any calls incoming over such trunks will be directed to an attendant for answering.

The ATT trunks are double-ended trunks, one end being called the source and the other end being called the destination. Whenever the marker control circuit of the PBX connects a station initially to an idle ATT trunk, this connection is made to the source end; and, the call will be completed by using the destination end of the trunk under control of the operator, thereby leaving the completed connection between the source and destination under control of this particular trunk circuit. The ATT trunks are also used by the PBX attendants for securing access into the PBX in the first instance, such, for example, as in the case where a PBX attendant wishes to place a call to a particular PBX party or to place a trunk call outgoing from the PBX.

With respect to all of these trunk circuits briefly alluded to above, the main point of interest with respect to the present invention is the calling condition of the DID trunks, the TIE trunks, the CO trunks and the ATT trunks, which calling condition is going to effectuate control over the link of FIG. 1B to cause a connection to be established between that particular trunk circuit and an idle one of the attendant consoles. Of course, a further point of interest with respect to the present disclosure is the abiilty of an attendant at one of the consoles to initiate a call, thereby to become connected to an ATT trunk through the use of the link circuit of FIG. 1B. The various circumstances surrounding the creation of a calling condition by a trunk circuit are described at the outset under the detailed description found hereinafter.

CROSSBAR SWITCHES (FIGS. 28 THROUGH 37)

Figure 4:
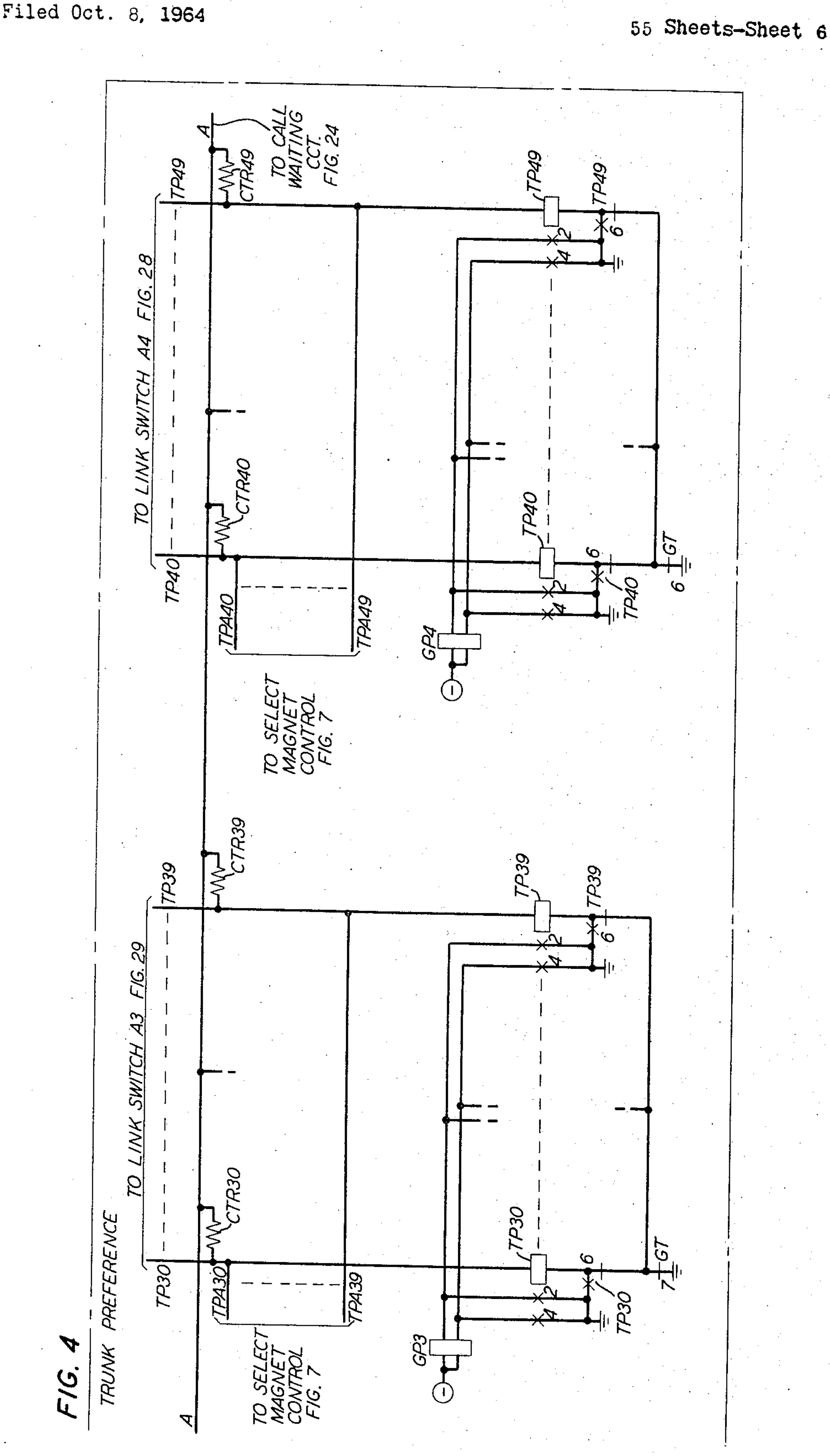
Figure 25:
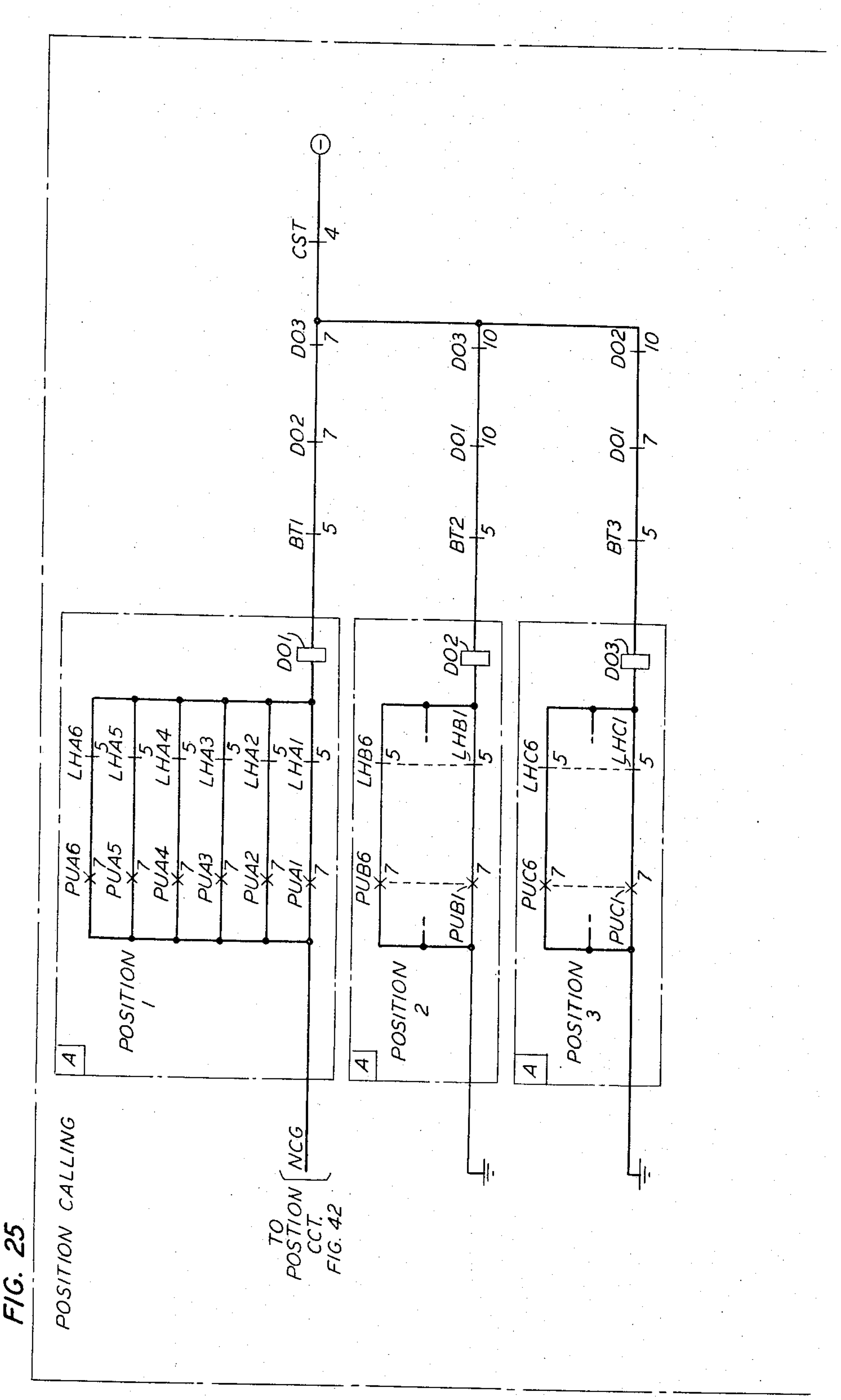
Figure 26:
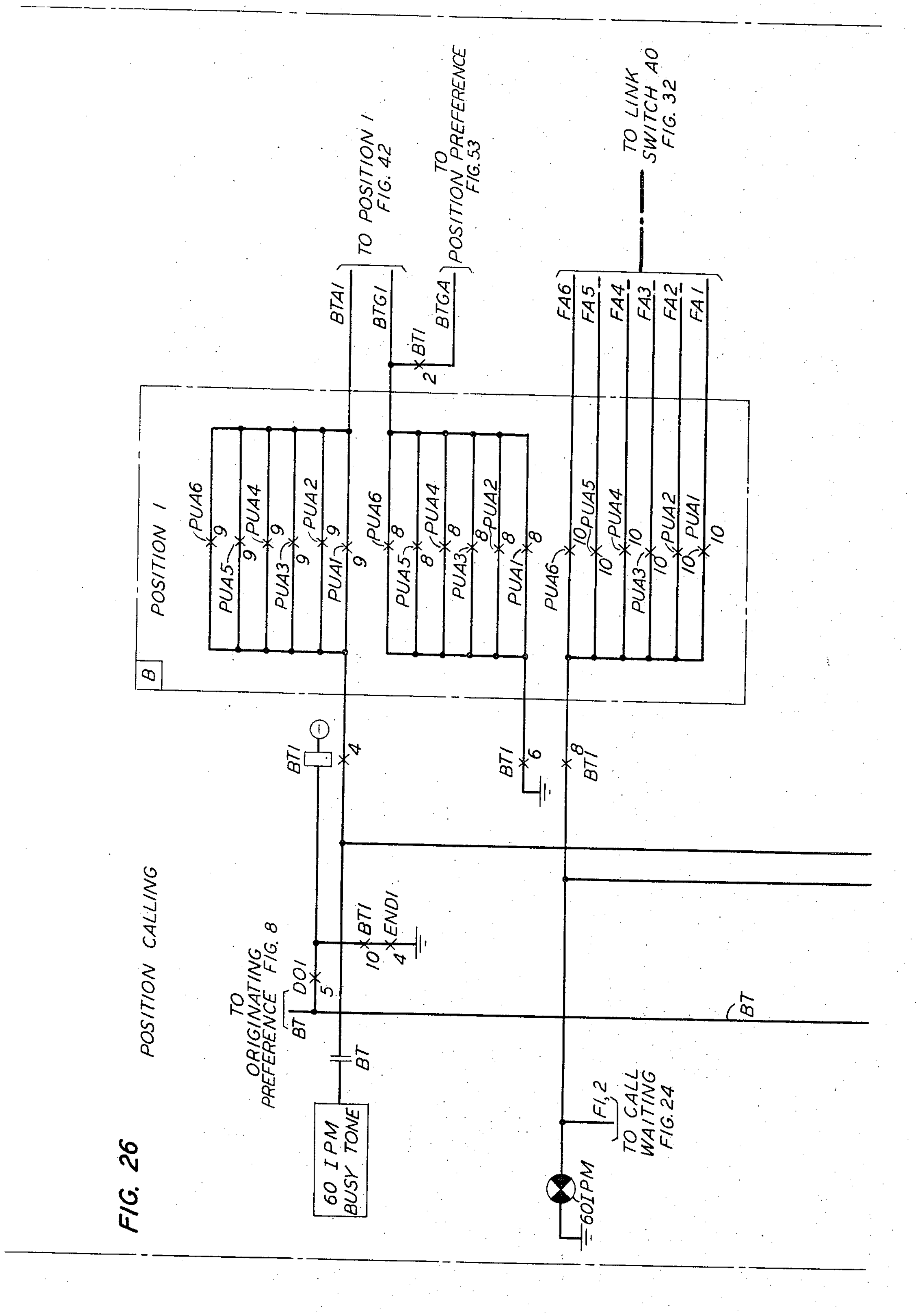
Figure 27:
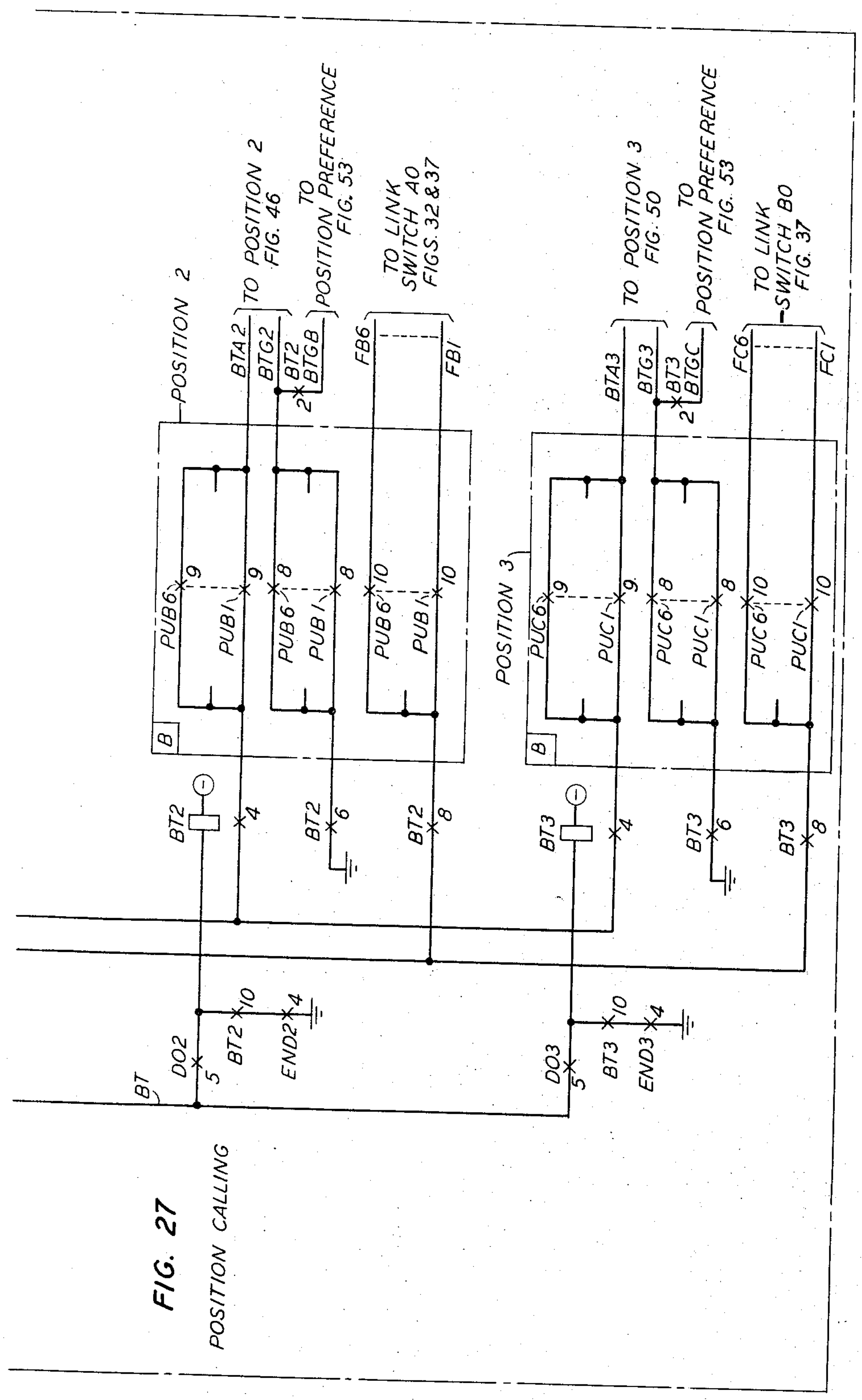
Figure 36:
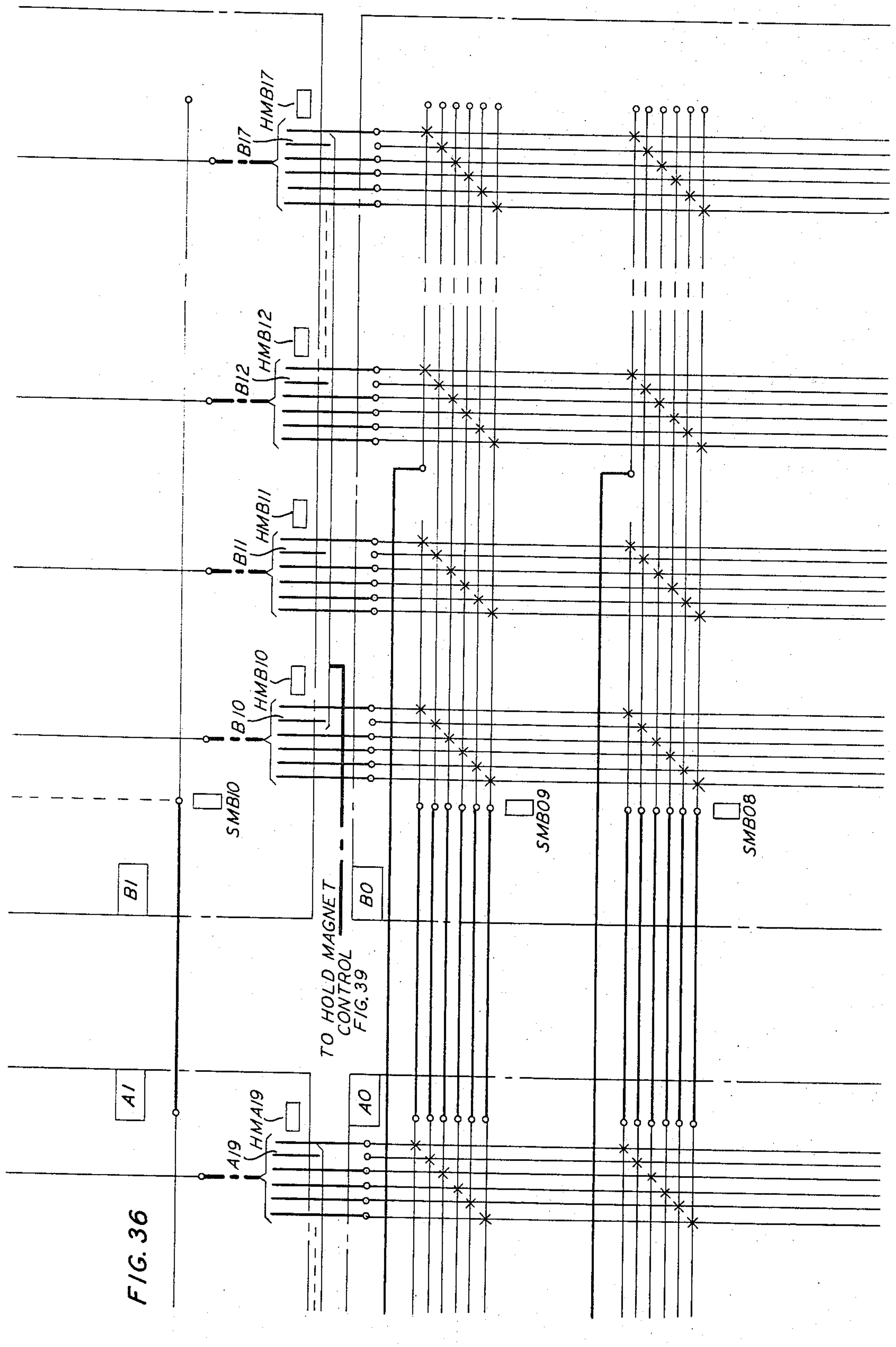
Figure 37:
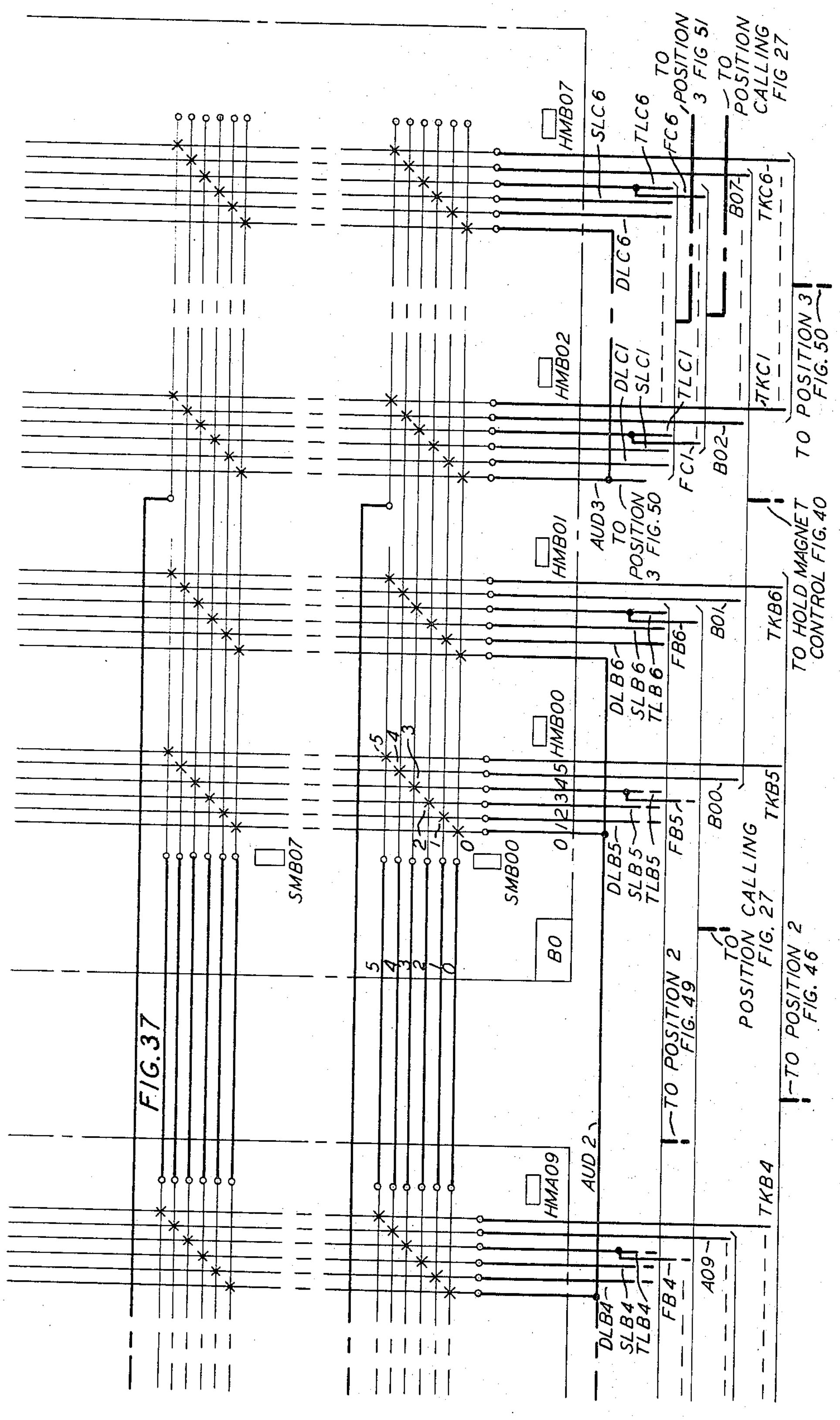
Figure 38:
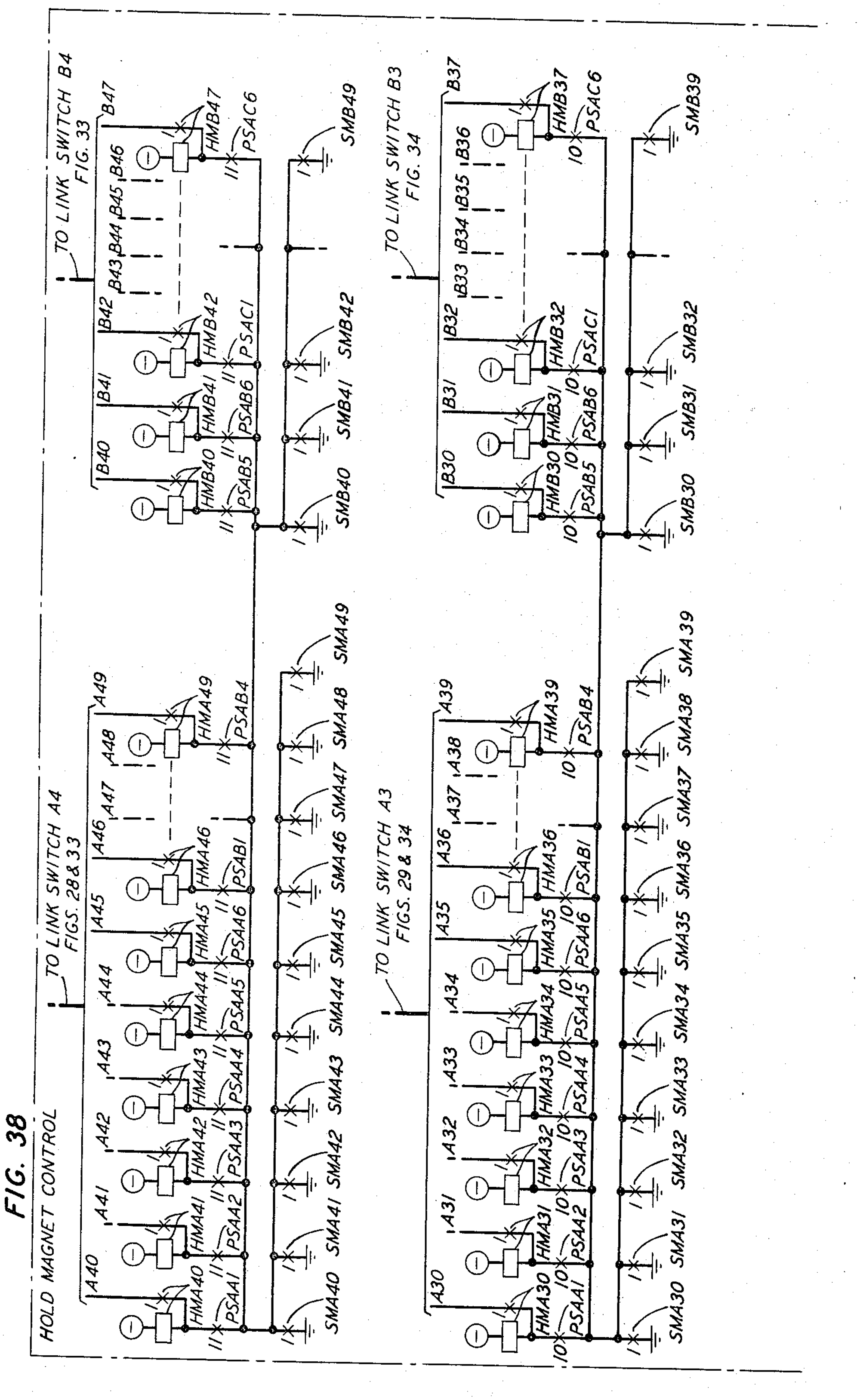
Figure 39:
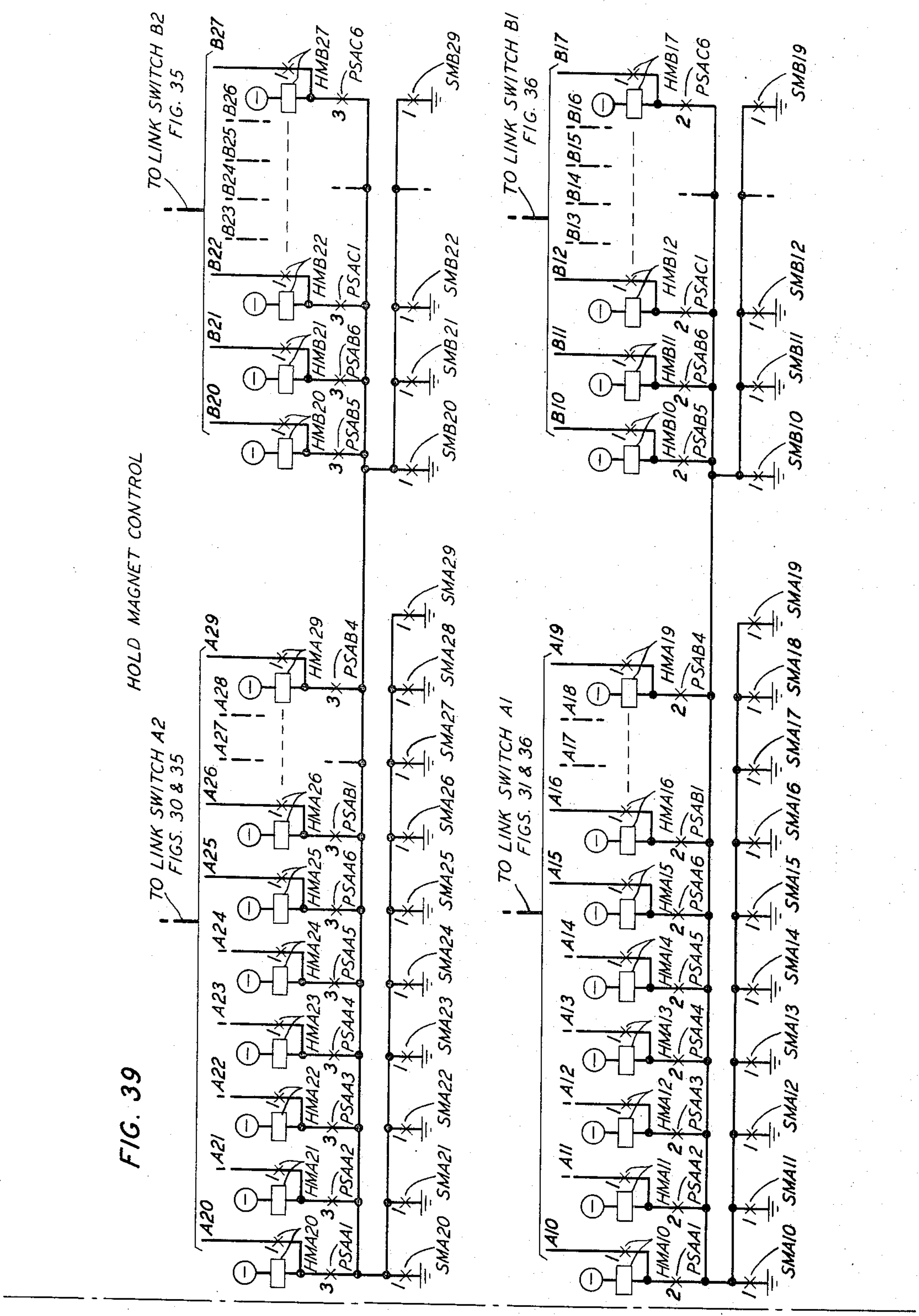
Figure 40:
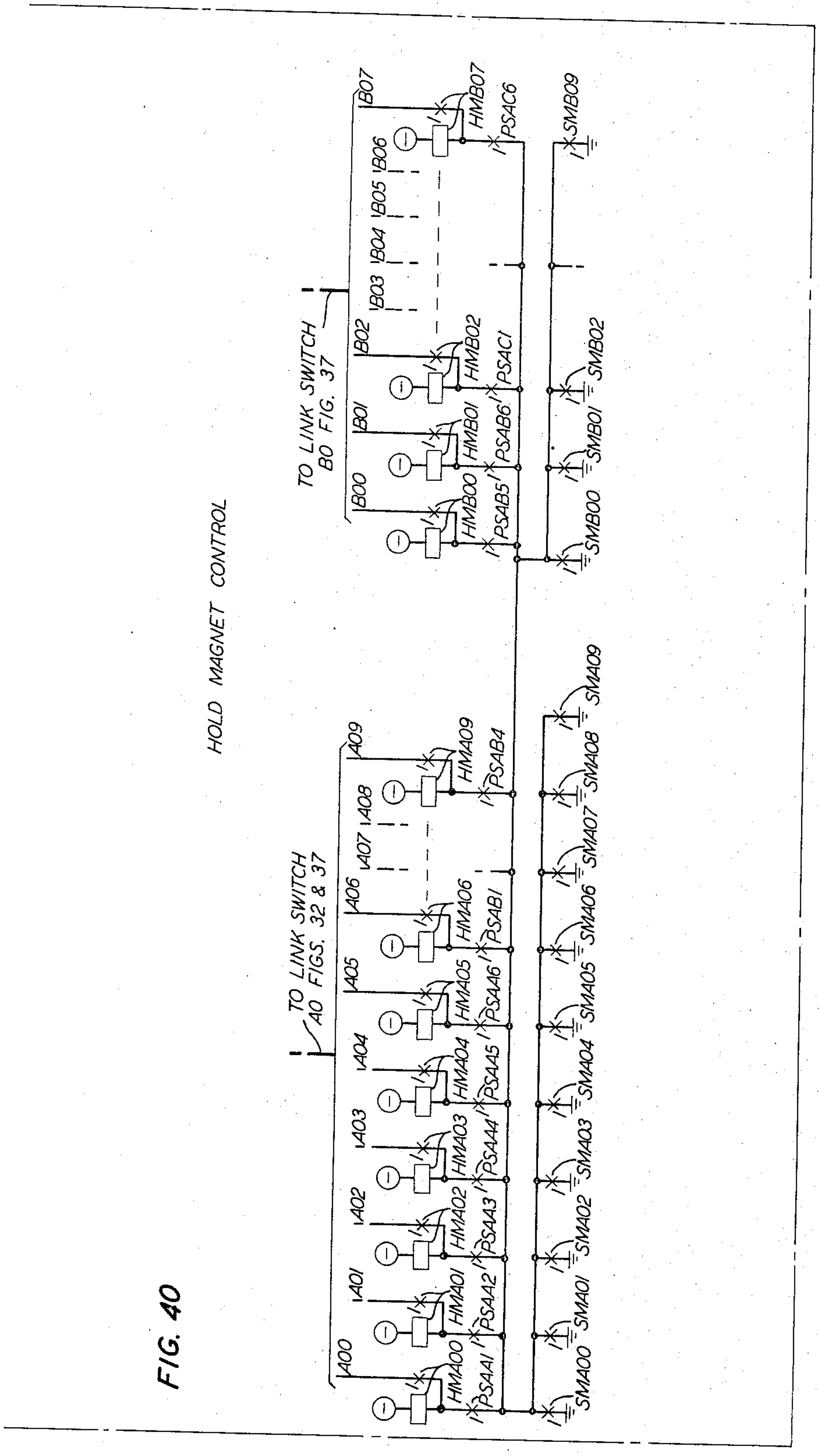

Reference has already been made to the crossbar switch array in the general description above of FIG. 1C and the details thereof are shown on FIGS. 28 through 37, along with a considerable number of circuit conductors extending from the crossbar switch array to the various trunk circuits, to the Trunk Preference circuit of FIGS. 2, 3 and 4, to the Position-Console circuits of FIGS. 41 through 51, to the Position Calling circuit of FIGS. 25, 26 and 27, and to the Hold Magnet control circuit of FIGS. 38, 39 and 40. It is again repeated that the crossbar switch array of FIGS. 28 through 37 consists of five A switches, A0 through A4, and five B switches, B0 through B4, each switch consisting of the well-known ten-by-ten arrangement of six-point crosspoints and with the horizontals of switches A0 and B0, A1 and B1, et cetera, generally multiplied together and with the verticals of all of the A switches generally multipled together, and with the verticals of all of the B switches generally multipled together. One exception to this general multiplying lies in the connection of contacts No. 5 of the crosspoints. For instance, three conductors ACA0, ACB0 and ACCO extend from ATT trunk No. 0 to FIG. 23 into switches A0 and B0 of FIGS. 32 and 37. Conductor ACA0 multiples only across the first six verticals of switch A0 corresponding to position-console No. 1 of FIGS. 41 through 45; conductor ACB0 multiples across only the last four verticals of switch A0 and the first two verticals of switch B0 corresponding to position-console No. 2 of FIGS. 46 through 49; and, conductor ACCO multiples across only the last six verticals of switch B0 corresponding to position-console No. 3 of FIGS. 50 and 51. This situation prevails, as will be apparent from subsequent detailed description, so that each position-console can control only its corresponding trunk connector, such as connectors ACA10, ACA20 and ACA30 of FIG. 23 for instance. The only conductor which is not multipled vertically is the hold magnet locking conductor, such as conductor A00 of switch A0 in FIGS. 31 and 32 or conductor A10 of switch A1 of FIGS. 30 and 31. This situation prevails, as will be more clearly understood later, so that each hold magnet locking circuit is controled only by crosspoints on its own switch.

ATTENDANT POSITION-CONSOLES (FIGS. 41 TO 51)

Figure 50:
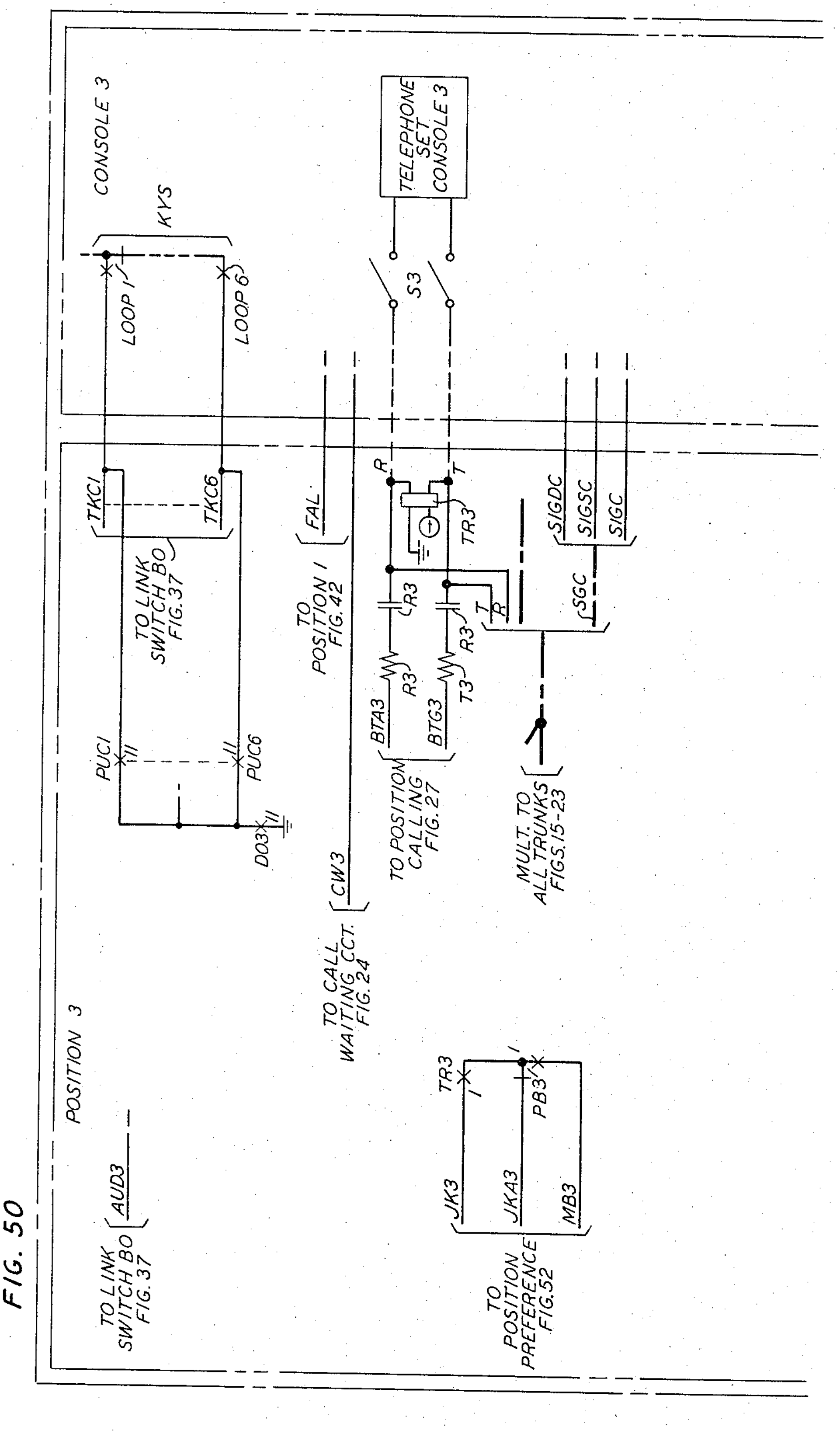
Figure 51:
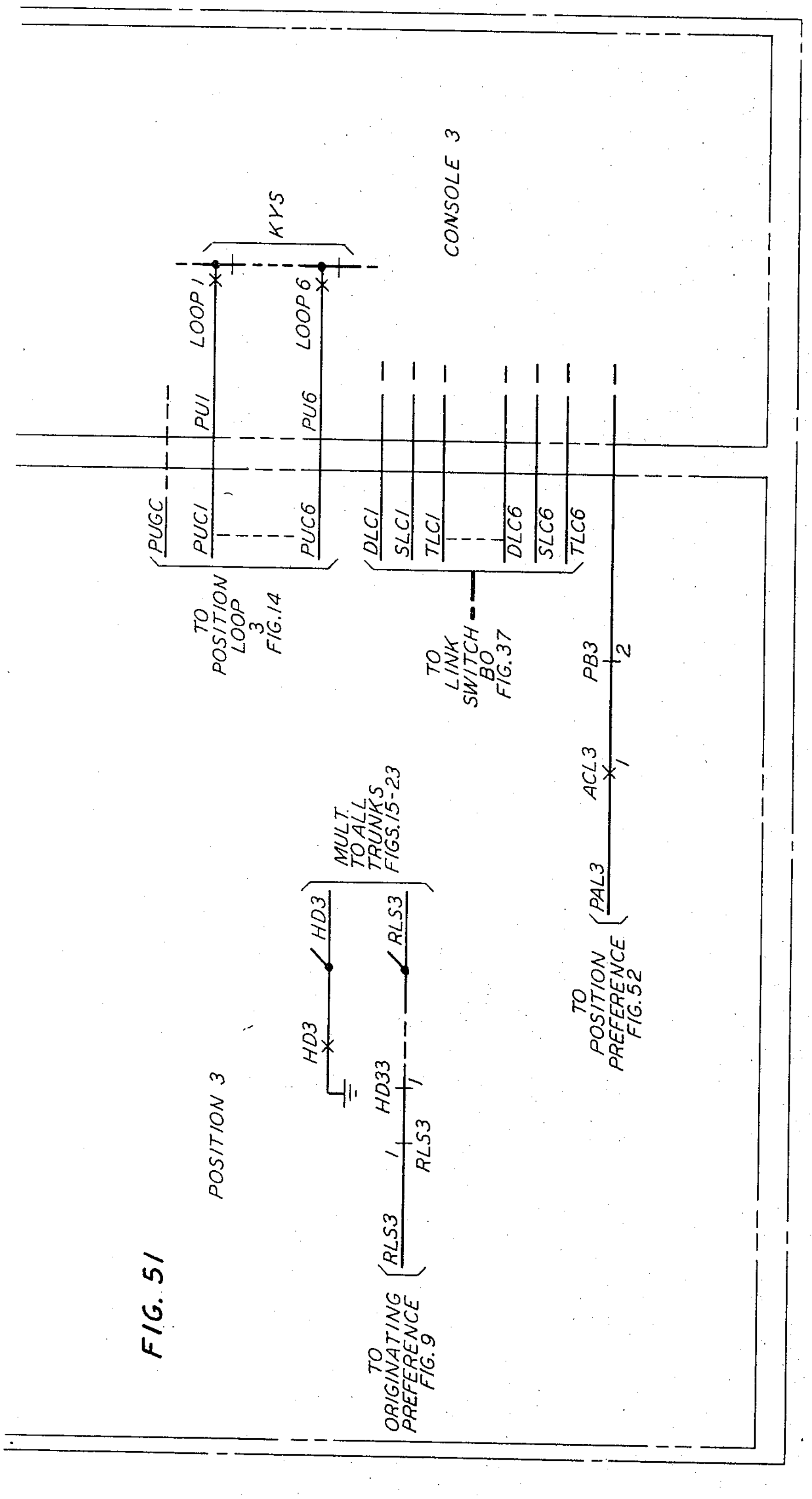

The three attendant console positions depicted in FIGS. 1A, 1B and 1C are shown in some detail circuitwise in FIGS. 41 through 51. Position 1, disclosed in FIGS. 41 through 45, is shown in substantial detail, although certain circuit details have been omitted for the purpose of clarity: position 2 is disclosed in FIGS. 46 through 49 and is the same as position 1 except that position 1 is the only one of the attendant position consoles arranged to set up night connections or busy verification calls as will be described in detail hereinafter. Position 3, disclosed in FIGS. 50 and 51, is identical with position 2 of FIGS. 46 through 49.

Figure 42:
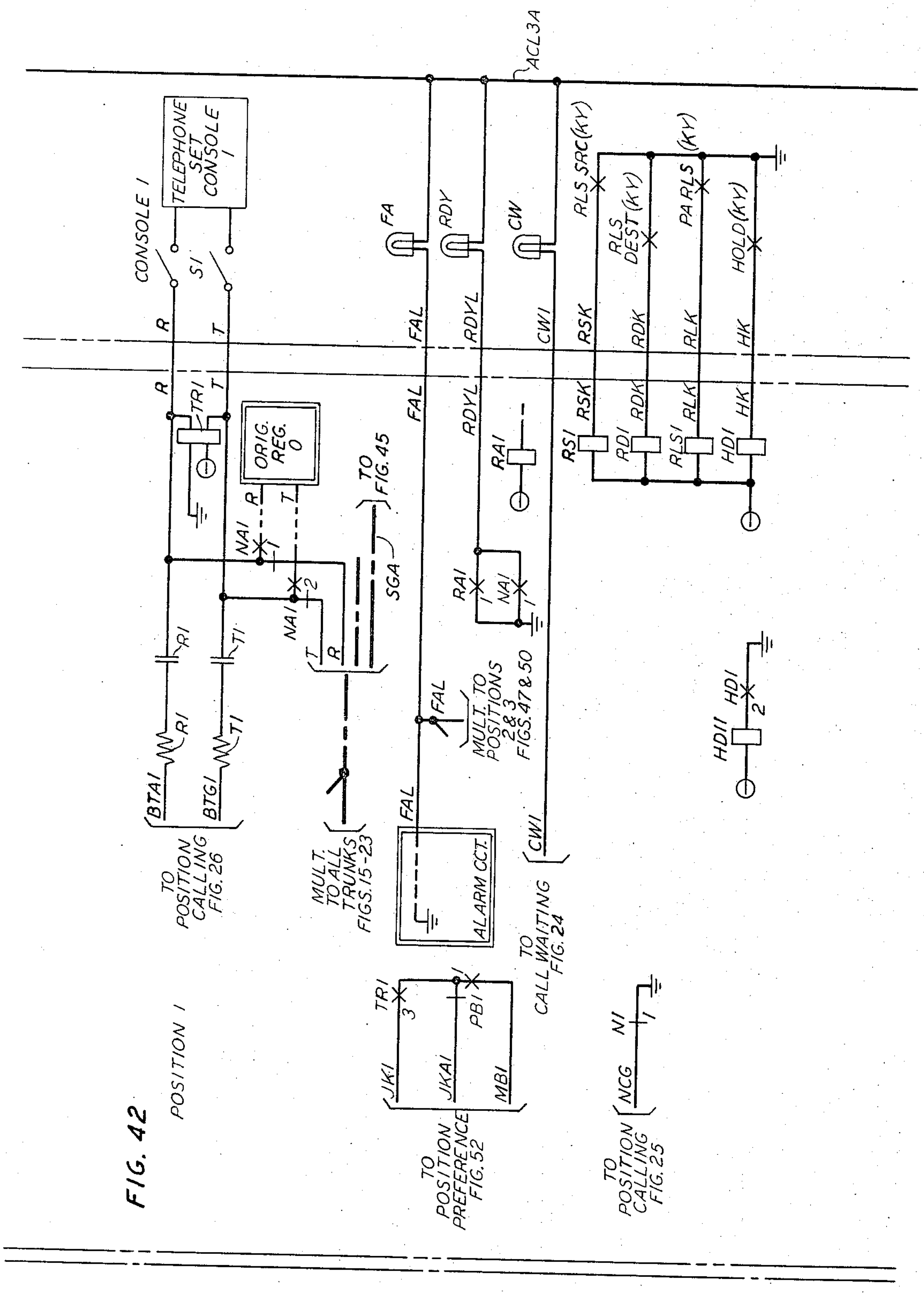
Figure 43:
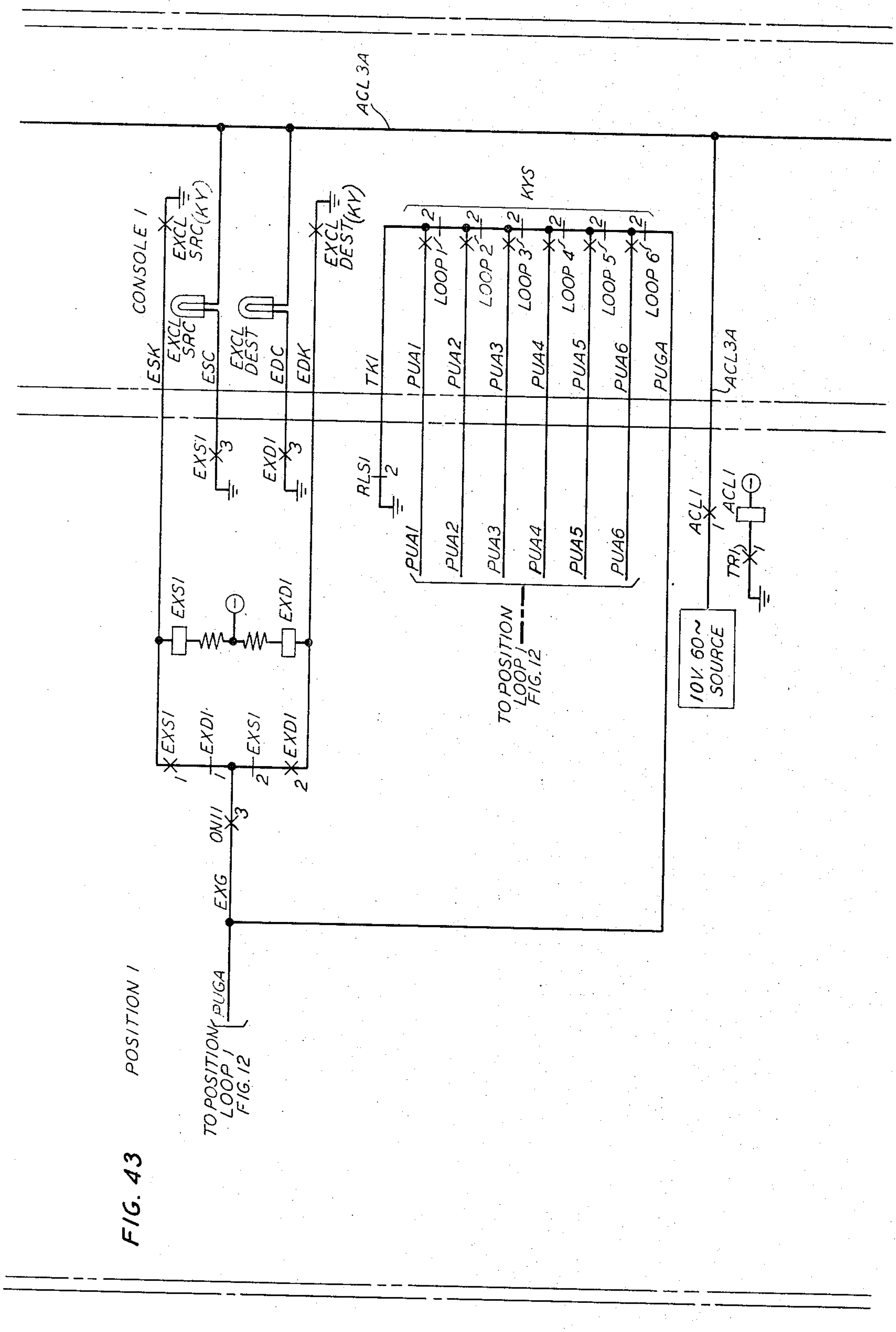
Figure 44:
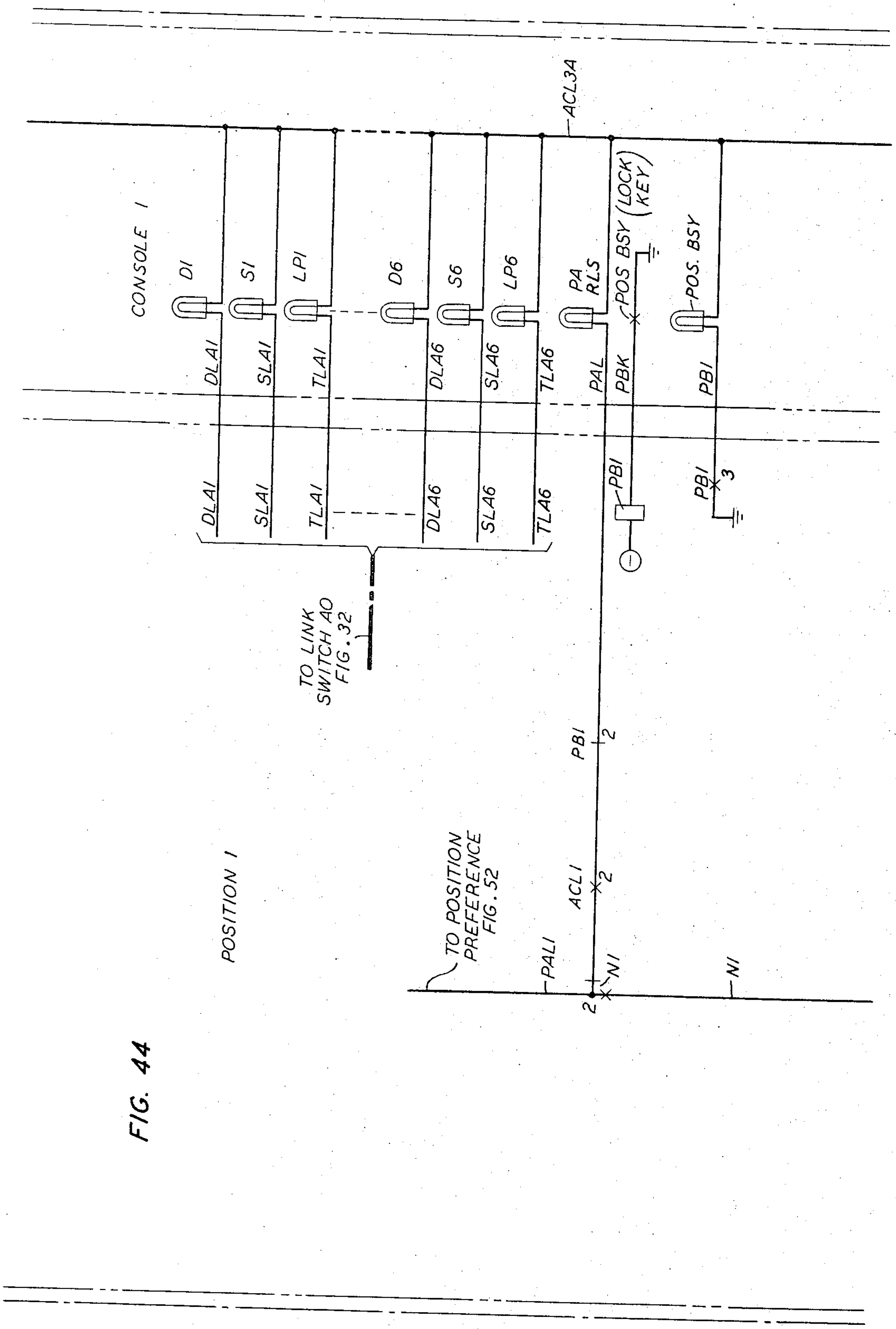

As will be recalled from previous description in connection with FIGS. 1C, the position-console No. 1 of FIGS. 41 through 45 is associated with the first six verticals of the crossbar A switches, namely, verticals 0 through 5 corresponding respectively to the hold magnets HMA00 through HMA05 of switch A0 of FIG. 32: similarly, the position-console No. 2 of FIGS. 46 through 49 is associated with the last four verticals on the A switches and the first two verticals on the B switches, namely, hold magnets HMA06 through HMA09 of switch A0 in FIGS. 32 and 37 and hold magnets HMB00 and HMB01 of B0 switch of FIG. 37: similarly, the position-console No. 3 of FIGS. 50 and 51 is associated with the remaining six verticals of the B switches corresponding individually to hold magnets HMB02 thorugh HMB07 of the switch B0 of FIG. 37. With respect to position-console No. 1, it will be noted in FIG. 43 that there are six loop keys under the control of the attendant whereby the attendant may connect her telephone circuit to any one of the six loops corresponding to the six loop circuits designated for this particular position-console on the first six verticals of the A crossbar switches of FIGS. 28 through 32. In FIG. 44 will be seen six sets of display lamps, namely, lamps D1 through D6, S1 through S6 and LP1 through LP6, representing a set of three lamps for each of the six loop circuits between the position-console No. 1 of FIGS. 41 through 45 and the corresponding six verticals of the A crossbar switches. Similarly, in FIG. 41 will be seen six leads designated TKA1 through TKA6, each lead controlled by its respective loop key and each of the six leads in turn corresponding to one of the six verticals of the A crossbar switches.

Briefly, whenever one of the trunk circuits of FIGS. 15 through 23 is in a calling condition and when the position-console No. 1 of FIGS. 41 through 45 has been attended, the control circuits of the link will pick an idle one of the six loop circuits pertaining to this position-console No. 1 and will complete a connection over the A crossbar switches of FIGS. 28 through 32 and light one of the lamps of FIG. 44 as an indication to the attendant that a trunk is in a calling condition and is connected through the crossbar switch network of FIGS. 28 through 32 to one of the six loop circuits appearing before the loop keys at the attendant console. Thereupon, the attendant, by operating the associated loop key, will cause the operation in the calling trunk circuit, such as the DID trunk of FIG. 15, of the associated connector relay such as relay ACA149 in FIG. 15, thereby to complete a considerable number of additional circuit connections between the calling trunk and the attendant position over make contacts of this connector relay ACA149. After the attendant at position-console No. 1 has finished with whatever operations are required in answer to the calling condition on the trunk, she may release from connection with that trunk by operating another loop key of FIG. 43 or by operating the position release key PA RLS of FIG. 42, thereby releasing the connector relay ACA149 of FIG. 15 to open the large number of leads between the trunk and the console and leave release of the crossbar switch connection of FIGS. 28 through 32 (to release the few control leads extending between the trunk and the console over this crossbar switch network) under the control of the trunk supervisory circuit responsive to called answer. On the other hand, if the attendant wishes to place the trunk circuit in a hold condition, as will be described in detail hereinafter, a hold relay in the trunk circuit, such as relay HLD49 of FIG. 15 will be operated, followed by the operation of another loop key in the position circuit of FIG. 43. This operation will release the large relay connector ACA149 in the trunk circuit but will maintain the few control leads existing through the crossbar switch network of FIGS. 28 through 32 between the trunk circuit and the attendant so that the attendant may re-enter his connection if desired.

Figure 41:
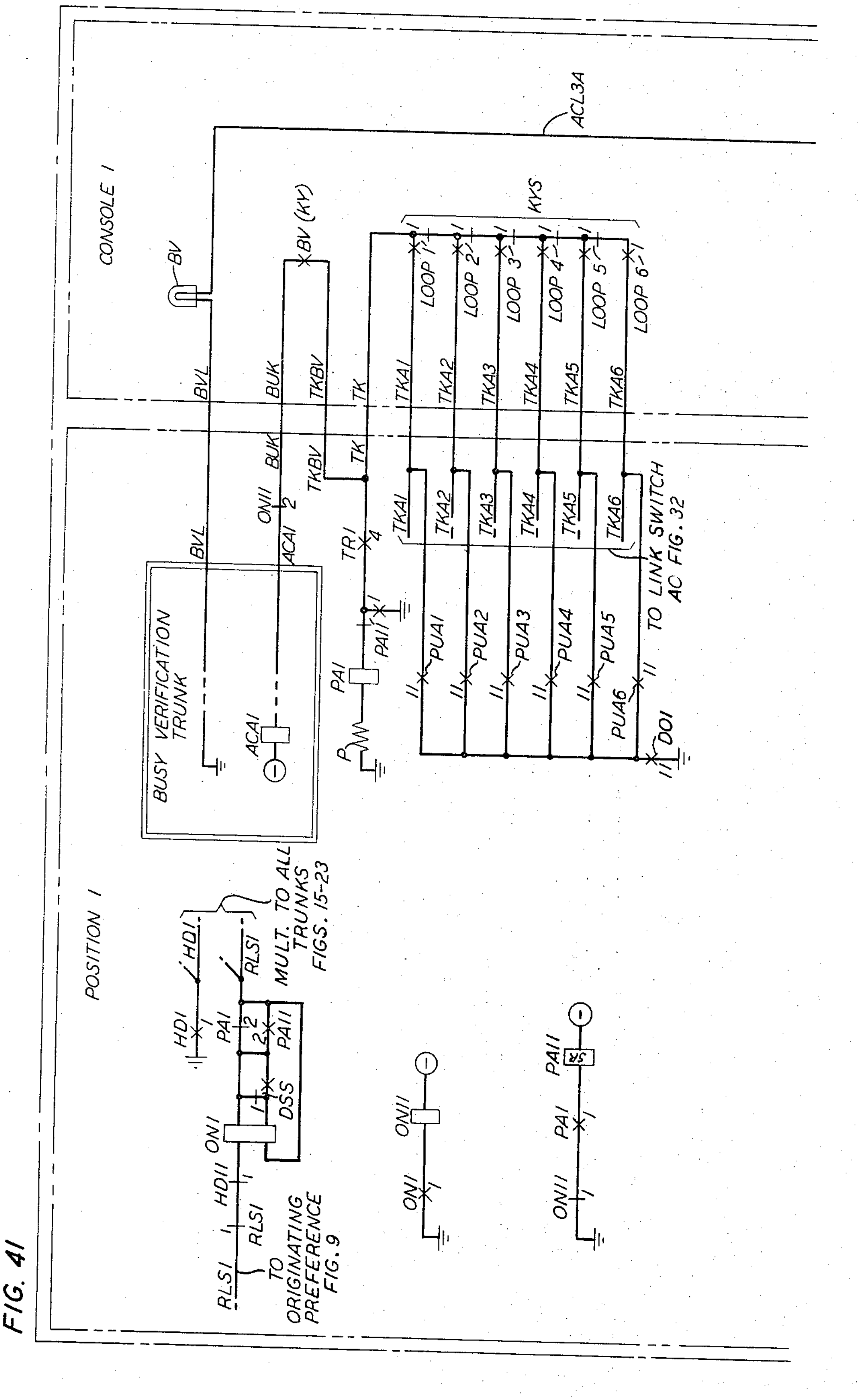

The type of controls available on the attendant console, as shown in FIG. 1A, are briefly described as follows with respect to their general functioning. The six loop keys, contacts of which are shown in FIGS. 41 and 43, are illustrated on the left-hand side of the console of FIG. 1A and are designated LP1 through LP6: the loop key is a non-locking illuminated push key and is used to connect the attendant to one of the six loop circuits to answer or to place a call: if a split condition exists in the trunk circuit when the key is operated the split condition is removed: the key houses the LP1 through LP6 lamps disclosed in FIG. 44. Just to the right in FIG. 1A of the loop keys is shown a vertical row of six lamps which are the S1 through S6 source lamps of FIG. 44. Just to the right of the source lamps S1 through S6 is a vertical row of six destination lamps designated lamps D1 through D6 of FIG. 44. Just to the right of the destination lamps in FIG. 1A is a vertical row of keys describable briefly as follows: the top key is a position busy (POS BSY) key which is a locking illuminated turn key which, when operated, makes the position busy to all new calls but not to recall conditions, the key housing the position busy lamp POS BSY lamp shown in FIG. 44; the next key is the busy verification BV key which is a non-locking, illuminated push key for allowing the attendant to dial and to connect to a busy line (via the busy verification trunk indicated in FIG. 41) whereby the marker circuit of the PBX may override a busy condition, this control being used only on position-console No. 1 and housing the busy verification BV lamp shown in FIG. 41; the next key position is not used; the next key position is the release destination RLS DEST key which is a non-locking push key for releasing the destination end of a trunk call when desired; the next key is the hold key HOLD which is a non-locking push key for holding the call at the loop but releasing the attendant's telephone set, creating a circumstance whereby the attendant equipment is busy to new calls but is capable of accepting recalls and whereunder the attendant can originate calls; the last key is a position release (PA RLS) key which is a non-locking, illuminated key housing the PA RLS lamp of FIG. 44 and used to release the attendant's telephone from the loop, the lamp showing an idle but attended console. Immediately to the right of the last-described row of keys is the well-known TOUCH-TONE calling keyset which can be used by the attendant for dialing calls if desired. Immediately beneath the TOUCH-TONE keyset is the start key START which is a non-locking push key for signaling the marker circuit of the PBX to connect an idle originating register to the loop in use. Immediately above the TOUCH-TONE calling keyset are two controls and three lamps, the left-hand control BZ ON being a locking turn key for on/off control of audible signals at the console, the right-hand control BZ VOL being a variable volume control for audible signals, the left-hand lamp being a calls waiting lamp CW which lights when a call is waiting to be answered and all positions are busy and which remains lighted until a position becomes idle or until the calling party disconnects, the middle lamp being a ready lamp RDY which lights when a register circuit is connected and remains lighted until the register releases, and the right-hand lamp being a fuse alarm lamp FA which lights when any fuse in the PBX system fails. The last column of keys on the right-hand side of the console from top to bottom includes a locking, illuminated turn key NITE housing the NITE lamp shown in FIG. 45 with respect to position-console No. 1 only and this key permits the attendant to set up flexible night connections, a signal destination SIG DEST non-locking push key for starting machine ringing or starting ringing as long as the key is depressed or flashing the destination by key operations, a signal source SIG SRC non-locking push key for accomplishing the same operations as the signal destination key but with respect to the source, a release source RLS SRC non-locking push key for releasing the source of a call, the exclude destination EXCL DEST non-locking, illuminated push key housing the EXCL DEST lamp shown in FIG. 43 and permitting the attendant to place the destination of a call on hold and connect the attendant to the source, and an exclude source EXCL SRC non-locking illuminated push key housing the EXCL SRC lamp of FIG. 43 and permitting the attendant to place the source of the call on hold and connect the attendant to the destination. As indicated in FIGS. 41 through 45, all of the keys under the control of the attendant are non-locking keys unless otherwise indicated. Subsequent detailed description will indicate more clearly the circuit operations controlled by these various console controls.

Again, it is to be pointed out that the position-console No. 1 of FIGS. 41 through 45 includes the busy verification and night connection features which are not included in the position-consoles Nos. 2 and 3 of FIGS. 46 through 51: otherwise, these three consoles are the same; and, position-consoles 2 and 3 of respective FIGS 46 through 49 and 50 through 51 are for all intents and purposes identical.

CONTROL CIRCUITS (FIGS. 2 TO 14, 24 TO 27, 38 TO 40, 52 & 53)

Figure 5:
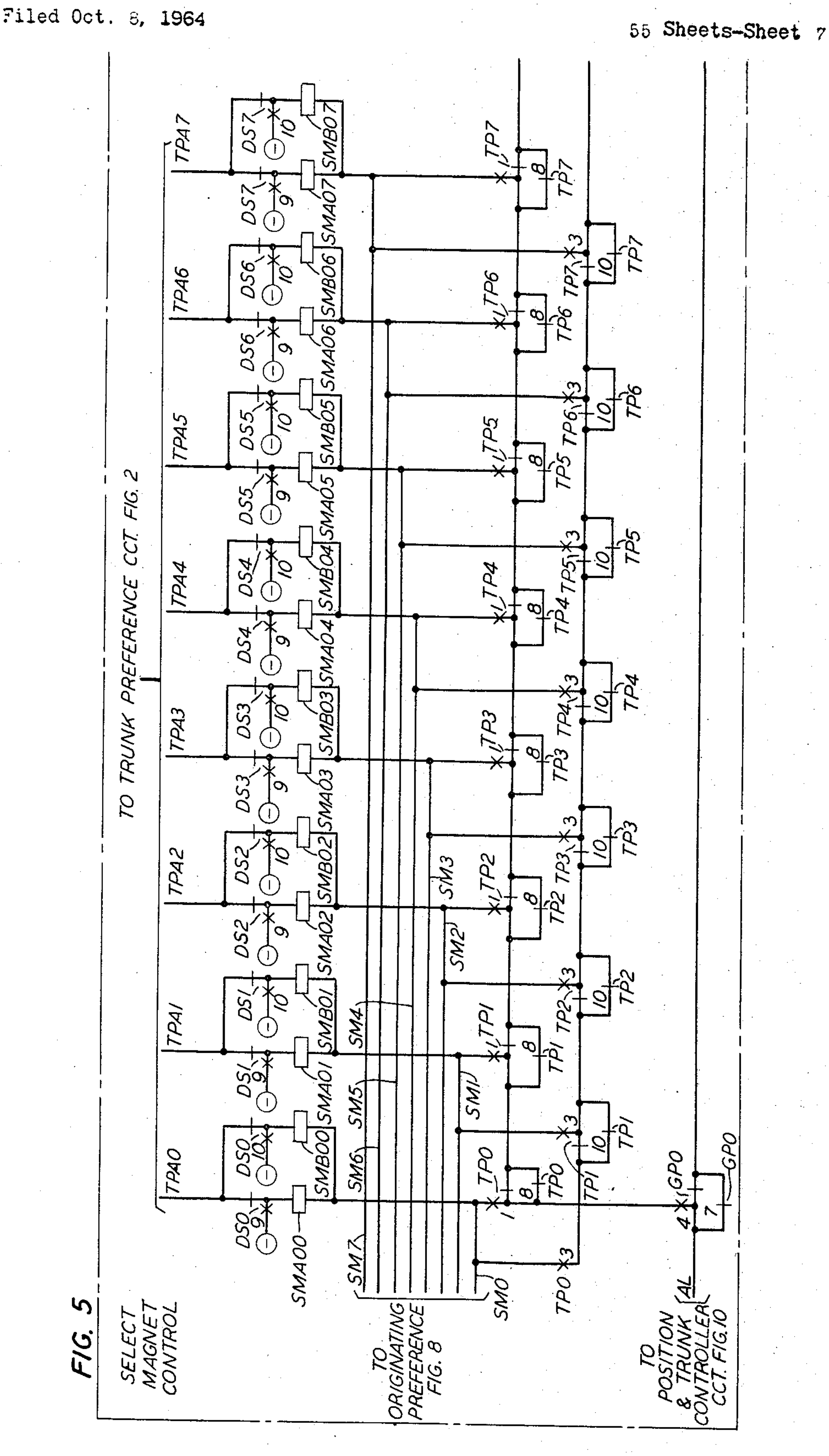
Figure 6:
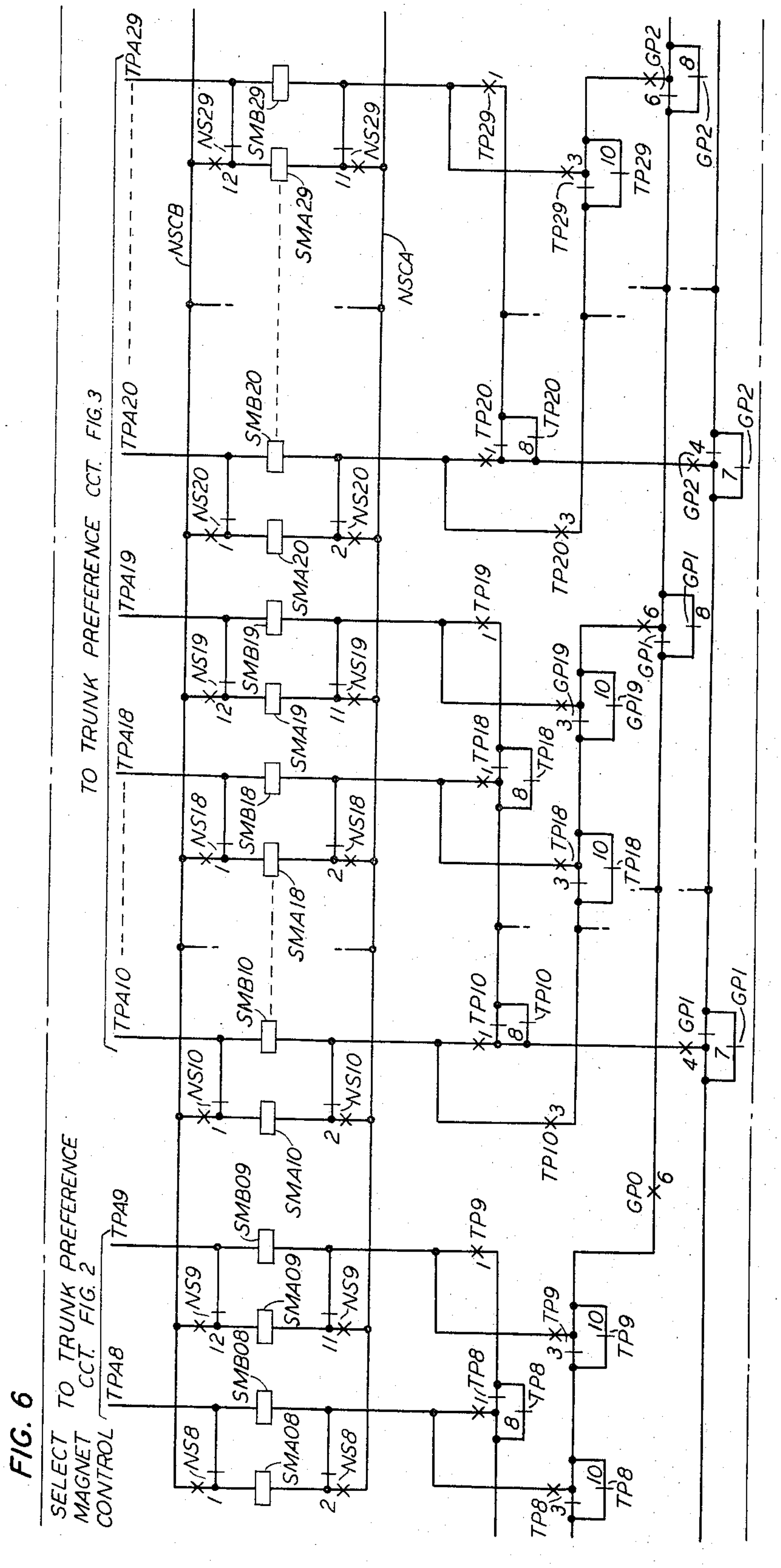
Figure 7:
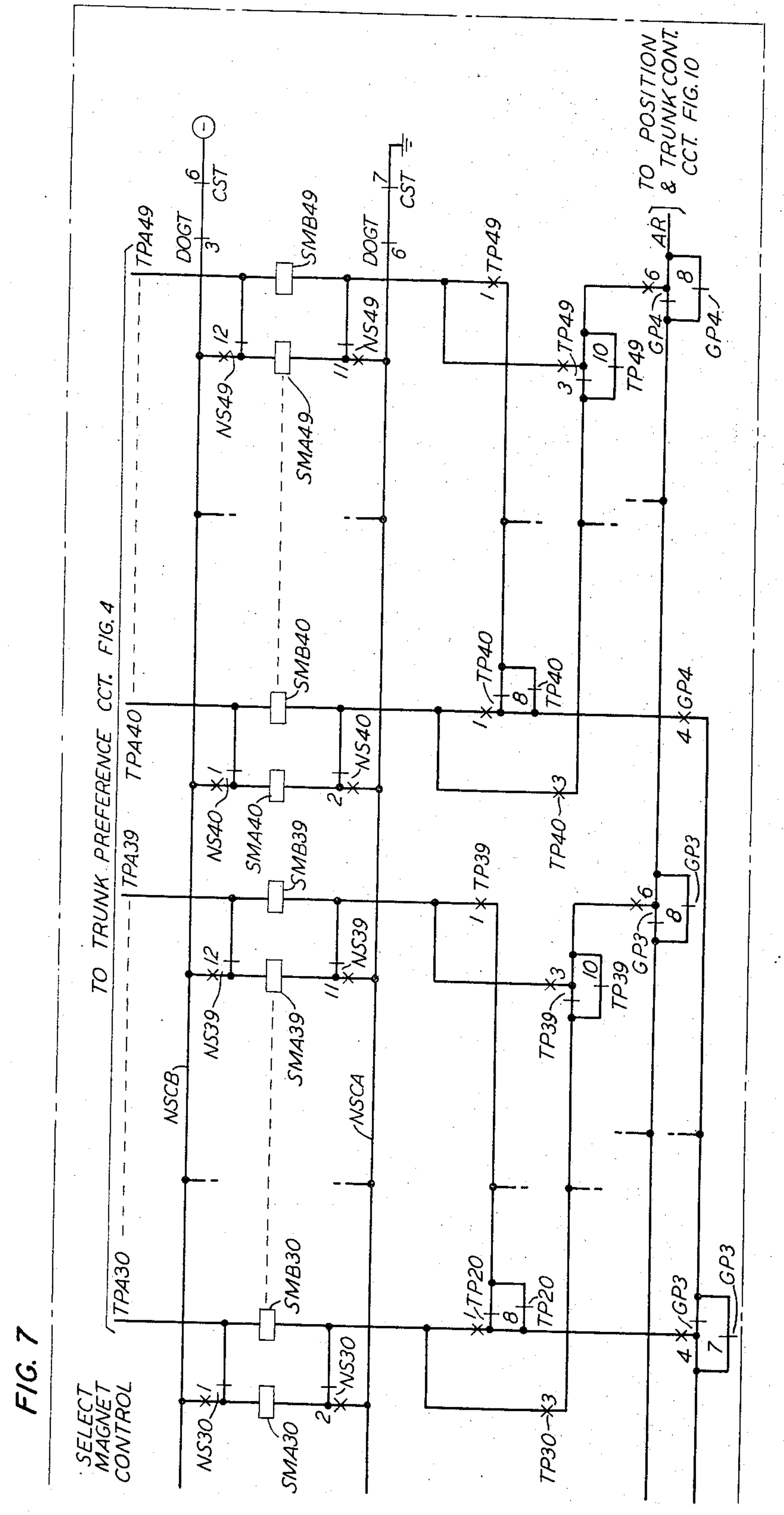
Figure 8:
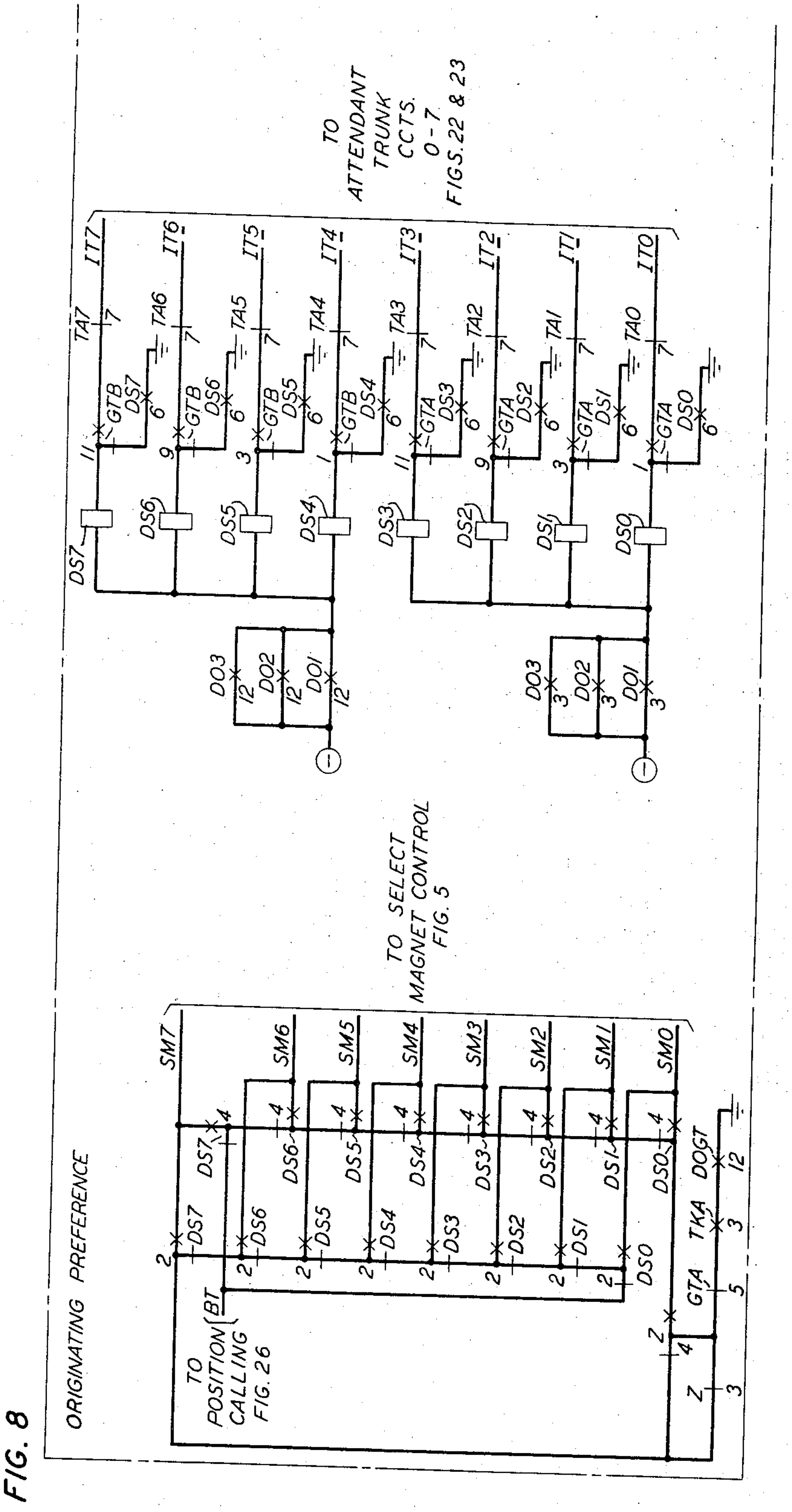
Figure 9:
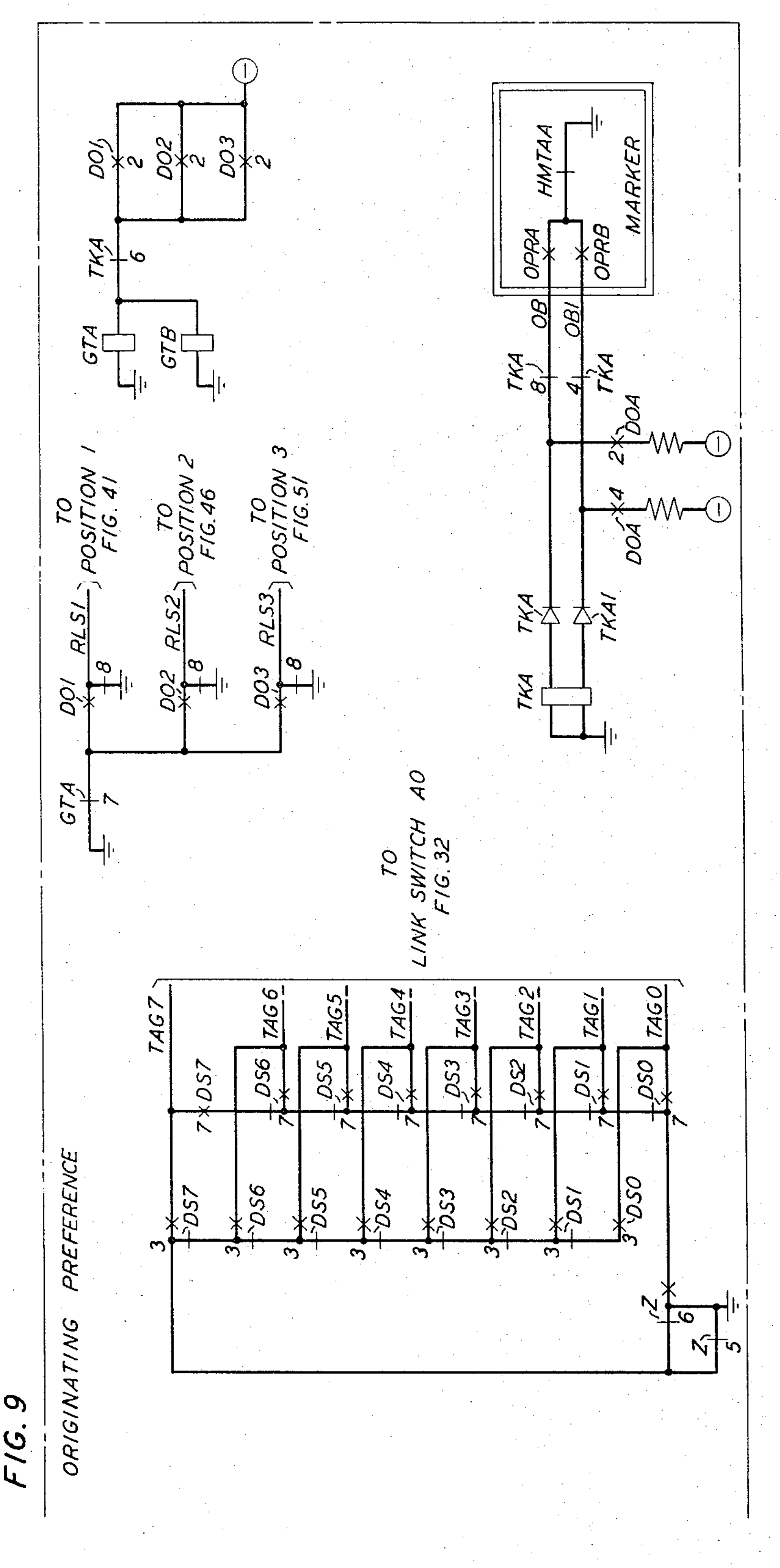
Figure 10:
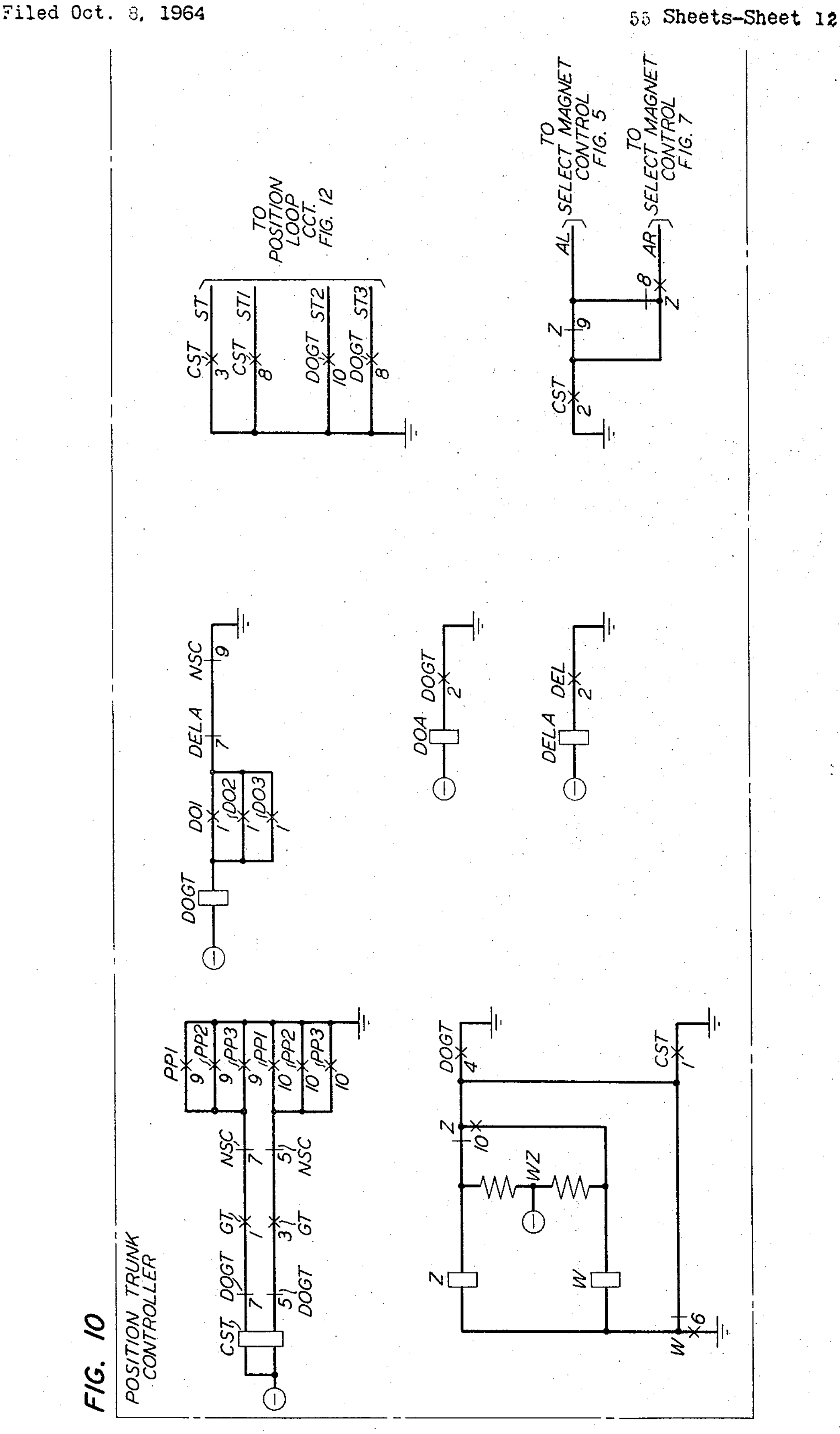
Figure 11:
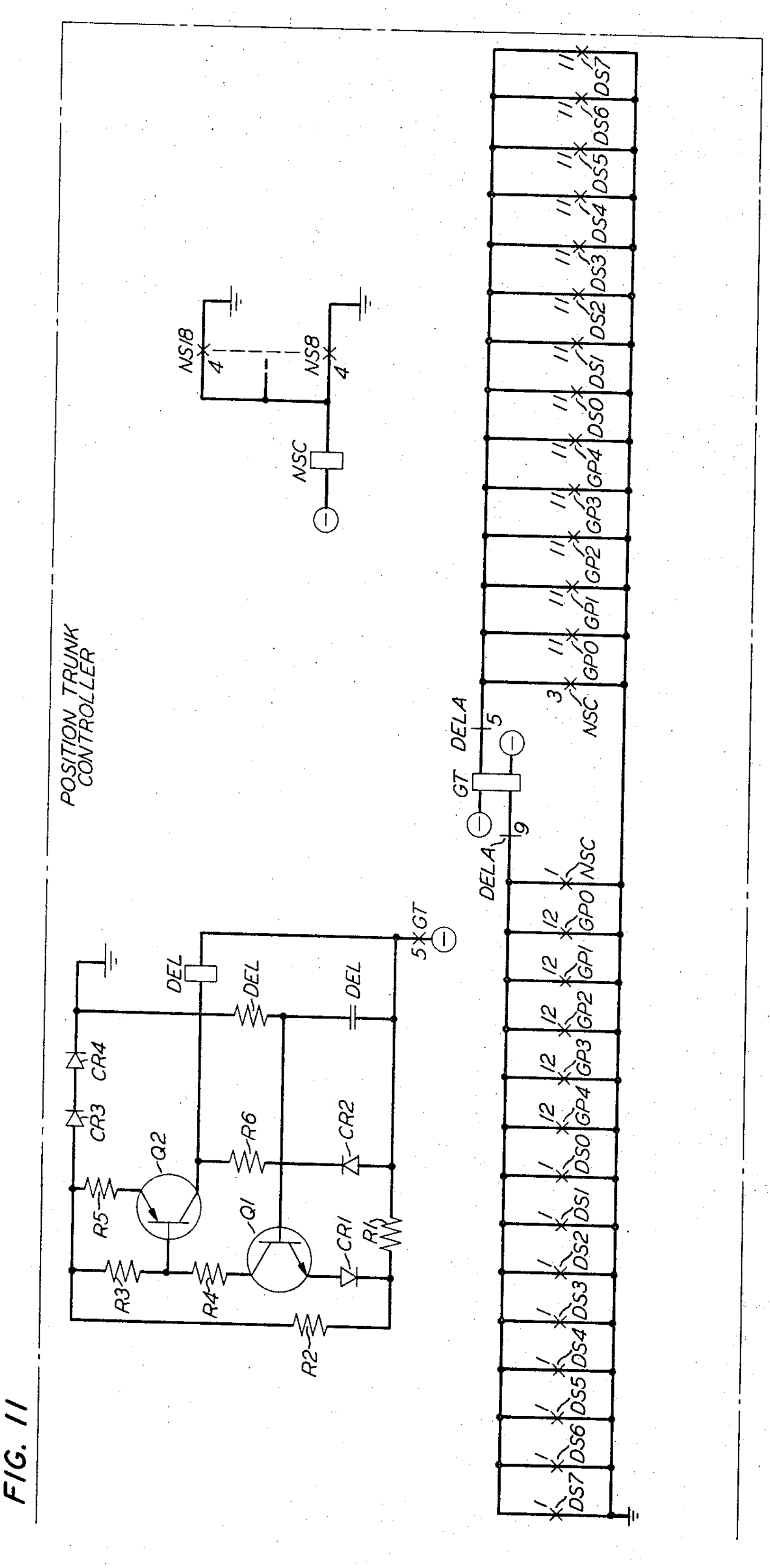
Figure 12:
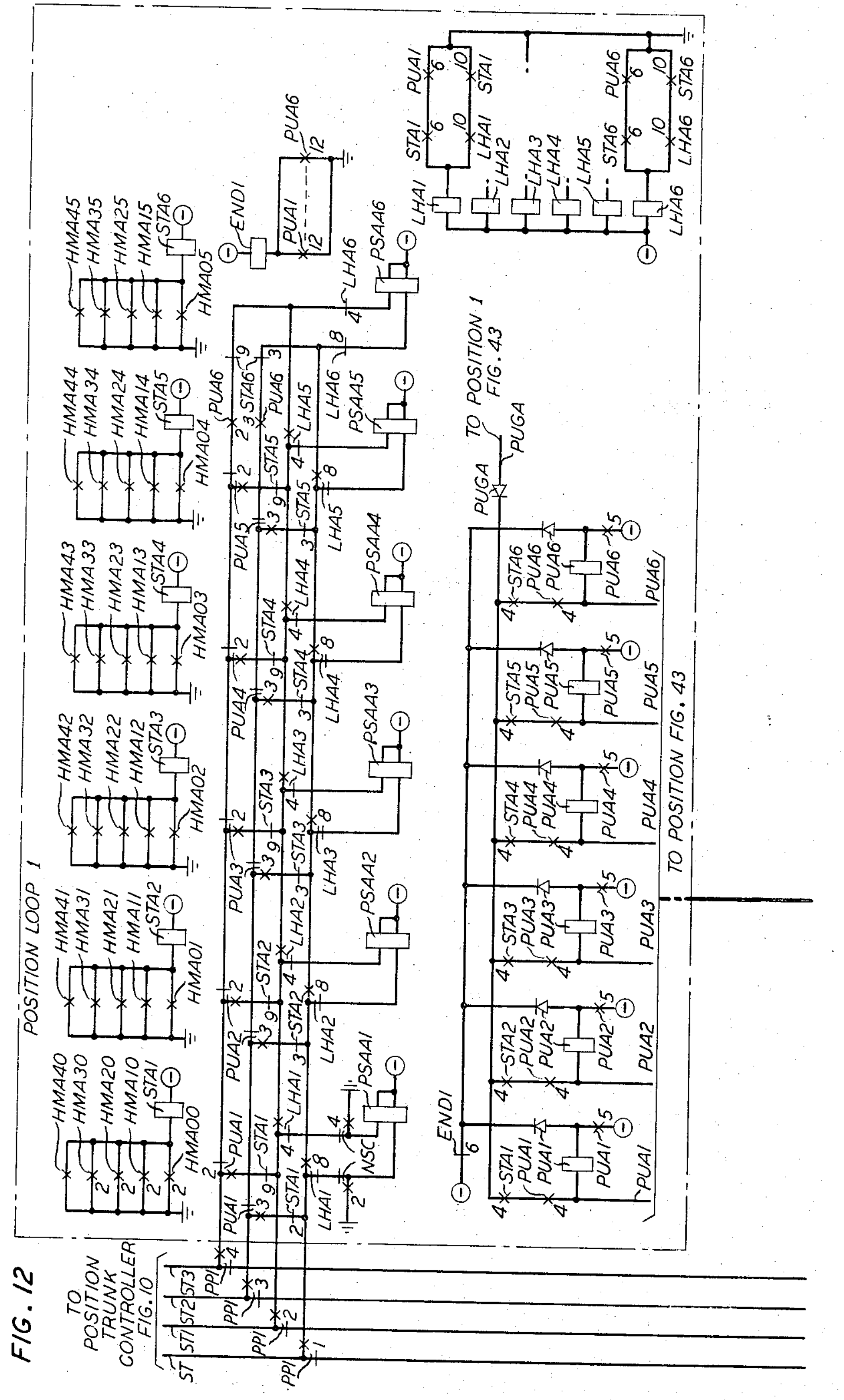
Figure 13:
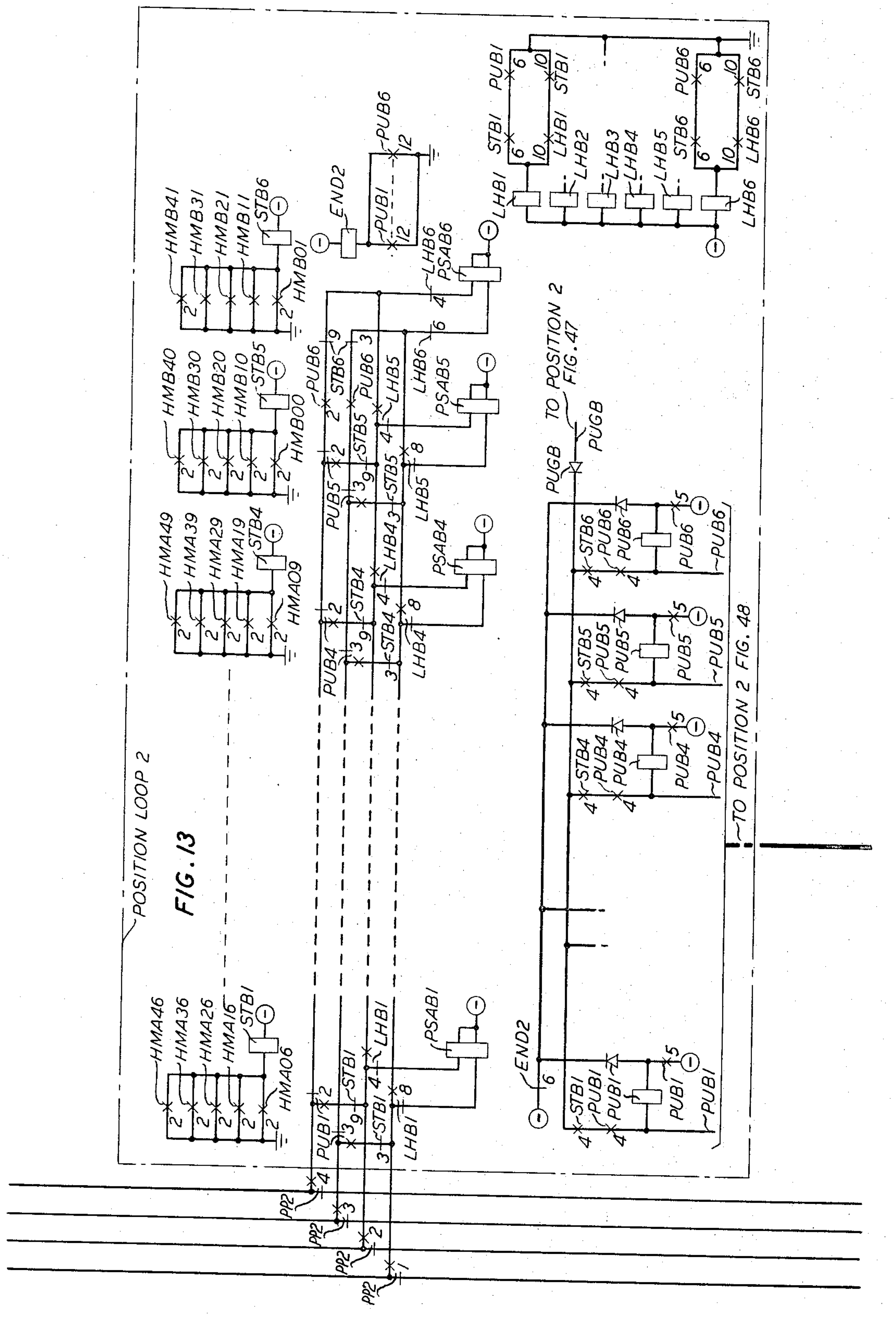
Figure 14:
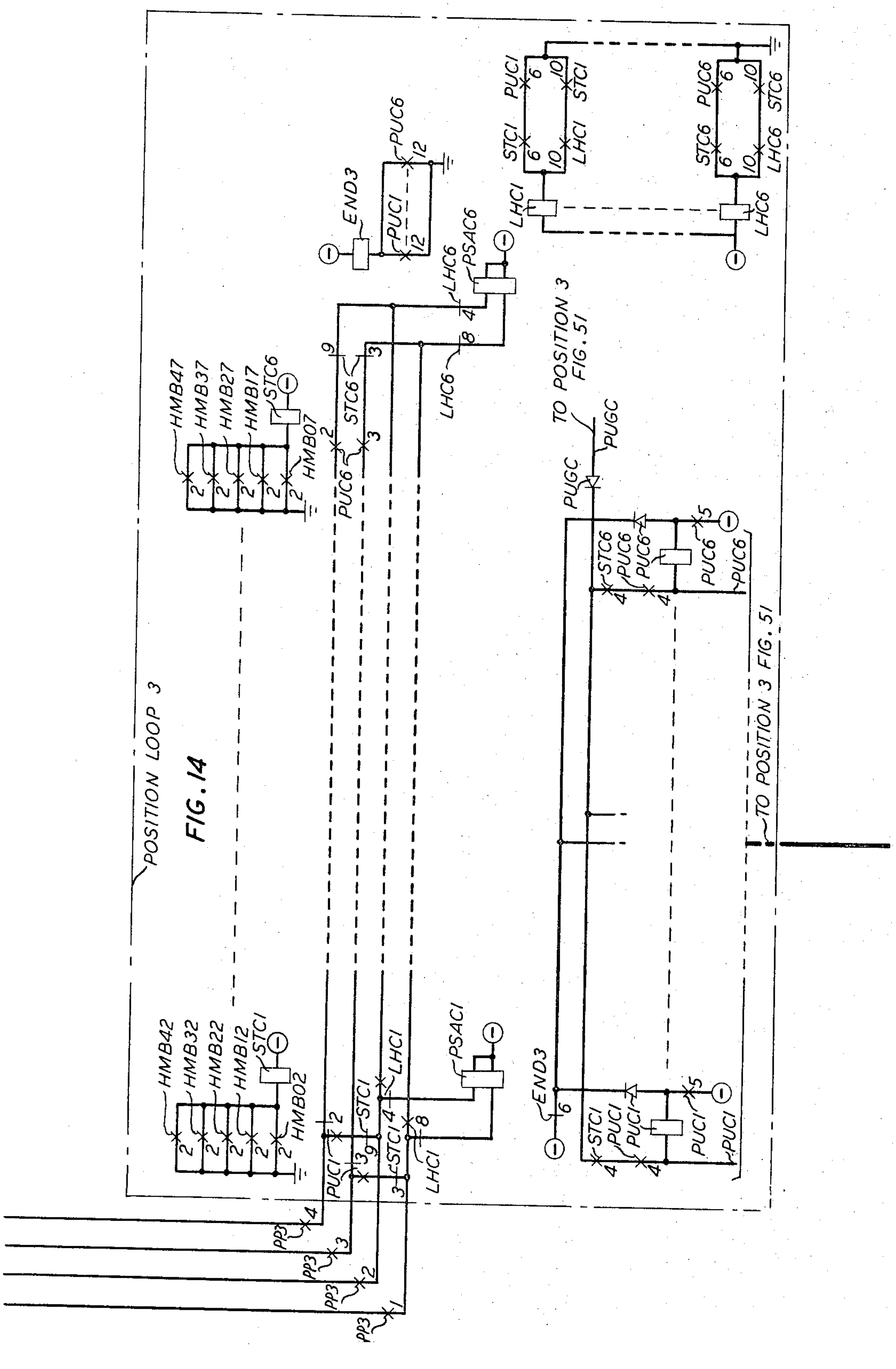
Figure 24:
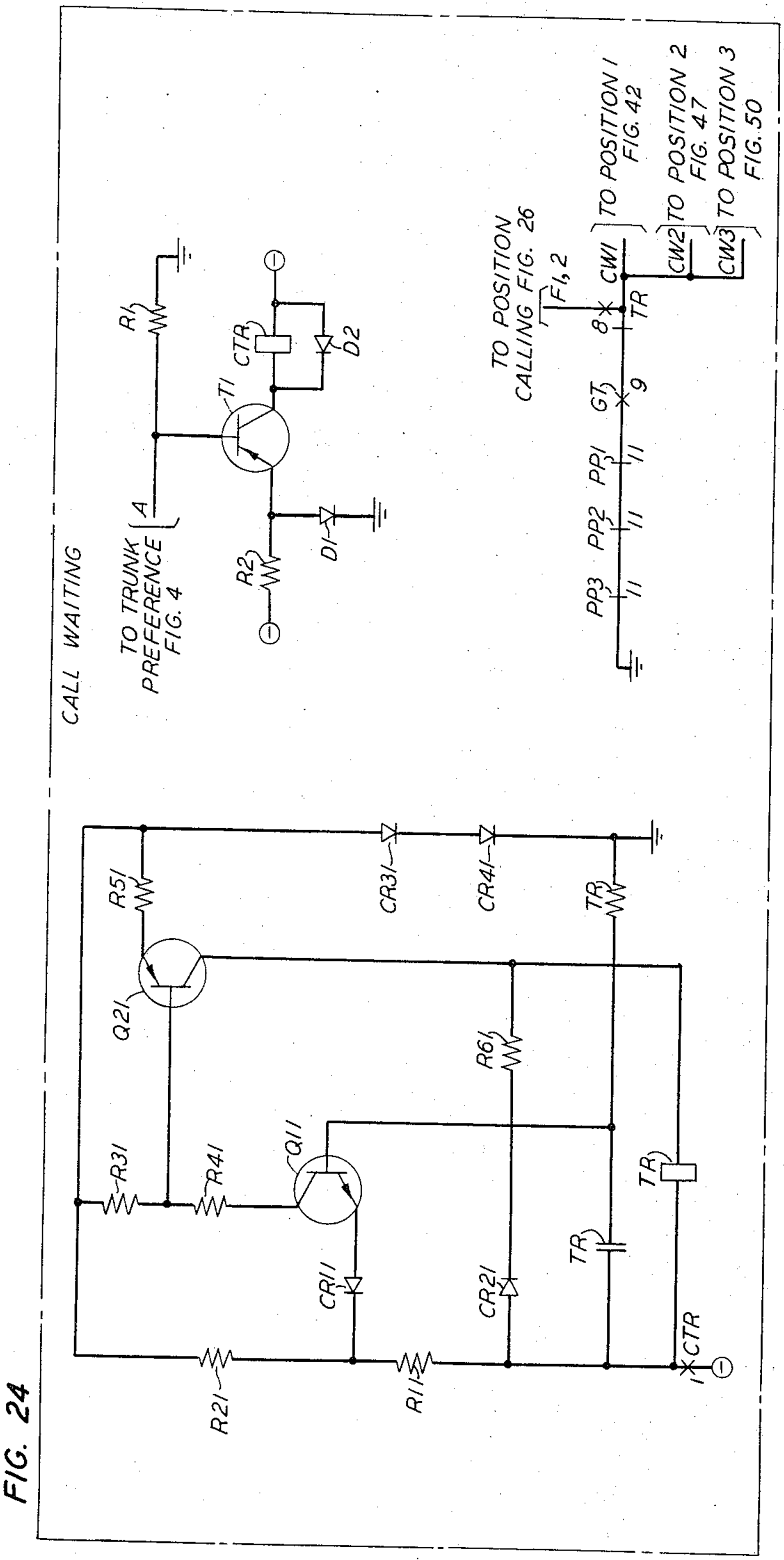
Figure 52:
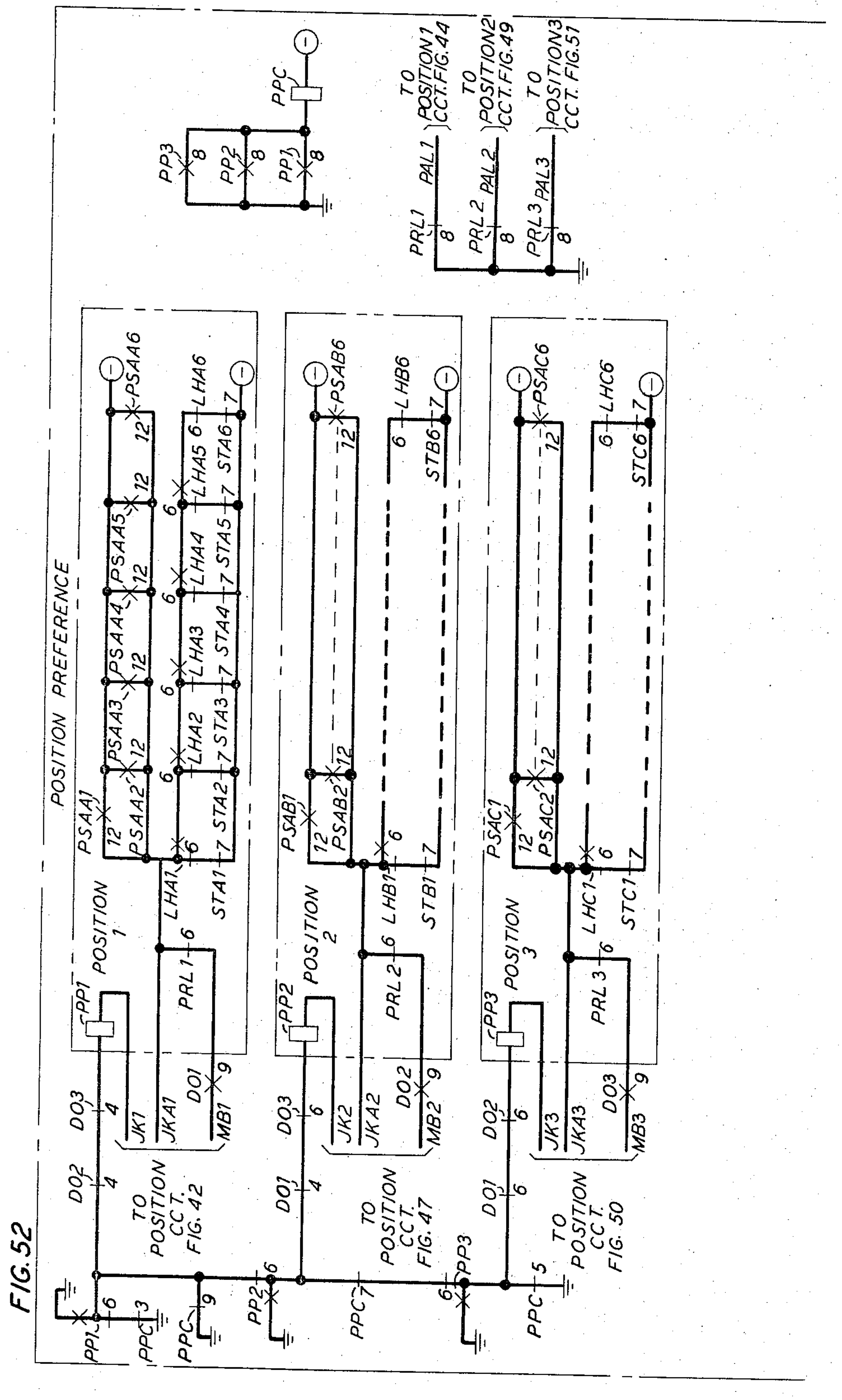

The major subdivisions of the control circuits for controlling the link circuit embodying the present invention, in addition to the trunk circuits of FIGS. 15 through 23 and the position-consoles of FIGS. 41 through 51, consist of the Select Magnet control circuit of FIGS. 5 to 7, the Hold Magnet control circuit of FIGS. 38 to 40, the Trunk Preference circuit of FIGS. 2 to 4, the Originating Preference (also Attendant Originating) circuit of FIGS. 8 and 9, the Position Trunk Controller circuit of FIGS. 10 and 11, the Position Loop circuits of FIGS. 12, 13 and 14, the Position Preference (also Position Preference Control and Position Release) circuit of FIGS. 52 and 53, the Position Calling circuit of FIGS. 25 to 27, and the Calls Waiting circuit of FIG. 24.

The Select Magnet control circuitry of FIGS. 5, 6 and 7 comprises the circuits for causing the operation of the fifty select magnets on switches A0 through A4 of FIGS. 28 through 32 and the fifty select magnets on switches B0 through B4 of FIGS. 33 through 37, these pairs of fifty select magnets corresponding respectively to the fifty trunk circuits of FIGS. 15 through 23 terminating on the corresponding horizontals of the crossbar switch network.

The Hold Magnet control circuitry of FIGS. 38, 39 and 40 includes the circuitry for controlling the ninety hold magnets on the crossbar switches of FIGS. 28 through 37, there being eighteen hold magnets on switches A0 and B0, eighteen hold magnets on switches A1 and B1, et cetera, corresponding to the eighteen loop circuits terminating in six loop circuits per console as indicated generally in FIG. 1C.

The Trunk Preference circuit of FIGS. 2, 3 and 4 is arranged to serve fifty trunks through a lockout chain. Trunks within the chain are served one at a time and when competing will be served according to their position in the chain. A pulse divider circuit in the Position Trunk Controller circuit of FIG. 10 changes the order of preference during each operation by switching the operating ground for the select magnets of FIGS. 5 through 7 to the opposite end of the chain. Although more than one of the relays TP0 through TP49 of FIGS. 2, 3 and 4 may be operated at the same time due to the slight time lag in the circuitry of the gating relay GT, as will be described, the operation of the associated group relay GP0 through GP4 will permit only one of the select magnets of FIGS. 5 through 7 to be operated at a time, thereby establishing a preference among the fifty trunk circuits.

The Originating Preference circuit of FIGS. 8 and 9 includes those circuit details necessary for allowing an attendant at one of the position-consoles of FIGS. 41 through 51 to initiate an outgoing call via one of the attendant (ATT) trunks of FIGS. 22 and 23.

The Position Trunk Controller of FIGS. 10 and 11 includes common control relays and time delay circuitry for regulating the inward and outward traffic conditions within the link circuit.

In FIGS. 12, 13 and 14 are shown three Position Loop circuits, one for each of the three position-consoles of FIGS. 41 through 51. These position loop circuits provide means for steering incoming calls to an idle key in an idle position-console circuit. They also steer an idle attendant (ATT) trunk for an outgoing call to the particular position having the key depressed and to the particular key that has been depressed representing the outgoing calling condition of a particular position-console. The pickup relays, such as relays PUA1 through PUA6 in the position loop circuit No. 1 of FIG. 12, are arranged so that only one relay may be operated at a time: any relay already operated will be released by the operation of another key even though the position release key has not been operated. Loop hold relays such as relays LHA1 through LHA6 of FIG. 12 are provided to lock out the key position from subsequent calls until the trunk releases from the loop. The position select relays, such as relays PSAA1 through PSAA6 of FIG. 12, function to close an operating path for the hold magnets (FIGS. 38 to 40) in the link switch circuit of FIG. 28 through 37.

The Position Preference, Control and Position Release circuitry of FIGS. 52 and 53 controls the availability of the three console-positions to receive calls, controls the position availability lamp in the console, and functions to release the position preference relays when a call has entered the position loop circuit.

The Position Calling circuitry of FIGS. 25, 26 and 27 includes in FIGS. 26 and 27 a position calling circuit for each of the three position-consoles and in FIG. 25 a position calling circuit common to all three of the position-consoles. This circuitry provides means for overriding the Position Preference circuit of FIGS. 52 and 53 when an attendant wishes to place an outgoing call. The circuitry also functions to return busy tone to an attendant under such circumstances as when all of the attendant trunks of FIGS. 22 and 23 may be busy at such time as an attendant might be attempting to place an outgoing call.

The Calls Waiting circuitry of FIG. 24 is used to alert the attendant that calls are waiting to be served. If one call is waiting, the circuit causes the call waiting lamp in the attendant consoles, such as the CW lamp of FIG. 42, to light steadily; whereas, if two or more calls are waiting, the circuit of FIG. 24 causes the call waiting CW lamp in the console to flash at a 60 i.p.m. (interruptions per minute) rate.

DETAILED DESCRIPTION

The following detailed description is arranged as follows:

Calling Conditions of Trunks
Making Consoles Available
Attendant Trunk Call to Attendant:
- Trunk Enters Trunk Preference Gate
- Inward-Outward Traffic Regulation
- Selecting an Idle Position Loop
- Select and Hold Magnet Control
- Calling Condition at Position Loop
- Attendant Connects to Trunk Via Loop
- Attendant Functions
- Trunk Releases Loop
- Attendant Holds Loop Other Trunk Calls to Attendant
Attendant Initiated Call:
- Attendant Connects to Loop
- Inward-Outward Traffic Regulation
- Selecting an Idle Attendant Trunk
- Steering to Connected Loop
- Select and Hold Magnet Control
- Completed Loop Connection
- Release of Loop Connection Miscellaneous Functions:
- All Attendant Trunks Busy
- Timed Release—Incoming Call
- Timed Release—Attendant Call
- Calls Waiting
- Position Make-Busy
- Night Connections

*Calling conditions of trunks*

It will be recalled from previous description that any one of the fifty trunk circuits shown in FIGS. 15 through 23 has access one way or the other to any one of the three consoles of FIGS. 41 through 51 through the crossbar switch network arrangement of FIGS. 28 through 37. It will also be recalled that inward traffic from trunks to consoles is the only kind of traffic permitted with respect to the Direct Inward Dialing trunks (DID) of FIGS. 15, 16 and 17, the Tie trunks (TIE) of FIGS. 17, 18 and 19 and the Central Office trunks (CO) of FIGS. 19, 20 and 21; whereas, both inward and outward traffic is permissible with respect to the Attendant trunks (ATT) of FIGS. 22 and 23. In regard to the latter remark concerning inward and outward traffic, whenever the expression "inward" traffic is used it means that one of the trunk circuits is attempting to call one of the attendants at one of the consoles, and whenever the expression "outward" traffic is used it means that one of the attendants at one of the consoles is attempting to call one of the trunk circuits.

The calling condition of a trunk is represented generally by the application of negative battery to its corresponding trunk preference lead. For instance, in the DID trunk of FIG. 15 the calling condition thereof would be represented by negative battery being applied to conductor TP49 extending to the crossbar switch A4 of FIG. 28. Likewise, the calling condition of a TIE trunk, such as the one shown in FIG. 18, is represented by the application of negative battery to its conductor TP20 extending to switch A2 of FIG. 30; the calling condition of a CO trunk, such as the one shown in FIG. 21, is represented by the application of negative battery to its corresponding trunk preference conductor TP8 extending to switch A0 of FIG. 31; and, the calling condition of an ATT trunk, such as the one shown in FIG. 23, is represented by the application of negative battery to its corresponding trunk preference conductor TP0 extending to switch A0 of FIG. 32. This calling condition of a trunk circuit can come about in at least two different ways: the trunk circuit may be calling the attendant directly; or, an existing connection involving the particular trunk circuit may be attempting to recall an attendant for some supervisory or administrative purpose. Both of these calling conditions will be described immediately below with respect to each of the four types of trunk circuits in connection with the details thereof shown in FIGS. 15, 18, 21 and 23.

*Calling condition of DID trunk No. 49 of FIG. 15.*—The Direct Inward Dialing trunk No. 49 of FIG. 15 is a trunk circuit intended to handle direct inward dialing from a tandem switching center to a PBX station or to a PBX attendant. Only those circuit details are shown in FIG. 15 with respect to a known type of DID trunk as are necessary to an understanding of how the trunk calling condition is initiated and of how the attendant subsequently may make connection between the console and this trunk for control purposes. Upon the closing of the loop circuit from the tandem switching center to the PBX, circuits are brought into play for connecting this trunk circuit to a register, which in turn causes the operation of relay CO49 in a circuit extending from ground in the register in FIG. 15, through diode CO, break contact 3 of relay AC49, to battery through the winding of relay CO49. When inpulsing has been completed the register causes the operation of relay D49 in an obvious circuit shown in FIG. 15. Relay D49 remains operated as long as the calling party on the other end of the connection remains off hook. The register circuit thereupon calls in a marker circuit which will complete the call to the proper desired PBX termination. The desired termination may be either a PBX station if the inpulsed digits represent the PBX station directory number or a PBX attendant if the inpulsed digits represent the PBX directory number or an unassigned station number.

Completion of the DID trunk call to a particular PBX station results in the operation of certain relays which are not shown in FIG. 15, such as relays S49, SR149, SR249, and STA49, with relays CO49 and D49 operated as described immediately above. If the PBX station desires to call in a PBX attendant, manipulation of the switchhook will cause the momentary release of relay S49 (not shown). Upon the release of relay S49 (not shown), a circuit is completed in FIG. 15 for causing the operation of the slow-release relay F49 extending from ground, through break contact 2 of relay S49, through make contact 1 of relay SR249, to battery through the winding of relay F49. When relay S49 (not shown) reoperates, a circuit is completed for operating relay FF49 from ground in FIG. 15, through make contact 2 of relay S49, make contact 1 of relay F49, to battery through the winding of relay FF49, which thereupon locks in a circuit extending to ground through make contact 4 of relay FF49 and break contact 4 of relay AC49. The operation and locking of relay FF49 takes place before the slow-release relay F49 releases upon the reoperation of relay S49 (not shown). Relay FF49, in operating, completes a circuit in FIG. 15 for operating relay FF149 in a circuit extending from ground, through make contact 3 of relay FF49, to battery through the winding of relay FF149. Upon the operation of relay FF49 and the reoperation of relay S49 (not shown), relay OPR49 operates in a circuit extending from ground in FIG. 15, through make contact 3 of relay D49, through the winding of relay OPR49, to battery through make contact 2 of relay FF49 and make contact 1 of relay S49, relay OPR49 operating in this circuit and locking to battery through its own make contact 2 independently of the contacts of relays S49 and FF49. The operation of relay OPR49 causes the operation in FIG. 15 of relay OPA49 in an obvious circuit extending over make contact 1 of relay OPR49.

Figure 28:
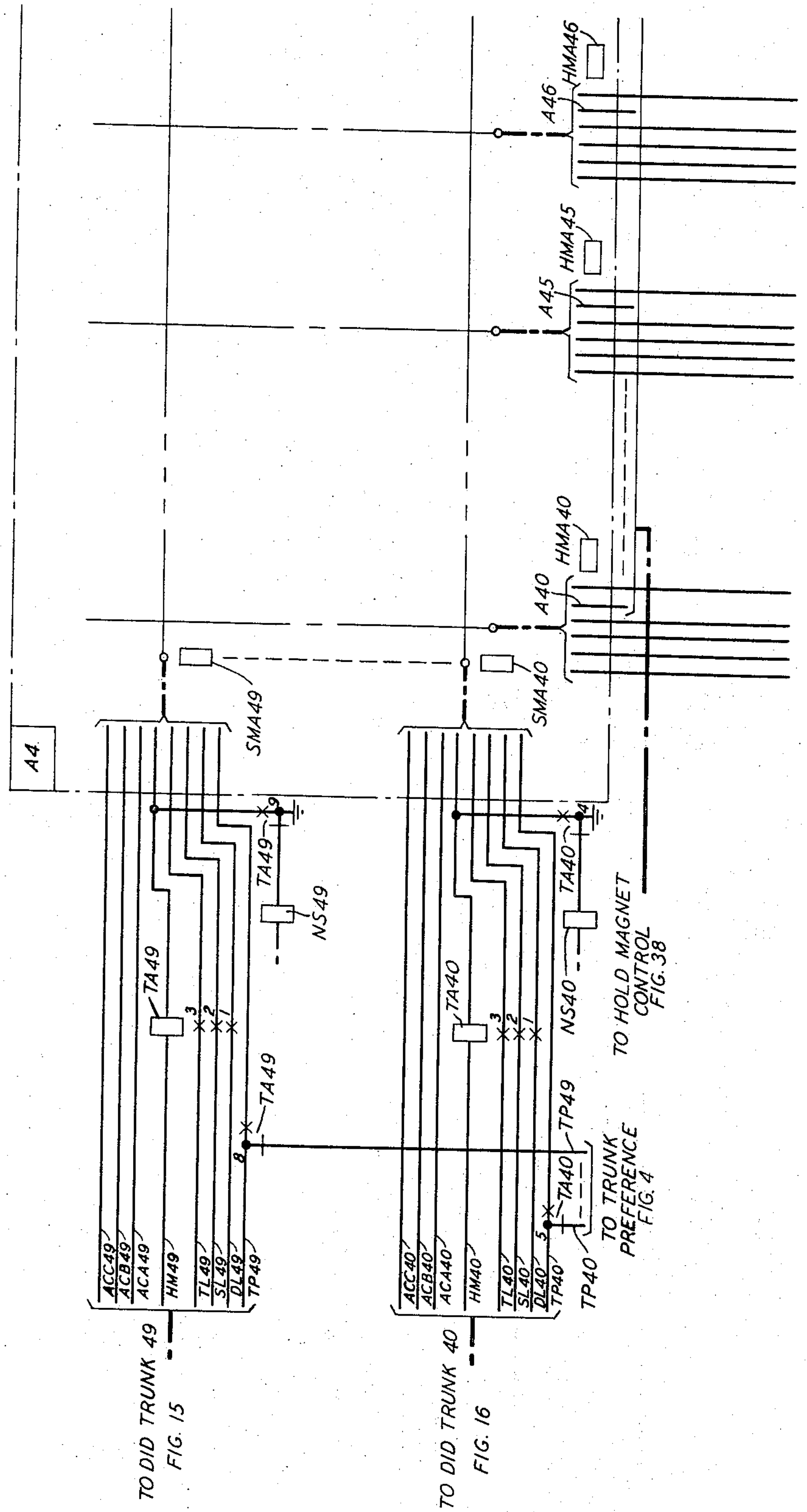
Figure 29:
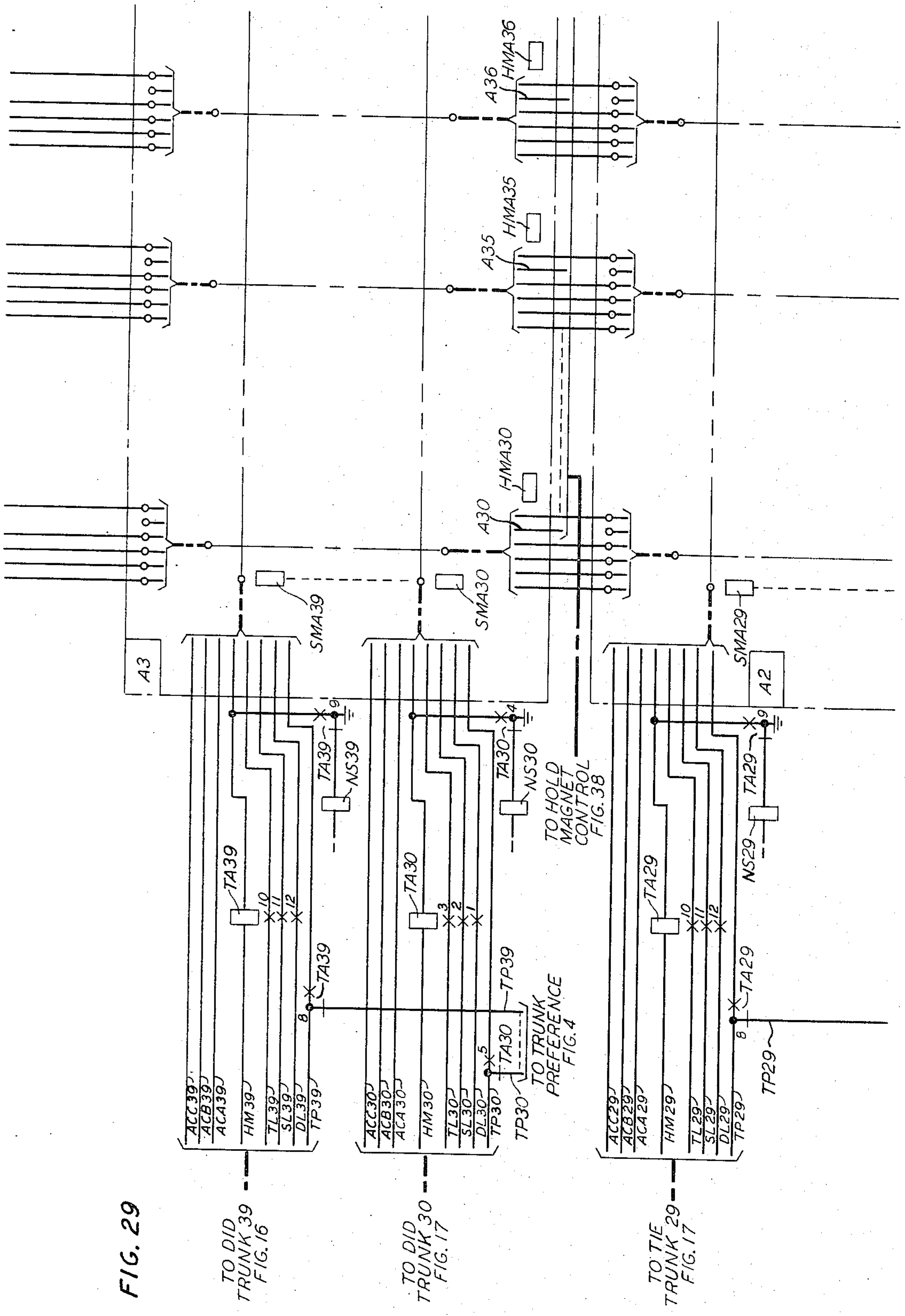
Figure 30:
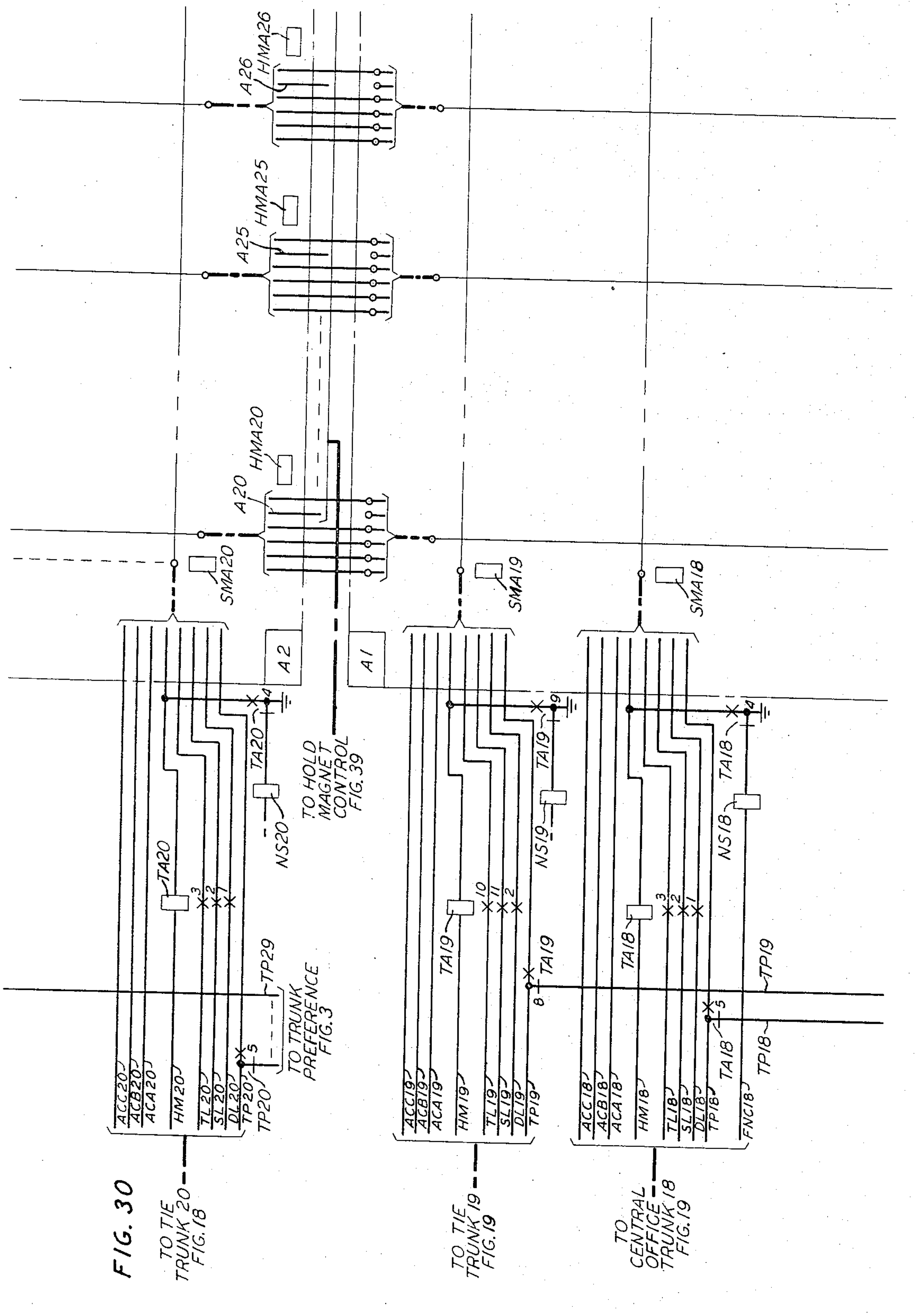

Upon the operation in FIG. 15 (as above described) of relays CO49, OPA49, FF49, STA49 (not shown), SR149 (not shown) and FF149, the following circuits are completed: negative battery is applied to the trunk preference lead TP49 through make contact 1 of relay CO49 and make contact 1 of relay OPA49; negative battery is applied to the hold magnet lead HM49 in a circuit extending through make contact 1 of relay FF49, make contact 1 of relay STA49 and break contact 1 of relay HLD49; and, negative battery is applied to the left-hand sides of the windings of connector relays ACA149, ACA249 and ACA349 through make contact 2 of relay OPA49 and make contact 1 of relay FF149. The application in FIG. 15 of negative battery to the trunk preference conductor TP49 extending to the crossbar switch A4 of FIG. 28 represents a calling condition of this particular DID trunk No. 49 of FIG. 15.

As will be seen from subsequent detailed description, when the PBX attendant connection is established, one of the connector relays ACA149 through ACA349 will be operated, such as connector ACA149 for position-console No. 1, and relays ACA49 and AC149 will be operated. The operation of relay AC49 releases relay CO49 to remove battery from the trunk preference conductor TP49. Operation of relay AC49 also releases relay FF49 which in turn releases relay FF149. Relay AC149, in operating, holds battery and ground on the winding of the operated connector ACA149. The operated relay AC49 holds battery on the hold magnet lead HM49. Relays D49, OPR49, OPA49, STA49 (not shown), SR149 (not shown), SR249 (not shown) and S49 (not shown) remain operated.

When the attendant releases from the connection, upon the operation of her release key, relays AC49, AC149 and ACA149 are released and battery is removed from the hold magnet lead HM49 leaving the trunk connected as it was before the recall, with the following relays in the operated condition—S49 (not shown), SR149 (not shown), SR249 (not shown), STA49 (not shown), CO49, D49, OPR49 and OPA49. Another recall would operate relay FF49 in the manner above described and the operation of relay FF49 would cause the reoperation of relay CO49 in a circuit extending from ground in FIG. 15, over make contact 2 of relay S49, through diode S, make contact 5 of relay FF49, break contact 2 of relay CO49, make contact 4 of relay D49, break contact 3 of relay AC49, to battery through the winding of relay CO49. The reoperation of relay CO49 would again cause the application to the trunk preference lead TP49 of negative battery representing a calling condition of the trunk circuit of FIG. 15.

If the impulsed digits over the DID trunk of FIG. 15 indicate that the proper PBX termination of this incoming call in the first instance should be to the attendant, relays CO49 and D49 of the incoming trunk circuit will be operated and the register will cause the operation of relay OPR49 in a circuit extending from battery in the register shown in FIG. 15, through diode OPR, through the winding of relay OPR49, to ground over make contact 3 of relay D49. Relays S49 (not shown), SR149 (not shown) and STA49 (not shown) will be released at this time. Relay OPR49 operates, locks over its own make contact 2, and causes the operation of relay OPA49 as above described. With relays CO49, OPA49 and D49 operated and relays S49, STA49 and SR149 released, three circuit conditions are established as follows: battery is applied to the trunk preference lead TP49 over make contacts 1 of relays CO49 and OPA49; battery is applied to the hold magnet lead HF49 over make contact 1 of relay D49 and break contacts 1 of relays STA49 and HLD49; and, battery is applied to the left sides of the windings of the connector relays ACA149, ACA249 and ACA349 over make contact 2 of relays OPA49 and break contact 1 of relay SR149. Again, as has been described above, when the PBX attendant connection is established, one of the connector relays ACA149, ACA249 and ACA349 will operate, such as relay ACA149 for position-console No. 1, and relays AC49 and AC149 will be operated. The operation of relay AC49 releases relay CO49 to remove battery from the trunk preference lead TP49. The operation of relay AC149 holds battery and ground on the winding of the operated connector relay ACA149 when relay SR149 subsequently operates due to the connection to the attendant telephone circuit. Relay AC49, in operating, holds battery over its make contact No. 1 to the hold magnet lead HM49. Relays D49, OPR49, OPA49, and SR149 (not shown) remain operated.

When the attendant has become connected to the trunk, she may dial into the PBX to complete the call to a station, whereupon relays STA49 (not shown) and CTD49 (not shown) will become operated. The attendant may then release from the connection, thereby causing the release of relays AC49 and AC149 and the release in turn of connector relay ACA149. Battery is maintained on the hold magnet lead HM49 through make contact 1 of relay CTD49 and make contact 1 of relay STA49 until the ringing-trip condition is caused by the answer of the PBX station, whereupon relay CTD49 will become released, removing battery from the hold magnet lead HM49 and thereby releasing the connection through the crossbar switch network to the attendant. An attendant recall condition can be effected by the operation of relay FF49 as has been described hereinbefore, thereby causing the reoperation of relay CO49 to again cause battery to be applied to the hold magnet HM49 and to the trunk preference lead TP49.

At any time during the above circuit conditions when a PBX attendant is connected to the trunk circuit, she can place a hold condition on the connection by causing a momentary key operation which will cause the operation of relay HLD49 in FIG. 15, followed by the release of relays AC49 and AC149. Relay HLD49, in operating, locks in a circuit extending from ground in FIG. 15, over break contact 2 of relay AC49, its own make contact 2, and make contact 2 of relay D49. Upon the release of the connector ACA149, the attendant is disconnected from the trunk circuit, except that the control leads extending between the trunk circuit of FIG. 15 and the attendant position will still be maintained through the crossbar switch network of FIGS. 28 through 37 by virtue of the fact that the hold magnet lead HM49 still has battery maintained thereon over make contact 1 of the hold relay HLD49. In order for the attendant to release completely from a held-trunk condition, she must re-enter the trunk by reoperating a pickup key associated with this particular trunk to thereby reoperate relays AC49 and AC149, releasing the hold relay HLD49, and then operating the release key in her position-console to in turn release relays AC49 and AC149 to completely divorce the connection between the trunk circuit and the position-console.

*Calling condition of tie trunk No. 20 of FIG. 18.*—As has been indicated previously, any call incoming to the PBX over a TIE trunk is answered by a PBX attendant and any outgoing call from a PBX to this TIE trunk may be dial-selected by a PBX station, by another dial tie trunk or by the attendant through the use of an attendant trunk, such as one of those shown in FIGS. 22 and 23. To illustrate the calling condition of a TIE trunk, it will be assumed that the TIE trunk No. 20 of FIG. 18 extends between the instant PBX and a remote PBX and that a ringing condition has been transmitted to this trunk circuit from the remote PBX, thereby causing the operation in FIG. 18 of the ringing relay R20 (not shown), which relay will remain operated as long as the ringing signal is present. Upon the operation of relay R20 (not shown), relay R120 operates in an obvious circuit over make contact 1 of relay R20 and locks in a circuit extending over its own make contact 1, break contact 1 of relay S120, to ground over break contact 1 of relay AC120. Relay R120 will remain operated when the ringing relay R20 (not shown) releases at the end of the ringing signal. With relay R120 operated, three circuit conditions are established as follows: negative battery is applied to the trunk preference lead TP20 in a circuit extending over make contact 3 of relay R120 and break contact 2 of relay S120; negative battery is applied to the hold magnet lead HM20 over make contact 3 of relay R120; and, negative battery is applied to the left-hand sides of the windings of the connector relays ACA120, ACA220 and ACA320 in a circuit extending over make contact 3 of relay R120 and diode AC20. When the attendant is connected to and answers this incoming call, one of the connector relays ACA120 through ACA320 operates, such as the connector relay ACA120 for position-console No. 1, and relays AC20 and AC120 will be operated. The operation of relay AC120 causes the release of relay R120. Relay S20 (not shown) becomes operated when the attendant actually connects her telephone circuit to the trunk and the operation of relay S20 (not shown) causes the operation of relay S120. Relay S120, in operating, removes negative battery from the trunk preference conductor TP20. Relay AC20, in operating, maintains over its make contact 2 negative battery on the hold magnet lead HM20 and on the winding of the operated connector relay ACA120.

When the attendant has ascertained the desired termination for this tie-trunk call, such as to a specified PBX station, the attendant will initiate the circuit operaions to cause this connection to come about; and, eventually the ringing-trip relay RT20 (not shown) of this trunk circuit will operate when the PBX station answers the call.

Relay RT20 (not shown), in operating, will cause the operation of relay RTA20 in an obvious circuit over make contact 2 of relay RT20. Also, relay S20 (not shown) will become operated, thereby completing a circuit for causing the operation in FIG. 18 of relay S120 over make contact 1 of relay S20. Furthermore, under these established circuit conditions, relays R20 (not shown), R120, HD20, FF20, FFA20, AC20, AC120 and ACA120 will all be released. Under a recall condition, relay S20 (not shown) will momentarily release and then become re-operated due to the momentary manipulation of a switchhook during the PBX recall condtion. Upon the release of relay S20 (not shown), relay FF20 operates in a circuit extending from ground in FIG. 18, over break contact 1 of relay S20, make contact 1 of relay RT20, make contact 3 of relay S120, to battery through the winding of relay FF20. Relay FF20 operates in this circuit and locks in a circuit extending from battery, through its winding, over make contact 3 of relay S120, make contact 2 of relay FF20, break contact 3 of relay AC20, break contact 2 of relay R120, make contact 1 of relay S120, to ground over break contact 1 of relay AC120. Relay FF20 remains locked in this circuit upon the re-operation of relay S20 (not shown) due to the fact that the slow-release relay S120 remains operated over the momentary release of relay S20 (not shown). Relay FF20, in operating, causes the operation over its make contact 1 of relay FFA20. Upon the operation of relay FFA20, negative battery is applied over make contact 4 of relay FFA20 directly to the hold magnet lead HM20, through diode AC20 to the windings of the connector relays ACA120 through ACA320, and over make contact 3 of relay FFA20 and make contact 2 of relay S20 (when this relay re-operates at the end of the momentary switchhook operation) and make contact 1 of relay RTA20 to the trunk preference conductor TP20.

As will be described in more detail hereinafter, when the calling condition of this trunk, as represented by negative battery applied under a recall condition to the trunk preference conductor TP20, is answered by an attendant, one of the connector relays ACA120, ACA220, ACA320 will be operated, such as relay ACA120, thereby causing the operation in FIG. 18 of relays AC20 and AC120. The operation of relay AC20 completes a circuit over its make contact 2 to maintain battery on the hold magnet lead HM20 and over its make contact 1 maintains a locking ground for the operated connector relay ACA120. The operation of relay AC120 releases relay FF20 which in turn releases relay FFA20, which in turn removes negative battery from the trunk preference conductor TP20. Releasing from this connection by the attendant or placing a hold condition thereon is, in substance, the same type of circuit operation as has been described above in connection with the DID trunk of FIG. 15.

*Calling condition of CO trunk No. 8 of FIG. 21.*—When the central office trunk of FIG. 21 is seized at the central office, circuits are brought into play which eventuate into the operation during the ringing signal from the central office of relay R8 (not shown), which in turn completes a circuit for operating relay R18 extending from ground in FIG. 21, over break contact 3 of relay AC8, make contact 1 of relay R8, to battery through the winding of relay R18. Relay R18, in operating, locks in a circuit extending from the right-hand side of its winding, through its own make contact 1, to off-normal ground through break contact 2 of relay S18. Relay R18, in operating, completes three circuits as follows: negative battery is extended to the trunk preference lead TP8 in a circuit extending through make contact 2 of relay R18 and break contact 1 of relay N8; negative battery is extended to the hold magnet lead HM8 over make contact 3 of relay R18 and break contact 2 of relay HD8; and, negative battery is extended to the left sides of the windings of connector relays ACA18, ACA28 and ACA38 over make contact 3 of relay R18. Eventually, relay R8 (not shown) will release at the end of the ringing signal from the central office. In response to the negative battery on the trunk preference lead TP8 extending from FIG. 21 to the crossbar switch A0 of FIG. 31, an attendant position circuit will be selected and one of the connector relays ACA18, ACA28 and ACA38 will be operated, such as connector relay ACA18 for the position-console No. 1 of FIGS. 41 through 45. Upon the operation of connector relay ACA18, a ringing-trip signal is transmitted back to the central office circuits and relays AC8 and AC18 are operated. Upon the operation of relay AC8, ground extends over its make contact 1 and through make contact 1 of the connector ACA18, through the winding of connector relay ACA18, to negative battery over make contact 2 of relay AC8. Negative battery is also extended over make contact 2 of relay AC8 and break contact 2 of relay HD8 to the hold magnet lead HM8. Also, upon the operation of relay AC8, relay S8 (not shown) is operated to in turn cause the operation of relay S18 in an obvious circuit over make contact 1 of relay S8. Relay S18, in operating, causes the release of relay R18, thereby to remove from the trunk preference lead TP8 the negative battery calling condition.

While the attendant is connected to the trunk circuit, she will complete the central office call to the desired PBX termination, which may be a PBX station. If the connection is intended to be completed to a PBX station, relay RS8 (not shown) will be operated which in turn will cause the operation in an obvious circuit of relay RSA8. Relay RSA8, in operating, extends negative battery over its make contact 1 and through break contact 2 of relay HD8 to the hold magnet lead HM8 in order to hold the control conductors through the crossbar switch link to the attendant's position until such time as the called PBX station answers the call. In the meantime, the attendant may disconnect, thereby causing the release of relays AC8, AC18 and ACA18 to disassociate this trunk circuit from the position-console except for the few control leads extending therebetween via the crossbar switch network of FIGS. 28 through 37. At such time as the PBX station answers the call, the ringing-trip relay RT8 (not shown) will operate, thereupon to cause the operation over its make contact 1 of relay RTA8. The operation of relay RTA8 will in turn cause the release of the ringing-start relay RS8 (not shown) which in turn will cause the release of the ringing-start-auxiliary relay RSA8, thereby to remove battery from the hold magnet lead HM8 to complete the release of all connections between the trunk circuit and the position-console No. 1 by causing the release of the few control leads extending over the crossbar switch network of FIGS. 28 through 37.

During the course of the existence of the connection between the central office trunk circuit of FIG. 21 and the called PBX station, it may be necessary for the PBX station to recall the PBX attendant. Under these circumstances, relay SR8 (not shown) will be operated and relay RT8 (not shown) will be operated. The recall condition is effected at the PBX station by a momentary switchhook operation which will cause the release of relay S8 (not shown) and the re-operation of this relay S8 (not shown) when the momentary switchhook operation is completed. At the time relay S8 (not shown) releases, a circuit is completed for operating the fast-flash relay FF8 extending from ground in FIG. 21, over break contact 1 of relay S8, make contact 2 of relay RT8, make contact 1 of relay SR8, to battery through the winding of relay FF8. Relay FF8, in operating, locks in a circuit extending from its winding, through make contact 1 of relay SR8, make contact 2 of relay FF8 and break contact 2 of relay AC18 to off-normal ground. Relay FF8, in operating, causes the operation of relay FFA8 in an obvious circuit, thereupon extending negative battery over make contact 2 of relay FFA8 to the windings of the connector relays ACA18, ACA28 and ACA38 and extending negative battery through make contact 2 of relay FFA8 and break contact 2 of relay HD8 to the hold magnet lead HM8 preparatory to completing a connection through the crossbar switch network to an attendant. Upon the subsequent re-operation of relay S8 (not shown), a circuit is completed in FIG. 21 for causing the operation of relay DR8 extending from ground, over make contact 1 of relay S8, make contact 3 of relay FF8, to battery through the winding of relay DR8. Upon the operation of relay DR8, negative battery is again extended to the trunk preference lead TP8, in a circuit in FIG. 21 extending from negative battery, over make contact 1 of relay FFA8, make contact 1 of relay RTA8, make contact 1 of relay DR8 and break contact 1 of relay N8 to the conductor TP8. In response to the completion of these circuit conditions, a connection will be established through the crossbar switch network to an idle attendant position.

As was the case with the previously described DID trunk of FIG. 15 and with the TIE of FIG. 18, the attendant, when connected with the CO trunk of FIG. 21, may cause a hold condition to be established therein by causing the operation of FIG. 21 of the hold relay HD8 which, upon operating, followed by the release of the connectors AC8, AC18 and ACA18, locks through its own make contact 1 to ground over break contact 1 of relay AC8, and completes a circuit from negative battery through its make contact 2 to the hold magnet conductor HM8 to hold operated the circuit through the crossbar switch network extending the few control leads between this trunk and the attendant which has held the connection. Subsequently, as in the case with the DID and TIE trunks, the attendant, in order to completely release from connection with this trunk, must re-attach to the trunk by re-operating an associated loop key and then, subsequently, operate a position release key in order to fully release the crossbar switch control link between this trunk and the attendant position-console of FIGS. 41 through 45.

There is one other special circumstance under which a CO trunk, such as the one shown in FIG. 21, may cause a calling condition to exist. That circumstance occurs under those conditions, to be described in detail hereinafter, whereby a PBX attendant desires to set up a night connection. Under these circumstances what briefly occurs is as follows: relay N8 of FIG. 21 will be operated, as will relay R18, thereupon causing ground to be applied over make contact 1 of relay N8 to the trunk preference lead TP8; and, negative battery will be applied over make contact 2 of relay R18 and make contact 2 of relay N8 to the FNC8 lead extending into the crossbar switch network of FIG. 31. Since the details of this operation are somewhat different from the usual or normal calling condition above described, this matter will be dealt with subsequently under the miscellaneous description in this specification.

*Calling condition of ATT trunk No. 0 of FIG. 23.*—It will be recalled from previous description that the attendant trunk is a double-ended trunk, one end being called the source and the other end being called the destination. When the marker circuit connects a station initially to and idle ATT trunk a connection is made to the source end. The marker tests for an idle ATT trunk by testing for battery through the winding of relay MCSO. When the marker selects an ATT trunk, such as the one shown in FIG. 23, it completes a circuit for operating relay MCSO extending from ground in the marker circuit of FIG. 23, to conductor ATA0 extending into FIG. 32, thence over break contact 4 of relay TA0, to conductor ATB0 back into FIG. 23, over break contacts 2 of relays CKD0 (not shown) and CKS0 (not shown), break contacts 1 of relays SLS0 (not shown) and SLD0 (not shown), break contact 4 of relay AC0, break contact 1 of relay MCSA0, to battery through the upper winding of relay MCS0. Relay MCS0, in operating, causes the operation of relay MCSA0 in an obvious circuit over make contact 1 of relay MCS0. Upon the operation of relay MCSA0, relay MCS0 locks in a circuit extending from the right-hand side of its winding, over make contact 1 of relay MCSA0, into the marker circuit to ground under control of break contact 1 of the release relay RL0 (not shown).

Relay MCS0, in operating, completes three circuits as follows: relay IN0 operates in a circuit extending from ground in FIG. 23 over break contact 2 of relay CTS0 (not shown), make contact 3 of relay MCS0 and to battery through the winding of relay IN0; relay FFS0 operates in a circuit extending from ground in the marker of FIG. 23, over make contact 2 of relay MCS0 and to battery through the winding of relay FFS0; and, the trunk source hold magnet THM0 in the marker circuit operates in a circuit from ground on conductor ATB0, through make contact 2 of relay MCSA0, to battery through the winding of the trunk source hold magnet THM0, which thereupon operates and locks over its own make contact 1 to ground in the trunk circuit. The operation of the hold magnet THM0 results in the connection of the source (a PBX station for instance) to the source end of this trunk circuit through a crossbar switch linkage. The operation of relay FFS0 causes negative battery to be applied to the hold magnet conductor HM0 extending from the trunk circuit of FIG. 3 into the crossbar switch A0 of FIG. 32 in a circuit extending from negative battery in FIG. 23, over make contact 3 of relay FFS0 and break contact 1 of relay HD0 to conductor HM0.

The completion of the loop circuit from the source of this call (a PBX station) through a crossbar switch to the source end of this trunk causes the operation of relay AS0 in a circuit extending from ground in FIG. 23, over make contact 1 of relay IN0, through the upper winding of relay AS0, break contact 6 of relay AC0, thence through the crossbar switch and over the calling station loop circuit, back through the crossbar switch and break contact 7 of relay AC0, through the lower winding of relay AS0, to battery through make contact 2 of relay IN0. Upon the operation of the relay AS0, battery is applied to the trunk preference conductor TP0 of FIG. 23 extending to switch A0 of FIG. 32 to represent a calling condition of this attendant trunk, this circuit extending from battery in FIG. 23, over make contact 2 of relay FFS0 and make contact 3 of relay AS0 to conductor TP0 extending into FIG. 32. Relay AS0 in operating completes a circuit for operating the slow-release relay BS0 in a circuit extending from ground in FIG. 23, over break contact 2 of relay CTS0 (not shown), make contact 3 of relay MCS0 make contact 3 of relay IN0, make contact 2 of relay AS0, to battery through the upper winding of relay BS0. Relays BS0, IN0 and FFS0 lock to ground under control of make contact 1 of relay BS0.

After the marker circuit has made the necessary checks that the connection is satisfactory from the source (a PBX station) to the source end of of this particular attendant trunk, the release relay RL0 in the marker is operated, thereby to cause the release of relays MCS0 and MCSA0.

The application of negative battery to the trunk preference conductor TP0 ,above described, causes a connection to be established of a few control leads between the attendant trunk of FIG. 23 and one of the position-console circuits of FIGS. 41 through 51, such for instance as the position-console No. 1 of FIGS. 41 through 45. When an attendant answers this particular calling trunk, one of the connector relays ACA10, ACA20 and ACA30 will be operated, such for instance as the connector ACA10 pertaining to position-console No. 1. Upon the operation of this connector relay ACA10, a large number of additional leads are extended between the trunk circuit of FIG. 23 and the position-console circuit of FIGS. 41 through 45. A further result of this connection will be the operation of relay AC0 in FIG. 23 which in turn causes the operation of relay AC10 under control of make contact 3 of relay AC0.

The operation of relay AC0 completes a holding bridge over its make contacts 6 and 7 to hold operated the previously operated relay AS0; and, over its make contact 8 relay AC0 places a holding battery on the hold magnet control lead HM0 extending into FIG. 32. The connector relay ACA10 is locked in a circuit extending from battery, through its winding, over its make contact 1, to ground over make contact 2 of relay AC0 in parallel with make contact 1 of relay AC10. The operation of relay AC0 also causes the release of relay FFS0, leaving the battery on conductor HM0 under the control of make contact 8 of relay AC0.

At this point in the description the source (a PBX station) is connected to the attendant at position-console No. 1 of FIGS. 41 through 45 and presumably will have requested of the attendant that a connection be established to the desired destination, such as another PBX station or TIE trunk or CO trunk. When the attendant has finished the necessary procedure for effecting this connection, relay CTD0 (not shown) will be operated while the destination is being called. At this point the attendant may release from the connection with the trunk circuit by releasing relay AC0, which in turn causes the release of relay AC10 and of the connector ACA10. At this point battery is maintained over make contact 1 of relay CTD0 (not shown) on the hold magnet lead HM0 to maintain the few control conductors connected between the trunk circuit of FIG. 23 and the position-console until such time as the called destination answers the call. When the destination answers the call, the ringing-trip operation will cause the release of relay CTD0 (not shown), which in turn will remove negative battery from the conductor HM0, thereby releasing the crossbar switch linkage between the trunk circuit of FIG. 23 and the position-console to remove the last few control conductors extending between these two circuits.

When the attendant has released completely from connection with this trunk circuit of FIG. 23, the source (a calling PBX station) and the destination (another PBX station or a trunk circuit) will be in communication with each other under control strictly of the supervisory circuits of this particular trunk circuit. Under these circumstances relay CKD0 (not shown) is operated as a check that the destination is off-hook and relay CKS0 (not shown) is operated as a check that the source is still off-hook. Under these circumstances it may be necessary for one or the other of the source or destination parties to recall the attendant. This recall condition is caused, for instance by the source party, by a momentary switch-hook operation which causes a momentary release of relay AS0 followed by the reoperation of relay AS0. During the release of relay AS0 a circuit is completed for causing the reoperation in FIG. 23 of the fast-flash relay FFS0 in a circuit extending from ground in FIG. 23, over back contact 1 of relay AS0, make contact 2 of the slow-release relay BS0, break contact 1 of relay CTS0 (not shown), back contact 5 of relay AC0, to battery through the winding of relay FFS0. Upon the reoperation of relay AS0, with relay FFS0 operated and locked under control of the released relay AC0 and the operated relay BS0, a circuit is again completed for causing battery to appear on the trunk preference lead TP0 to represent a calling condition of this trunk circuit, this circuit extending from battery in FIG. 23, as previously described, over make contact 2 of relay FFS0 and make contact 3 of relay AS0. The recall condition can be caused from the destination end as well as from the source end by the momentary release and reoperation of relay AD0 (not shown) which in turn will cause the operation of the fast-flash destination relay FFD0 (not shown) to complete a circuit from battery over make contacts 1 of these two relays to the trunk preference lead TP0. Upon the operation of either of the source or destination fast-flash relays FFS0 and FFD0, battery will again be applied over make contact 3 of relay FFS0 or make contact 2 of relay FFD0 and over break contact 1 of relay HD0 to hold magnet lead HM0 to assist in completing the control linkage from this trunk to an idle position-console. Again, as in the case of the desination relays, the circuits for controlling a recall condition from a toll connection have not been shown; however, make contacts 1 and 2 are shown for the relay RRA0 (not shown), which represents a relay which would be operated under circumstances whereby a recall condition is caused from a toll connection involving this trunk circuit. And, it will be obvious under these circumstances that the operation of relay RRA0 (not shown) will also cause battery to be applied to the trunk preference lead TP0 and to the hold magnet lead HM0 to initiate a calling condition from this trunk to an idle position-console.

At any time that one of the attendants is connected with this particular trunk circuit, the attendant may effect a hold condition on the trunk by causing the operation of relay HD0 in FIG. 23. The operation of relay HD0 applies negative battery over its make contact 1 to the hold magnet lead HM0 to hold the few control conductors extending between this trunk circuit and the position-console after the attendant has released the large number of connections existing between the circuits by causing the release of relays AC0, AC10, and ACA10. Relay HD0, in operating under these circumstances, will become locked operated in a circuit extending over its own make contact 2, a parallel circuit consisting of make contacts 1 of relays CKD0 (not shown) and CKS0 (not shown), to ground over break contact 1 of relay AC0. Relay CKD0 (not shown) and relay CKS0 (not shown) will remain operated as long as the respective destination and source parties remain off-hook: if both source and destination go on-hook (that is, hang up) relay HD0 will release to remove battery from the hold magnet conductor HM0 and to thereby remove all vestiges of the control connections existing between the held trunk and the position-console: on the other hand, as long as either the destination or the source party remains off-hook the HD0 relay will remain operated so that the attendant may re-enter the connection. As has been described previously in connection with the DID trunk, the TIE trunk and the CO trunk, the attendant may release from a held trunk condition by re-entering the connection and operating relays AC0, AC10, and ACA10, thus causing the release of relay HD0, and subsequently releasing relays ACA10, AC0 and AC10 to completely disassociate this trunk circuit from the position-console.

*Making consoles available*

Any one of the three console-positions of FIGS. 41 through 51 can be made available for service by the act of the attendant at the console plugging her telephone set into the console circuit. This operation in symbolized in FIG. 42 by the switch S1 such that when the attendant at console No. 1 plugs her telephone set into the console this is equivalent to the operation of switch S1 in FIG. 42. The operation of switch S1 in FIG. 42 accomplishes three things as follows: (1) power is applied to all of the lamps of FIGS. 41 through 45; (2) the position release lamp PA RLS of FIG. 44 is lighted as an indication that the console is ready to receive calls; and (3) in FIG. 52 the position preference relay PP1 is operated to establish position-console No. 1 as first preference to receive inward calls.

Upon the operation in FIG. 42 of switch S1, a circuit is completed for operating relay TR1 in an obvious manner over the tip-ring loop circuit through switch S1 and the operator's telephone set. Upon the operation of relay TR1, an obvious circuit is completed in FIG. 43 for operating relay ACL1 over make contact 1 of relay TR1. Relay ACL1, in operating, completes a circuit from the source of ten-volt sixty-cycle alternating current power in FIG. 43, through make contact 1 of relay ACL1, to conductor ACL3A extending into FIGS. 41 through 45 to one side of each of the lamp circuits. Further, upon the operation of relay ACL1, a circuit is completed for lighting the position release lamp PA RLS of FIG. 44 extending from ground in FIG. 52, over break contact 8 of the position release relay PRL1, to conductor PAL1 extending into FIG. 44, thence over break contact 2 of relay N1, make contact 2 of relay ACL1, break contact 2 of the position busy relay PB1, to conductor PAL, through lamp PA RLS to the power source on conductor ACL3A. The lighting of the PA RLS lamp of FIG. 44 is an indication that position-console No. 1 of FIGS. 41 through 45 is available to receive inward calls.

Upon the operation of relay TR1 of FIG. 42, a circuit is completed for causing the operation in FIG. 52 of the position preference relay PP1. This circuit extends from negative battery in FIG. 52, through break contact 7 of relay STA1, break contact 6 of relay LHA1, over conductor JKA1 into FIG. 42, thence over break contact 1 of relay PB1 and make contact 3 of relay TR1, thence over conductor JK1 back into FIG. 52, through the winding of relay PP1, break contacts 4 of relays DO3 and DO2, to ground over break contact 9 of the position preference control relay PPC, and to ground in parallel therewith in a circuit including break contact 6 of relay PP1 and break contact 3 of relay PPC. Upon the operation in FIG. 52 of relay PP1, an obvious circuit is completed over its make contact 8 to cause the operation of relay PPC. Relay PP1, in operating, locks to ground over its own make contact 6; and, relay PPC, in operation, removes the operating ground for relay PP3 (which thereupon cannot operate) and places the operation of relay PP2 under control of make contact 6 of relay PP1. It is obvious under these circumstances that position-console No. 2 of FIGS. 46 through 49, if it becomes attended at this moment, thereby causing the operation in FIG. 46 of relay TR2 and the operation in FIG. 48 of relay ACL2, can cause the operation in FIG. 52 of its corresponding position preference relay PP2 in a circuit including the ground return over break contact 6 of relay DO3, break contact 4 of relay DO1, break contact 6 of relay PP2 and make contact 6 of relay PP1.

It will be noted with reference to FIGS. 12, 13 and 14 that transfer contacts of the position preference relays PP1, PP2 and PP3 are used to steer grounds on the start leads of FIG. 12, namely, leads ST, ST1, ST2 and ST3, into the appropriate position loop circuit for the corresponding position-console. Even though relays PP1 and PP2 of FIG. 52 may both be operated at the same time, it is obvious with reference to FIG. 12 that position loop circuit No. 1 is first preference for incoming calls by virtue of its make contacts 1 through 4. Since relay PP2 of FIG. 52 may also be operated at the same time, it is also obvious that position-console No. 2 of FIGS. 46 through 49 will be second preference for the next call as soon as relay PP1 is released. It will be noted again with respect to FIG. 52, that as soon as position-console No. 1 of FIGS. 41 through 45 has answered the first call, thereby causing the release of its preference relay PP1 and as soon as position-console No. 2 of FIGS. 46 through 49 has answered its call thereby releasing its relay PP2, relay PP3 corresponding to position-console circuit No. 3 of FIGS. 50 and 51 may then and then only be operated in order to steer the next call into position-console No. 3. If position-console No. 2 had been attended first, then relay PP2 of FIG. 52 would have been operated initially, thereby preventing the operation of either of the relays PP1 and PP3 until such time as position-console No. 2 had handled the first call. Likewise, if relay PP3 of FIG. 52 had been operated first initially, then relays PP1 and PP2 would have been prevented from operating until such time as position-console No. 3 of FIGS. 50 and 51 had handled the first call.

It will be appreciated that the steering circuitry of FIGS. 12, 13 and 14, including the transfer contacts of relays PP1, PP2 and PP3, comprises a means for selecting an idle position. The horizontal circuitry in the respective FIGS. 12, 13 and 14 leading to the windings of relays PSAA1 through PSAA6 of FIG. 12, et cetera, comprise means, as will be described hereinafter, for selecting an idle loop circuit among the six available at the corresponding position-console.

Even though an attendant may have plugged her telephone set into the console, thereby to have caused the operation in position-console No. 1 for instance of switch S1 in FIG. 42, nevertheless the attendant may cause her position to become busy thereby to preclude the handling of incoming calls. This operation would be accomplished by the attendant operating the position busy key POS BSY of FIG. 44 thereby operating relay PB1, to in turn release the position available lamp PA RLS of FIG. 44 and cause the lighting in FIG. 44 of the position busy lamp POS BSY in an obvious circuit over make contact 3 of relay PB1. The extinguishment of the PA RLS lamp of FIG. 44 indicates that this position is not available to handle a call: the lighting of the POS BSY lamp of FIG. 44 indicates that the position is nevertheless attended but is busy. The operation of the position busy relay PB1 of FIG. 44 also prevents the operation in FIG. 52 of the corresponding position preference relay PP1 by transferring in FIG. 42 the previously-described operating circuit for relay PP1 over make contact 1 of relay PB1 and conductor MB1 into FIG. 52, where the battery return is under control of make contact 9 of relay DO1, the latter relay not being operated under the circumstances and, as will be described hereinafter, being operated only in the instance when the attendant at position-console No. 1 desires to place an outward call. Of course the attendant at position-console No. 1 may remove this busy condition at any time by releasing the locking busy key POS BSY to extinguish the POS BSY lamp of FIG. 44, to allow the position available lamp PA RLS of FIG. 44 to become lighted again and to complete in FIG. 42 the previously-described normal operating circuit for the position preference relay PP1 of FIG. 52.

*Attendant trunk call to attendant*

It will be assumed that one of the PBX stations has caused a connection to be established from the station to the source end of the ATT trunk of FIG. 23, thereby causing the operation in FIG. 23 of relays AS0 and FFS0 to initiate a calling condition from the ATT trunk, as has been described in detail hereinbefore. Also, as has been described hereinbefore, it is assumed that all three of the position-consoles of FIGS. 41 through 51 have been attended and that the position preference relay PP1 of FIG. 52 is operated as an indication that the position-console No. 1 of FIGS. 41 through 45 is first preference to answer the first incoming call. It will be recalled that the position preference relay PP2 of FIG. 52 is also operated as an indication that position-console No. 2 of FIGS. 46 through 49 will be second preference for answering the next incoming call. Under the assumed circumstances in the ATT trunk circuit of FIG. 23 negative battery is applied to conductor HM0 over make contact 3 of relay FFS0 and make contact 3 of relay AS0; negative battery is applied to conductor HM0 over make contact 3 of relay FFS0 and break contact 1 of relay HD0; and, the lamp control circuit of the ATT trunk of FIG. 23 has connected the 120 IPM interrupter to lead SL0 with no potential connect to leads DL0 and TL0.

Negative battery on conductor TP0 in the ATT trunk of FIG. 23 causes the attendant trunk calling condition to be accepted by the trunk preference circuitry of FIGS. 2 through 7 to allow this calling trunk to enter the trunk preference gate. The corresponding trunk preference relay TP0 of FIG. 2 is thereupon operated in a circuit extending from negative battery on conductor TP0 in FIG. 23, *thence* into FIG. 32, over break contact 6 of relay TA0, to conductor TP0 extending into FIG. 2, thence through the winding of relay TP0 and to ground over break contact 6 of relay TP0 and break contact 12 of relay GT. Relay TP0, in operating, completes obvious circuits over its make contacts 2 and 4 for causing the operation of group relay GP0 which is individual to the ten trunk preference relays TP0 to TP9 of FIG. 2. Relay TP0 also provides a locking ground to maintain itself operated over its make contact 6.

In the position trunk controller circuit of FIG. 11, upon the operation of relay GP0 of FIG. 2, relay GT of FIG. 11 operates in one circuit extending from ground, over make contact 12 of relay GP0 and break contact 9 of relay DELA to negative battery through the lower winding of relay GT and over another circuit extending from ground, through make contact 11 of relay GP0 and break contact 5 of relay DELA to negative battery through the upper winding of relay GT. The operation of relay GT in FIG. 11 indicates that a calling trunk has entered the trunk preference gate; and, at this point a timing interval of 675 milliseconds is initiated during which time the connecting operations must take place and relay GT must be released or a so-called "timed release" of relay GT will be forced so as to allow any other waiting calling trunks to enter the trunk preference gate. In FIG. 11 it will be noted that upon the operation of relay GT, negative battery is supplied over make contact 5 of relay GT to the timing circuit comprising transistors Q1 and Q2 and relay DEL: the detailed operation of this timing circuit will be described subsequently in connection with other miscellaneous functions of the over-all disclosure: in essence, the timing circuit of FIG. 11 measures an interval of time of approximately 675 milliseconds from the time that make contact 5 of relay GT closes, such that if relay GT remains closed for that length of time relay DEL will become operated to effect the above-mentioned timed release of relay GT. It will be assumed for present purposes that relay GT does not remain operated long enough to cause this forced time-out.

Upon the operation of the gate relay GT of FIG. 11, relay CST in the position trunk controller of FIG. 10 is operated to permit the common control elements of the disclosure to function to handle this incoming call. In FIG. 10 relay CST is operated in circuits extending to battery through its upper and lower windings: one circuit extends from ground in FIG. 10, over make contact 10 of relay PP1, break contact 5 of relay NSC, make contact 3 of relay GT and break contact 5 of relay DOGT to battery through the lower winding of relay CST; and, the other circuit extends from ground in FIG. 10, over make contact 9 of relay PP1, break contact 7 of relay NSC, make contact 1 of relay GT and break contact 7 of relay DOGT to battery through the upper winding of relay CST. Relay CST operates to indicate that a "call start" (incoming traffic) condition has taken control of the circuitry. Relay CST, in operating, completes in FIG. 10 circuits extending grounds over its make contacts 3 and 8 to respective start conductors ST and ST1 extending into the position loop circiutry of FIG. 12, wherein these two conductors ST and ST1 are extended over make contacts 1 and 2 of the position preference relay PP1, thereby steering the starting condition into the position loop circuit No. 1 of FIG. 12. This will eventually result in selecting one of the six position loop circuits available to the position-console No. 1 of FIG. 41 through 45. Also, in FIG. 10, the operation of relay CST causes the operation of relay W in a circuit extending from ground, over make contact 1 of relay CST, break contact 6 of relay W to the left side of the winding of relay W, thence through the winding of relay W to negative battery through the WZ resistance. Ground from make contact 1 of relay CST is also applied through break contact 10 of relay Z to the right-hand side of the winding of relay Z, which relay remains released because of the ground condition on both sides of its winding. The operation of relay CST in FIG. 10, with relay Z in FIG. 10 released, completes a circuit from ground in the lower right-hand corner of FIG. 10, over make contact 2 of relay CST and break contacts 9 and 8 in parallel of relay Z, to conductor AL extending to the select magnet control circuit of FIG. 5 to result in the operation of select magnets SMA00 and SMB00 of FIG. 5 corresponding to the calling ATT trunk of FIG. 23. It will be noted in FIG. 5 that ground on conductor AL will be extended over make contact 4 of relay GP0 to give preference to the lowest numbered trunks of the first group of trunks represented by the select magnets of FIG. 5; whereas, in FIG. 7 ground on conductor AR would give preference to the other end of the chain of forty-nine pairs of select magnets corresponding to the forty-nine trunk circuits. In this regard, it will be noted in FIG. 10, upon successive operations of either of the relays CST and DOGT, that the W and Z relays will assume alternate operated and released conditions thereby, in the lower right-hand corner of FIG. 10, causing ground to be applied alternately to conductors AL and AR, respectively, to FIGS. 5 and 7. This, in effect, causes the preference to shift from one end to the other of the trunk preference chain of FIGS. 2 through 7.

In FIG. 12 the grounds on the start conductors ST and ST1, extending thereto from the position trunk controller circuit of FIG. 10, extend over make contacts 1 and 2 of the position preference relay PP1, thence to a series of make and break contacts of relays LHA1 through LHA6 corresponding individually to the six loop circuits associated with position-console No. 1 of FIGS. 41 through 45. An idle loop circuit is represented by the released condition of its corresponding relay, such as relay LHA1, which will be released if loop No. 1 is idle. On the other hand, if loop No. 1 is busy, relay LHA1 will be operated, thereby extending the start conductors to the contacts of relay LHA2, et cetera. It will be obvious that the first relay of the group PSAA1 through PSAA6 will be operated depending upon which one of the six loop circuits is the first idle one in the line of the circuitry as shown. Let it be assumed for present purposes that loop circuit No. 1 is idle, as indicated by the released condition of its corresponding relay LHA1. Under these circumstances the grounds extending over make contacts 1 and 2 of relay PP1 will be extended over break contacts 8 and 4 of relay LHA1, thence over break contacts 2 and 4 of relay NSC to battery through the respective lower and upper windings of relay PSAA1, which thereupon operates. The operation of relay PSAA1 amounts to a selection of loop No. 1 in position-console No. 1 as the designated answering position for this incoming trunk call.

In the meantime, the select magnets SMA00 and SMB00, corresponding on switches A0 and B0 of FIGS. 32 and 37 to the ATT trunk of FIG. 23, will have been operated.

The circuit for operating these select magnets extends from ground in the position trunk controller of FIG. 10 on conductor AL extending into FIG. 5, thence over make contact 4 of relay GP0, make contact 1 of relay TP0, through the windings of select magnets SMA00 and SMB00, through break contacts 9 and 10 of relay DS0, thence over conductor TPA0 into FIG. 2, thence to conductor TP0 extending into FIG. 32, and thence over break contact 6 of relay TA0 to negative battery on conductor TP0 extending thereto from the ATT trunk of FIG. 23. As is well known in the crossbar switch art, the operation of select magnets SMA00 in FIG. 32 and SMB00 in FIG. 37 prepares all of the corresponding crosspoints in that horizontal row of the crossbar switches for operation depending upon which one of the hold magnets is subsequently operated.

Upon the operation of the select magnets SMA00 and SMB00 of FIGS. 32 and 37 as above described, and the operation in FIG. 12 of relay PSAA1 indicating that loop No. 1 of position-console No. 1 has been designated for handling this call, circuits are completed in FIG. 40 for operating hold magnet HMA00 corresponding to loop No. 1 of the position-console No. 1 of FIGS. 41 through 45. This circuit extends from ground in FIG. 40 over make contacts 1 in parallel of select magnets SMA00 and SMB00 and over make contact 1 of relay PSAA1 to battery through the winding of hold magnet HMA00. Upon the operation of hold magnet HMA00 of FIG. 40 (which is also shown in FIG. 32), as will be well understood by those acquainted with the crossbar switch art, the six crosspoint connections corresponding to select magnet SMA00 and hold magnet HMA00 in FIG. 32 will be closed, thereby extending the six horizontal conductors into contact with the six vertical conductors at that particular crosspoint.

Upon the closure in FIG. 32 of the crosspoint corresponding to select magnet SMA00 and hold magnet HMA00, the six control conductors desginated 0, 1, 2, 3, 4 and 5 associated with ATT trunk No. 0 of FIG. 23 will be connected over that closed crosspoint to the respective six control conductors designated 0, 1, 2, 3, 4, 5 extending in FIG. 32 vertically out of the closed crosspoint. Of these six vertical conductors extending out of the closed crosspoint, conductor AUD1 extends to position-console No. 1 of FIG. 45, conductors DLA1, SLA1 and TLA1 extend to position-console No. 1 of FIG. 44, conductor A00 extends to the hold magnet control circuit of FIG. 40, and conductor TKA1 extends to position-console No. 1 of FIG. 41.

The extension of these control conductors of FIG. 32, as above described, effects a calling condition at loop circuit No. 1 of position-console No. 1. Conductor TKA1 in FIG. 41 extends to a make contact of the No. 1 loop key in the position-console so as to enable the completion of a circuit for operating a connector relay in the trunk circuit when the No. 1 loop key is operated by the attendant at console-position No. 1. Conductor A00, extending into the hold magnet control circuit of FIG. 40, is for the purpose of providing a holding ground for the operated hold magnet HMA00 at such time (to be described below) as the operation of relay TA0 in FIG. 32 comes about. The three conductors TLA1, SLA1 and DLA1, extending into FIG. 44, appear on the left sides of lamps LP1, S1 and D1 to provide lamp signals to the attendant, lamp S1 being flashed at a 120 IPM rate at the moment with lamps D1 and LP1 dark. Conductor AUD1 extends into FIG. 45 and thence over break contact 4 of relay N1 and break contact 5 of relay ON11 to ground through the winding of relay AS1 to enable relay AS1 to be operated as soon as relay TA0 in FIG. 32 is operated.

Upon the closure of the crosspoint in FIG. 32, a circuit is completed for operating relay TA0 in FIG. 32, such circuit extending in FIG. 32 from negative battery on lead HM0 from the ATT truck of FIG. 23, through the winding of relay TA0 in FIG. 32, thence over crosspoint contact No. 4, to conductor A00 extending into FIG. 40, thence over make contact 1 of hold magnet HMA00 to the operating ground for the hold magnet, thus causing the operation in FIG. 32 of relay TA0. In FIG. 32 relay TA0, in operating, provides a ground over its own make contact 12 to lock itself operated and to extend ground over the No. 4 contact of the crosspoint to conductor A00 extending into FIG. 40 as a locking ground for the hold magnet HMA00 when the operating ground for this hold magnet is removed. In FIG. 32 the operation of relay TA0 also completes at its make contact 6 a circuit between battery on conductor TP0 from the ATT trunk of FIG. 23 and over the 0 contact of the crosspoint to conductor AUD1 into FIG. 45, to cause the operation of relay AS1. Relay AS1, in operating, completes circuits (not shown) for providing an audible signal to the console attendant. Relay TA0, in operating in FIG. 32, opens at its make contact 6 the previously-described operating circuit for the trunk preference relay TP0 of FIG. 2, thereby permitting relay TP0 to release to in turn cause the release of the select magnets SMA00 and SMB00 of FIGS. 32 and 37 (also FIG. 5) and the release of the group relay GP0 of FIG. 2. The release of relay GP0 in FIG. 2 causes the release in FIG. 11 of relay GT, assuming that no other relays GP1 through GP4 of FIGS. 3 and 4 are operated. The release of relay GT in FIG. 11 causes the release in FIG. 10 of relay CST, thereby to remove ground from the select magnet operating lead AL extending into FIG. 5. The release of relay CST removes ground in FIG. 10 from the start leads ST and ST1 extending into FIG. 12, thereby to cause the release of the loop relay PSAA1. The release of relay CST in FIG. 10 also permits relay Z of FIG. 10 to be operated in a circuit extending from negative battery, through the WZ resistance, through the winding of relay Z to ground over make contact 6 of relay W. The operation of relay Z, as has been explained hereinbefore, causes the operating ground for the select magnets to be thereafter applied to conductor AR in FIG. 10 upon the reoperation of relay CST, thereby to reverse the select magnet preference from the left-hand end of the preference chain of FIG. 5 to the right-hand end thereof of FIG. 7.

Upon the operation of the hold magnet HMA00 of FIG. 32 (also FIG. 40), an obvious circuit was completed in FIG. 12 for operating relay STA1 over make contact 2 of the hold magnet HMA00. The operation of relay STA1 of FIG. 12 causes the release in FIG. 52 of the position preference relay PP1; but, since it has been assumed that the position preference relay PP2 is also operated, the position preference control relay PPC remains operated in FIG. 52. However, the operation of relay STA1 of FIG. 12 causes the operation in FIG. 53 of the position release relay PRL1, corresponding to the position-console No. 1 of FIGS. 41 through 45, in a circuit extending from ground in FIG. 53, over make contact 8 of relay STA1, break contact 3 of relay LHA1, to battery through the winding of relay PRL1. The operation of relay PRL1 in FIG. 53 causes the removal in FIG. 52 from its break contact 8 of the operating ground on conductor PAL1 for lighting the position release PA RLS lamp of FIG. 44, thereby causing this lamp to become dark indicating that this position is no longer available to handle a call.

The present circuit condition represent a calling condition at loop No. 1 of position-console No. 1 which has not yet been answered. Relays W and Z of FIG. 10 are operated, thereby having shifted the preference for the next call to the right end of the trunk preference chain in FIG. 7 instead of to the left end of the trunk preference chain of FIG. 5. The position preference relay PP1 of FIG. 52 has been released, leaving position preference relay PP2 operated to control the steering in FIGS. 12, 13 and 14 of the next call into position loop circuit No. 2 of FIG. 13. Lamp S1 of FIG. 44 is flashing at a 120 i.p.m. rate to indicate visually to the attendant at position-console No. 1 that a call is waiting to be answered at this particular loop circuit. The audible signal is also present in console No. 1 by virtue of the operation in FIG. 45 of relay AS1. In FIG. 32 relay TA0, corresponding to the ATT trunk of FIG. 23, is operated, thereby completing a holding ground into FIG. 40 for the hold magnet HMA00 controlling the closure of the crosspoints in FIG. 32. Relay CST of the position trunk controller of FIG. 10 has been released, as has been the gate relay GT of FIG. 11 (thereby reverting the timing circuit in the upper left-hand part of FIG. 11 to normal under the assumption that this release of relay GT has taken place within 675 milliseconds from the time that relay GT operated). In the trunk preference and select magnet control circuits of FIGS. 2 and 5 relays TP0 and GP0 of FIG. 2 have been released, as have been the select magnets SMA00 and SMB00 of FIG. 5, thereby allowing the trunk preference circuit of FIGS. 2, 3 and 4 to process another incoming call as might be represented by the operation of another trunk preference relay TP1 through TP49.

Figure 45:
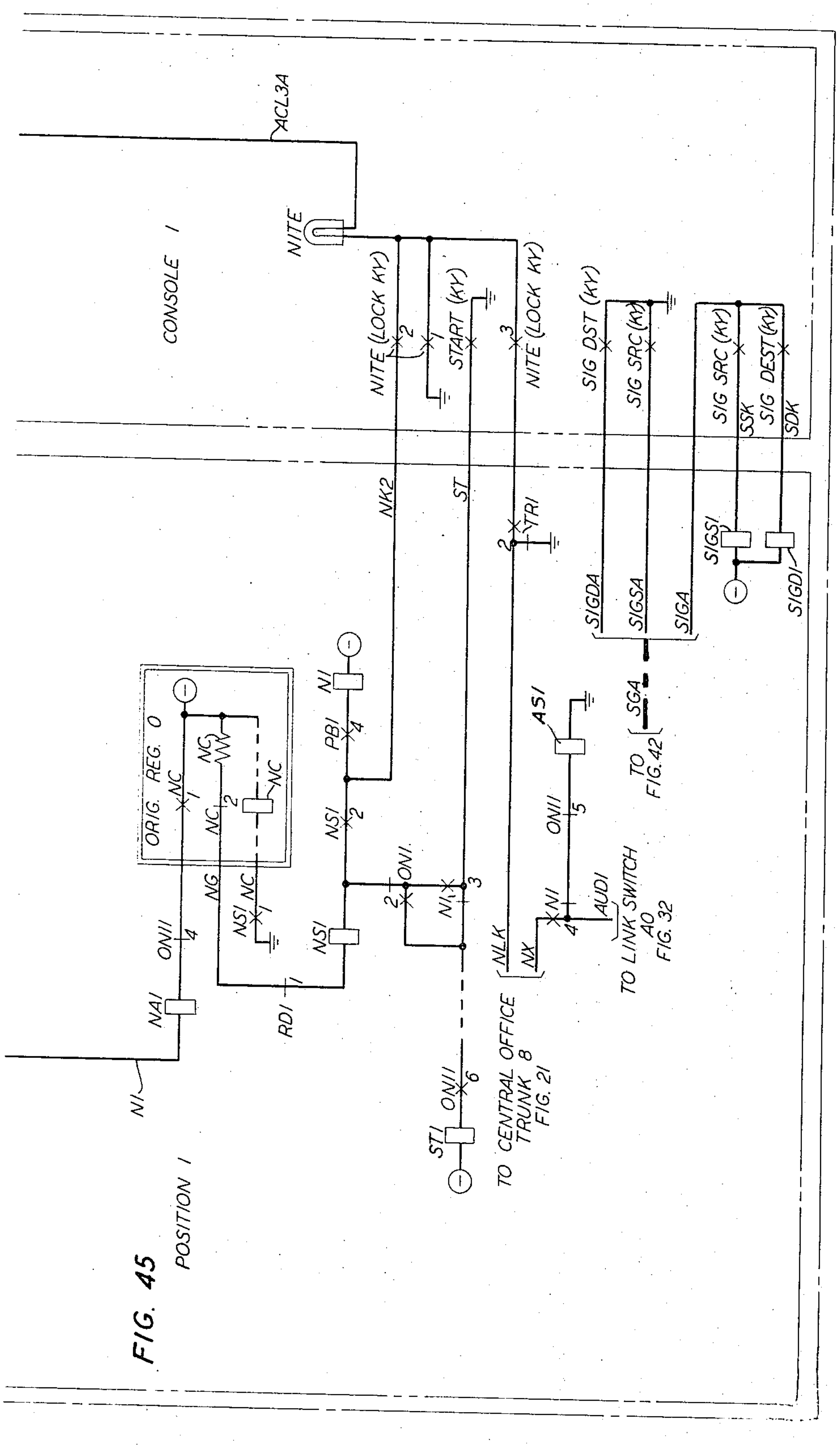
Figure 46:
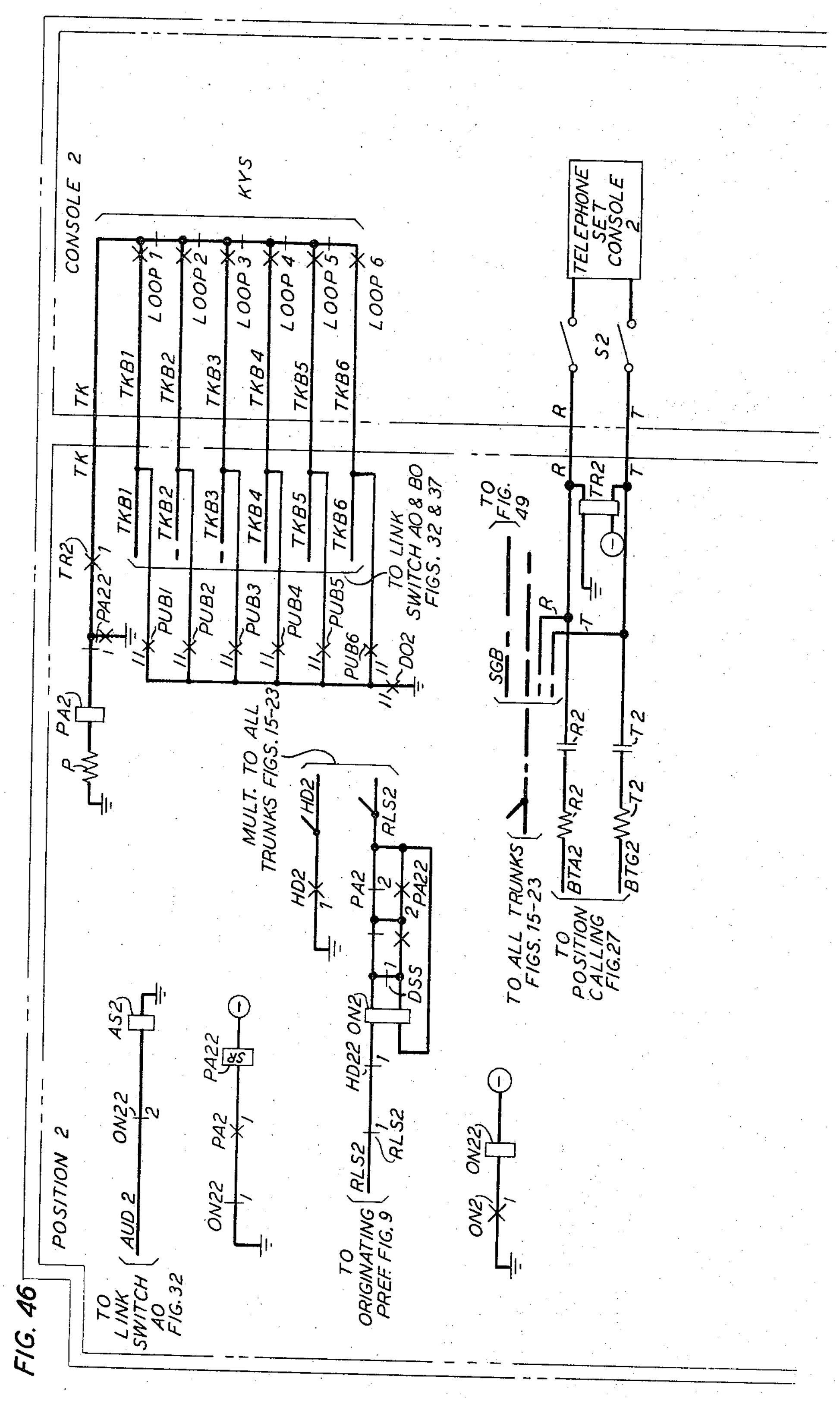

With the source lamp S1 of FIG. 44 flashing at a 120 i.p.m. rate and with the audible signal in effect due to the operation in FIG. 45 of relay AS1, the attendant at console-position 1 of FIGS. 41–45 is alerted to the effect that a call is waiting to be answered at loop No. 1 associated with that particular attendant equipment. Connection of the attendant console to the trunk via the loop circuit through the crossbar switch structure of FIGS. 28 through 37 is initiated by the operation in FIGS. 41 and 43 of the No. 1 loop key. This key operation is a momentary operation but several circuit functions take place during the time that the key is depressed and before the key is released. Upon the operation of the No. 1 loop key, a circuit is completed for operating relay PA1 in FIG. 41 extending from ground in FIG. 41, through the P resistance, through the winding of relay PA1, break contact 1 of relay PA11, make contact 4 of relay TR1, over the TK conductor, through make contact 1 of the No. 1 loop key in the console, thence over conductor TKA1 into FIG. 32, thence over the No. 5 crosspoint contact to conductor ACA0 extending into the ATT trunk of FIG. 23 and to negative battery through the winding of connector relay ACA10. Relay PA1 of FIG. 41 operates in the immediately described circuit but the connector relay ACA10 of the ATT trunk of FIG. 23 cannot operate in series with the P resistance of FIG. 41. Relay PA1, in operating, completes a circuit in FIG. 41 for causing the operation of relay PA11 from ground, over break contact 1 of relay ON11 and make contact 1 of relay PA1 to battery through the winding of relay PA11. Upon the operation of relay PA11, the operating circuit for relay PA1 is opened at break contact 1 of relay PA11, thereby causing the release of relay PA1. Upon the release of relay PA1, the energizing circuit for relay PA11 is opened, thereby allowing the winding of relay PA11 to become de-energized; however, the slow release characteristic of relay PA11 will maintain it operated long enough to accomplish the following circuit operations before its release. Upon the operation of relay PA11 of FIG. 41, ground extends through its make contact 1 to the previously described circuit extending over make contact 1 of the No. 1 loop key and into FIG. 23 to negative battery through the winding of connector relay ACA10; however, connector relay ACA10 of FIG. 23 can now operate because the high impedance ground return in FIG. 41 has been replaced by a direct ground over make contact 1 of relay PA11. Upon the operation in FIG. 23 of the connector relay ACA10, relatively large number of connections are made over conductors extending between the ATT trunk of FIG. 23 and the position-console circuit of FIGS. 41 through 45, this large number of connections being indicated in FIG. 23 by the make contact of connector ACA10 in the cable lead extending between the trunk of FIG. 23 and the position circuit of FIG. 42. Two additional leads are extended between the trunk circuit of FIG. 23 and the position-console circuit of FIG. 41, namely, conductors RLS1 and HD1 shown in FIG. 23 and under control of make contacts 2 and 3 of connector ACA10. Upon the operation of the connector relay ACA10 of FIG. 23, a circuit is completed for operating relay AC0 of FIG. 23 in series with the off-normal relay ON1 of FIG. 41, said circuit extending from negative battery in FIG. 23 through the winding of relay AC0 over make contact 2 of relay ACA10, conductor RLS1 extending into FIG. 41, thence over make contact 2 of relay PA11 or break contact 2 of relay PA1, through the upper winding of relay ON1, over break contacts 1 of relays HD11 and RLS1, conductor RLS1 extending into FIG. 9 and thence to ground over break contact 8 of relay DO1. Relays ON1 of FIG. 41 and AC0 of FIG. 23 operate in series with each other in this circuit. Relay ON1, in operating, causes the operation in FIG. 41 of relay ON11 in an obvious circuit over make contact 1 of relay ON1, the operation of relay ON11 causing the release in FIG. 45 of relay AS1, thereby to retire the audible signal previously supplied to the attendant. The operation in FIG. 23 of relay AC0 causes the operation in FIG. 23 of relay AC10 in a circuit extending over make contact 3 of relay AC0. The operation of relays AC0 and AC10 in FIG. 23 provides a locking circuit for the connector relay ACA10 in FIG. 23 extending from ground in FIG. 23 in parallel over make contact 1 of relay AC10 and make contact 2 of relay AC0 and thence through make contact 1 of relay ACA10 to battery through the winding of relay ACA10, thereby holding operated the connector relay ACA10 before the release of relay PA11 of FIG. 41 opens the previously described operating circuit for this connector relay ACA10. The operation in FIG. 23 of relay AC0 completes a circuit over its make contact 8 and break contact 1 of relay HD0 to hold negative battery on conductor HM0 extending into FIG. 32. Also, in FIG. 23, the operation of relay AC0 causes the release of relay FFS0, thereby to remove negative battery from the trunk preference lead TP0 extending from the trunk circuit of FIG. 23 into FIG. 32. At this time the lamp control circuit in the ATT trunk of FIG. 23 will be applying ground potential to the lamp leads SL0 and TL0, thereby to cause the corresponding lamps S1 and LP1 of FIG. 44 to be lighted steadily, the D1 lamp of FIG. 44 being dark since the DL0 lamp lead from FIG. 23 has no potential applied thereto.

In the meantime, the operation of the No. 1 loop key of FIGS. 41 and 43 completes a circuit in FIG. 43 extending from ground, over break contact 2 of relay RLS1, conductor TK1, make contact 2 of the No. 1 loop key, conductor PUA1 extending into the position loop circuit of FIG. 12, thence through the winding of relay PUA1, through diode PUA1, to negative battery over break contact 6 of relay END1. Relay PUA1 operates and completes an obvious circuit in FIG. 12 over its make contact 12 to cause the operation of relay END1 and completes another circuit in FIG. 12 for causing the operation of relay LHA1 over make contacts 6 of relays PUA1 and STA1. The operation in FIG. 12 of relay END1 prevents any of the other pick-up relays PUA2 through PUA6 of FIG. 12 from becoming operated at the same time as relay PUA1; and, the operation in FIG. 12 of relay LHA1 steers the circuit of FIG. 12 to the succeeding loop selection relays PSAA2 through PSAA6.

All of the foregoing circuit operations take place during the momentary operation in FIGS. 41 and 43 of the No. 1 loop key. At the end of this momentary period of time the No. 1 loop key will be released, at which time a locking circuit is completed to maintain operated the relay PUA1 of FIG. 12, this circuit extending from battery in FIG. 12, over make contact 5 of relay PUA1, through the winding of relay PUA1, over make contacts 4 of relays PUA1 and STA1, through the PUGA diode, conductor PUGA extending into FIG. 43, thence through break contacts 2 of all of the loop keys Nos. 1 through 6, and thence over conductor TK1 to ground over break contact 2 of relay RLS1.

At this point in the circuit description the connector relay ACA10 of the ATT trunk of FIG. 23 is operated and locked under control of relays AC0 and AC10 of FIG. 23, relay AC0 of FIG. 23 is operated and locked in series with the off-normal relay ON1 of the position-console No. 1 circuit in FIG. 41, relay FFS0 of FIG. 23 is released, relays IN0 and AS0 and BS0 in FIG. 23 are operated, battery has been removed in FIG. 23 from the trunk preference conductor TP0, battery is maintained on the hold magnet control lead HM0 of FIG. 23 under control of relays HD0 and AC0, the TL0 and SL0 leads of FIG. 23 have ground applied thereto and the DL0 lead of FIG. 23 has no potential applied thereto.

In the link control circuits the hold magnet HMA00 of FIGS. 32 and 40 is operated and held operated under control of relay TA0 of FIG. 32; in the position loop circuit of FIG. 12 relays STA1, END1, LHA1 and PUA1 are operated and relay PSAA1 is released; and, in the position preference circuit of FIGS. 52 and 53, relay PP1 is released and relay PRL1 is operated, relays PPC and PP2 of FIG. 52 being operated under the assumption that position-console No. 2 of FIGS. 46 through 49 is available and waiting to handle a call.

In the position circuit of FIGS. 41 through 45 relays PA1 and PA11 of FIG. 41 are released and the off-normal relays ON1 and ON11 are operated; and, in FIG. 44 the destination lamp D1 is dark, the source lamp S1 is lighted steadily and the loop lamp LP1 is lighted steadily.

At this point in the circuit operation the attendant is in communication with the calling party on the source end of the ATT trunk of FIG. 23 and presumably will ascertain from this calling party the desired destination of the call. Assuming that a connection is required which necessitates the assistance of the attendant, the attendant at position-console No. 1 of FIGS. 41 through 45 will initiate a bid for a marker circuit for the purposes of having attached a register into which the attendant can dial the desired code representing the destination so that she can complete a connection between the source and the destination ends of the ATT trunk of FIG. 23. This starting operation of the attendant is effected by the operation in FIG. 45 of the START key, thereby completing a circuit for operating relay ST1 of FIG. 45 extending from ground in FIG. 45, over the make contact of the START key, over conductor ST, break contact 3 of relay N1, make contact 6 of relay ON11, through the winding of relay ST1 to negative battery. The operation of relay ST1 of FIG. 45 causes a marker circuit to connect to the ATT trunk of FIG. 23 and to connect thereto a register circuit into which the attendant may dial some signals. When the register circuit has been connected, this will cause the operation in FIG. 42 of relay RA1 which in turn completes a circuit in FIG. 42 from ground, through its make contact 1 and over conductor RDYL to cause the lighting of the RDY lamp in the position-console circuit of FIG. 42, thereby indicating to the attendant that the register is attached and ready. Along with these functions the attendant will also be supplied with a dial tone signal.

In response to the signals dialed into the register by the console attendant, the register circuit will call upon the services of a marker to seize the trunk circuit of FIG. 23 and to cause connections to be extended between this trunk circuit and the destination desired in accordance with the digits dialed into the register. Relay ST1 of FIG. 45 will have been released, along with relay RA1 of FIG. 42 as incidents to the operation briefly described as a result of the operators dialing the instructions. The release in FIG. 42 of relay RA1 causes lamp RDY to become extinguished. As an incident to these connecting functions, certain operations take place within the trunk circuit of FIG. 23, one of which is the circuit operation within the lamp control circuit of FIG. 23 for causing the 30 IPM interrupter to be connected to conductor DL0 in FIG. 23 and thereby to cause the destination lamp D1 of FIG. 44 to flash at a 30 i.p.m. rate as an indication to the attendant that the called party is being rung. Incident to this ringing operation of the called party, both the attendant and the calling party will hear the ringing induction.

At this point the attendant at position-console No. 1 of FIGS. 41 through 45 may release the connection extending between her console-position and the trunk of FIG. 23 except for the few control conductors extending over the crossbar switch crosspoint of FIG. 32. The attendant effects this releasing operation by the momentary operation in FIG. 42 of the position release key PA RLS. The momentary operation of the PA RLS key of FIG. 42 completes an obvious circuit for operating relay RLS1 in FIG. 42, which in turn causes the successive release in FIG. 41 of relays ON1 and ON11. The operation of relay RLS1 also opens the locking circuit, through its break contact 2 in FIG. 43, for the pick-up relay PUA1 of FIG. 12, which thereupon releases, to in turn cause the release in FIG. 12 of relay END1 and the release in the position preference circuit of FIG. 53 of relay PRL1. The release of relay PRL1 in FIG. 53 causes the PA RLS lamp of FIG. 44 to again become lighted as an indication that position-console No. 1 of FIGS. 41 through 45 is again available for handling additional calls.

In the meantime, upon the operation in FIG. 42 of the RLS1 relay, the relays AC0, AC10 and ASA10 of the trunk circuit of FIG. 23 are released, thereby removing all connections between the ATT trunk of FIG. 23 and the position-console No. 1 of FIGS. 41 through 45 except for the few lamp leads and control conductors extending between these circuits over the closed crosspoint of the crossbar switch in FIG. 32. The crosspoint of FIG. 32 is held closed because the hold magnet HMA00 of FIGS. 32 and 40 is held operated in a circuit previously described to ground over make contact 12 of relay TA0 in FIG. 32; and, relay TA0 is maintained operated by battery on conductor HM0 extending into FIG. 32 from FIG. 23 and controlled by make contact 1 of relay CTD0 (not shown), which relay is, as has been described hereinbefore, operated during the ringing interval of the called party. At this point in the operation of the circuitry, the destination lamp D1 of FIG. 44 is flashing at a 30 i.p.m. rate, the source lamp S1 of FIG. 44 is lighted steadily, and the LP1 lamp of FIG. 44 is also lighted steadily.

At such time as the called party answers the ringing signal, thereby effecting the well-known ringing trip circuit operation, relay CTD0 (not shown) in FIG. 23 will be released, thereby removing negative battery from conductor HM0 extending from FIG. 23 into FIG. 32, thus causing the successive release of relay TA0 in FIG. 32, the hold magnet HMA00 of FIGS. 40 and 32 and of relays STA1 and LHA1 of FIG. 12. The release of the above-described relays in FIGS. 32, 40 and 12 effects a complete release of all connections existing between the ATT trunk of FIG. 23 and the position-console No. 1 of FIGS. 41 through 45, thereby causing all of the lamps D1, S1 and LP1 of FIG. 44 to become extinguished and causing all of the circuits in the position-console No. 1 of FIGS. 41 through 45 to revert to their normal condition. It will be recalled that this normal condition is the operation in FIG. 42 of relay TR1, the operation in FIG. 43 of relay ACL1, and the lighting in FIG. 44 of the PA RLS lamp as an indication that this particular position-console is available to handle another call.

As has been mentioned hereinbefore, particularly in the previous description of the calling conditions of various trunk circuits, the attendant at position-console No. 1 of FIGS. 41 through 45 at any time that she is interconnected with the trunk circuit of FIG. 23 (that is, whenever the connector ACA10 of FIG. 23 is operated), may place a hold condition on that particular trunk by momentarily operating the HOLD key in FIG. 42, thereby to cause a momentary operation in FIG. 42 of relay HD1, The momentary operation in FIG. 42 of relay HD1 causes the momentary operation in FIG. 42 of relay HD11 in an obvious circuit over make contact 2 of relay HD1: the time involved between the closing of make contact 2 of relay HD1 and the opening of this contact due to the momentary operation of the HOLD key, combined with the inherent times involved in the operation and the release of relay HD11 of FIG. 42, causes the following circuit operations to take place. The hold relay HD0 of the ATT trunk of FIG. 23 is operated in a circuit extending from ground in FIG. 41, over make contact 1 of relay HD1, thence over conductor HD1 extending into FIG. 23, through make contact 3 of the connector relay ACA10, and thence to battery through the winding of relay HD0, which thereupon operates and locks over its own make contact 2, make contacts 1 in parallel of relays CKD0 (not shown) and CKS0 (not shown), to ground over break contact 1 of relay AC0 at such time as relay AC0 of FIG. 23 becomes released, which in turn takes place after relay HD11 of FIG. 42 is operated. Upon the release in FIG. 23 of relay AC0, relay AC10 is released, thereby causing the release in FIG. 23 of the operated connector relay ACA10. In FIG. 23 battery is extended over make contact 1 of the hold relay HD0 to the hold magnet control lead HM0 extending into FIG. 32 to hold operated relay TA0 in FIG. 32, which in turn holds operated the hold magnet HMA00 of FIG. 40, thereby holding the crossbar connection in FIG. 32 consisting of the few lamp and control leads extending between the trunk of FIG. 23 and the position-console of FIGS. 41 through 45. Under these circumstances the lamp control circuit of the ATT trunk of FIG. 23 will cause the loop lamp LP1 of FIG. 44 to wink at a 30 i.p.m. rate and will cause the source and destination lamps S1 and D1 of FIG. 44 either to be lighted or not, depending on whether connections exist to the source and destination ends of the trunk circuit. The winking of the loop lamp LP1 of FIG. 44 is the signal which tells the attendant at the position-console that this particular loop circuit is presently involved in a hold condition. In order for the attendant to completely release from connection with a held trunk, it is necessary for the attendant to reoperate the No. 1 loop key of FIGS. 41 and 43, thereby again causing the series of operations which will connect her with the trunk circuit of FIG. 23 including the operation in FIG. 23 of relay AC0, the operation of which causes the release of relay HD0 and reverts the situation to that which prevailed prior to the time that the attendant placed the hold condition on the trunk. Thereafter, in order to release from connection with the trunk, it is now necessary, as has been described hereinbefore, for the attendant to momentarily operate in FIG. 42 the PA RLS key to initiate the series of operations which will completely divorce all connections between the trunk circuit of FIG. 23 and the position-console No. 1 circuit of FIGS. 41 through 45.

*Other trunk calls to attendant*

The details of circuit operation in the control circuits of the link (FIGS. 2 through 14 and 24 through 53) are the same as have been described above regardless of whether the incoming call is initiated by a calling condition in the ATT trunk of FIG. 23 or in any other of the fifty trunk circuits shown in FIGS. 15 through 23. The only details which differ will be those operations within the trunk circuits themselves and which are not of any particular significance with respect to an understanding of the present invention. Of course, it will be understood that in the trunk preference and the select magnet control circuits of FIGS. 2 through 7 whichever incoming trunk has a calling condition on it will be dealt with in accordance with the preference set up in these two circuits. And it will be recalled that the preference for dealing with calling trunk conditions is alternated from call to call between the AL conductor of FIG. 5 and the AR conductor of FIG. 7 under control of the W and Z relays of FIG. 10. In the foregoing detailed description of the incoming call from the ATT trunk of FIG. 23, it will be recalled that the position preference circuit of FIG. 52 establishes the order in which calls will be routed to the three position loop circuits of FIGS. 12, 13 and 14 under control of the call start relay CST in FIG. 10. It will also be recalled that the to-be-selected one of the six loop circuits associated with an idle console-position, as represented by the PSAA1 through PSAA6 relays of FIG. 12, the PSAB1 through PSAB6 relays of FIG. 13 and the PSAC1 through PSAC6 relays of FIG. 14, will be determined by which one of these particular loop selection relays represents the first idle loop in the order of selection, as indicated by the arrangement of the contacts in the selection circuits in FIGS. 12, 13, and 14. And it will be recalled that the select magnets corresponding to the particular calling trunk, which has preference at the moment, will be operated in accordance with the preference established on conductor AL or AR of FIGS. 5 and 7 by the W and Z relays of FIG. 10.

In the handling of these incoming trunk conditions for inward traffic, it will be apparent from previous detailed description that the position trunk controller of FIGS. 10 and 11 establishes the fact that this is inward traffic by operating the call start relay CST of FIG. 10 and that the operation of this relay in turn enables the select magnet operating circuits of FIGS. 5, 6, and 7 depending upon the established order of preference, which in turn is controlled by the status of the W and Z relays of the position trunk control of FIG. 10; whereas, the selection of an idle loop in an idle position-console is controlled primarily by the position preference circuit of FIG. 52 which establishes which console is to be selected for the next call and by the position loop circuitry of FIGS. 12, 13, and 14 which in turn decides which one of the idle loop circuits of that particular available position will be actually seized for connection.

With regard to the trunk preference circuit of FIGS. 2 through 4 and the select magnet control circuit of FIGS. 5 through 7, it will be appreciated that a number of the relays TP0 through TP49 of FIGS. 2 through 4 may be operated at the same time along with their corresponding group relays GP0 of FIG. 2, GP1 and GP2 of FIG. 3 and GP3 and GP4 of FIG. 4; however, the common gating relay GT of FIG. 11 must be released before any additional trunks may enter the trunk preference gate. Furthermore, until relay GT of FIG. 11 is released, while the circuit is handling inward traffic, the call start relay CST of FIG. 10 will not be released and therefore will not remove the operating grounds extending from FIG. 10 into FIGS. 5, 6, and 7 for select magnet control.

Although the circuitry primarily responsible for controlling outward traffic, such as circumstances whereunder one of the attendants may attempt to place a call from her position-console to an attendant trunk circuit, has not been described in detail, as they will be hereinafter, it should be noted at this point in the position calling circuits of FIGS. 25, 26 and 27 that relays such as relays DO1, DO2, and DO3 of FIG. 25 cannot be operated as long as the call start relay CST of FIG. 10 is operated because the operating circuit for these three relays extends to battery over break contact 4 relay CST. This insures that the position trunk controller of FIGS. 10 and 11 is in complete control of regulating traffic so as to prevent outward traffic taking place while inward traffic is being handled. It is noted in this regard in FIG. 10 that relay DOGT, which is the relay which will be operated in the position trunk controller during outward traffic control, cannot operate until one of the relays DO1, DO2, and DO3 of FIG. 25 is operated. It is also to be noted in FIG. 10 that the operating circuit for the call start relay CST includes back contacts 7 and 5 of relay DOGT. These interlocking circuit arrangements are to insure that the position trunk controller, which is part of traffic regulating agency of the link circuits, will have either relay CST or relay DOGT operated, depending upon whether the control is being effected over inward or outward traffic and that these two cannot interfere with each other. It will also be noted in FIG. 10 that the four start leads ST, ST1, ST2, and ST3, extending into FIGS. 12, 13, and 14 are controlled in pairs by relays DOGT and CST such that the position loop circuitry of FIGS. 12, 13 and 14 is controlled separately and differently depending upon whether the control circuits are handling inward or outward traffic. The details whereby the position loop circuits of FIGS. 12, 13, and 14 are controlled to actually steer the circuitry to select a specific loop circuit in a particular attendant position under outward traffic circumstances will be described in detail hereinafter.

*Attendant initiated call*

The only facilities available to an attendant at one of the position-consoles for placing outward calls from the console consist of the eight (8) ATT trunk circuits indicated in FIGS. 22 and 23. As an example, with respect to position-console No. 1 of FIGS. 41 through 45, the attendant may initiate an outward call by operating a loop key of FIG. 43 corresponding to a then idle one of the six loops associated with this particular position-console. Upon the operation of this loop pick-up key, the position trunk controller circuit of FIGS. 10 and 11 and the originating preference circuit of FIGS. 8 and 9 take control of the link circuit and cause the selection of an idle one of the ATT trunks of FIGS. 22 and 23. The particular loop which has been seized by the attendant for placing the outward call is marked as such and the selected idle ATT trunk is marked as such: the marking of the idle ATT trunk causes the operation of select magnets on the crossbar switch network of FIGS. 28 through 37 and the hold magnet control circuits of FIGS. 38, 39 and 40 is controlled to operate that hold magnet corresponding to the loop circuit chosen by the attendant for the placing of the call. Thereafter, the operation of the select magnets and the hold magnet will complete a crosspoint connection in FIGS. 28 through 37 to interconnect the idle trunk circuit with the selected attendant position loop circuit, whereupon the connector relays of the trunk will be operated to complete the connection between the trunk and the attendant. Following these operations the attendant may thereafter utilize tis trunk circuit for dialing another PBX station, for dialing the central office trunk, or for accomplishing other circuit operations which are not of immediate interest to the understanding of the present invention.

At the time that an attendant desires to place an outward call the six loop circuits associated with the particular position will be in any one of four conditions: (1) the loop will be idle in which case the corresponding lamps D1, S1, and LP1 of FIG. 44 will all be dark; (2) the loop circuit may be presently occupied by a calling condition of a trunk prior to the calling trunk being answered by an attendant, in which case the source lamp S1 of FIG. 44 or the destination lamp D1 of FIG. 44 will be flashing at a 120 i.p.m. or a 60 i.p.m. rate to indicate the existence in that loop circuit of a calling trunk condition; (3) the loop may actually be involved at the moment in a connection between the position-console and a trunk circuit, in which case the loop lamp LP1 of FIG. 44 will be lighted steadily; and (4) the loop may be involved in a hold condition with a trunk, in which case the loop lamp LP1 of FIG. 44 will be winking at a 30 i.p.m. rate. The only loop circuit which an attendant may use to place a call, as has been mentioned above, must be an idle loop: an idle loop is one with respect to which, referring to FIGS. 12, 13 and 14 each corresponding relay STA1 through STA 6 and LHA1 through LHA6 will be in a released condition. In order for the attendant to place an outward call it is necessary for the attendant to cause the operation, in the position calling circuit of FIG. 25, of relay DO1 for position one, or relay DO2 for position two, or relay DO3 for position three. It will be noted in FIG. 25 that in order for relay DO1, relating to position-console No. 1 of FIGS. 41 through 45, to be operated it is necessary for the loop hold relay LHA1 through LHA6 to be released and for the attendant to cause the operation of the corresponding pick-up relay PUA1 through PUA6, also shown in FIG. 12. Thus, it is necessary for the attendant to operate a pick-up relay PUA1 through PUA6 corresponding to an idle loop circuit, as indicated by the released condition of the corresponding loop hold relay LHA1 through LHA6. If a particular loop circuit is involved at the moment in a connection between the position-console and a trunk, the corresponding relay LHA1 through LHA6 of FIG. 12 will be operated, thereby preventing the operation of relay DO1 in FIG. 25. If the loop circuit is presently occupied by a calling condition of a trunk which has not been answered yet, the corresponding loop hold relay LHA1 through LHA6 will be released and the corresponding pick-up relay PUA1 through PUA6 could be operated; but, the corresponding relay STA1 through STA6 will also be operated such that if the attendant causes the operation of the pick-up relay PUA1 through PUA6, then the loop hold relay LHA1 through LHA6 will also be operated to immediately cause a release of relay DO1 in FIG. 25, if in fact that relay operated in the first instance. If the loop circuit is involved in a hold condition, the corresponding loop hold relay LHA1 through LHA6 will be operated, thereby preventing the operation in FIG. 25 of the relay DO1. Thus, only an idle loop may be selected for use by an attendant to place an outward call.

Let it be assumed that loop circuits Nos. 1 through 5, corresponding in FIG. 12 to relays PSAA1 through PSAA5, are on hold condition and that loop 6, corresponding in FIG. 12 to relay PSAA6, is idle. This loop No. 6 may be selected by the attendant at position console No. 1 of FIGS. 41 through 45 for purposes of placing an outward call by the attendant operating the corresponding loop key No. 6 indicated in FIGS. 41 and 43. The operation of this loop key will be only a momentary operation until such time as the attendant receives on the lamps of FIG. 44 an indication that the connection which she desires has been accomplished.

The attendant will first ascertain which one of the loops is idle at the moment, such as loop No. 6, and will then operate the No. 6 loop key shown in FIGS. 41 and 43. This loop key remains operated as long as the attendant holds the button down and will release as soon as the attendant releases the button. All of the following circuit operations take place prior to the time when the attendant releases the loop pick-up key No. 6. The operation of the No. 6 loop key in FIG. 43 causes the operation in FIG. 12 of relay PUA6 in the position loop circuit. This circuit extends from ground in FIG. 43, over back contact 2 of relay RLS1, conductor TK1, over back contacts 2 of the first five loop keys, thence over make contacts 2 of the No. 6 loop key, conductor PUA6 extending into FIG. 12, through the winding of relay PUA6, through diode PUA6, and to negative battery over break contact 6 of relay END1. Relay PUA6 operates in this circuit and locks to battery over its own make contact 5 as long as ground is maintained on conductor PUA6 from the operated No. 6 loop key of FIG. 43. Relay PUA6, in operating in FIG. 12, causes the operation of the end relay END1 of FIG. 12 in an obvious circuit over make contact 12 of relay PUA6, the operation of relay END1 preventing the operation of any of the other relays PUA1 through PUA5 until such time as the operated relay PUA6 is released.

Upon the operation in FIG. 12 of relay PUA6, with the corresponding loop hold relay LHA6 of FIG. 12 released, a circuit is completed for operating the dial-out relay DO1 in the position calling circuit of FIG. 25 corresponding to position-console No. 1 of FIGS. 41 through 45. The operating circuit for relay DO1 of FIG. 25 extends from ground in FIG. 42, over break contact 1 of relay N1, conductor NCG extending into FIG. 25, thence over make contact 7 of relay PUA6, break contact 5 of relay LHA6, through the winding of relay DO1, through break contact 5 of relay BT1, break contact 7 of relay DO2, break contact 7 of relay DO3, and to negative battery over break contact 4 of relay CST. It will be noted in FIG. 25 that relay DO1 cannot operate if any of the relays BT1, DO2, DO3, and CST is operated: relay BT1 in FIG. 26 is a relay which is operated if all of the ATT trunks of FIGS. 22 and 23 are busy; but, since it will be assumed that at least one of these trunks is available, relay BT1 of FIG. 26 will be released: relays DO2 and DO3 of FIG. 25 are assumed to be released to indicate that the attendants at position-consoles 2 and 3 are not attempting to place an outward call at this moment: relay CST of FIG. 10 is assumed to be released as an indication that the control circuits of the link are not at the moment involved in processing a call-start represented by a calling condition of an incoming trunk for inward traffic.

The operation in the position calling circuit of FIG. 25 of the dial-out relay DO1 initiates a series of operations including the setting of circuitry in the position trunk control of FIGS. 10 and 11 to allow this outward traffic to take preference over inward traffic at the moment, initiates the circuit operations in the originating preference circuit of FIGS. 8 and 9 for selecting an idle ATT trunk of FIGS. 22 and 23, sets up the circuitry of a position loop circuit of FIG. 12 for steering the selected ATT trunk to the particular loop circuit in position No. 1 which has been selected by the attendant, initiates select magnet operation in the select magnet control circuit of FIGS. 5 through 7, and initiates circuit operations for controlling the hold magnet control circuit of FIGS. 38 through 40.

Upon the operation in FIG. 25 of relay DO1, the position trunk controller of FIGS. 10 and 11 is controlled to allow this outward traffic to take preference over incoming traffic at the moment. In FIG. 10, relay DOGT is operated in a circuit extending from ground, over break contacts 9 of relay NSC, break contact 7 of relay DELA, make contact 1 of DO1 and to battery through the winding of relay DOGT. Relay DOGT, in operating, is an indication that dial-outgoing traffic has taken control of the link circuitry. Relay DOGT, in operating, causes the operation in FIG. 10 of relay DOA in an obvious circuit extending over make contact 2 of relay DOGT. Relay DOGT, in operating, controls the relays W and Z in FIG. 10 to alternate the well-known WZ preference arrangement used throughout the link circuitry. Let it be assumed that before relay DOGT operated both the W and Z relays were operated, whereupon when relay DOGT operates relay W will be released by virtue of having ground applied to both sides of its windings, one ground being applied to the left-hand side of its winding over its own make contact 6 and ground being applied to the right-hand side of its winding over make contact 4 of relay DOGT and make contact 10 of relay Z. Relay Z will remain operated in a circuit extending from negative battery, through the WZ resistance, through the winding of relay Z, over break contact 6 of relay W to ground over make contact 4 of relay DOGT. In the meantime in the originating preference circuit of FIG. 9, relays GTA and GTB will have operated in a circuit extending from negative battery over make contact 1 of relay DO1 and break contact 6 of relay TKA to grounds through the windings of relays GTA and GTB.

The selection of an idle ATT trunk of FIGS. 22 and 23 is accomplished with the circuitry of the originating preference circuit of FIGS. 8 and 9. With reference to ATT trunk circuit No. 0 of FIG. 23, it will be noted that ground extends over break contacts 3 of relays CKS0 (not shown and CKD0 (not shown) and a break contact of relay MC0 (not shown) to conductor IT0 extending into FIG. 8. In FIG. 23, relays CKS0 and CKD0 are relays which will be released when both the source and destination ends of this particular ATT trunk are not connected to any circuitry; and, relay MC0 is released whenever the marker circuit of the PBX is not in connection with this particular trunk circuit. Under these assumed conditions the ATT trunk circuit of FIG. 23 will be idle and the ground extending over conductor IT0 into FIG. 8 will extend therein over break contact 7 of relay TA0 (released in FIG. 32 under the assumption that this particular ATT trunk is not involved in a connection within the link circuit), thence over make contact 1 of relay GTA, through the winding of relay DS0, to negative battery over make contact 3 of relay DO1. Relay DS0 in FIG. 8 will operate in this circuit as an indication that ATT trunk No. 0 of FIG. 23 is idle. Likewise, any of the other relays DS1 through DS7 in FIG. 8 will also be operated with respect to any of the other seven ATT trunks indicated in FIGS. 22 through 23 and which are also idle. Upon the operation in FIG. 8 of any one of the relays DS0 through DS7, relay GT in FIG. 11 will be operated as hereinbefore described except that the control therefore will extend over make contacts 1 and 11 of any operated relay DS0 through DS7. The operation of relay GT in FIG. 11 opens the circuits for the trunk preference relays of FIGS. 2, 3, and 4 to prevent any incoming trunk calls from seizing control of the position trunk controller of FIGS. 10 and 11. As has been mentioned hereinbefore, the operation of relay GT in FIG. 11 also starts the timing circuit of FIG. 11 to time an interval of approximately 675 milliseconds within which time the control circuits of the link must finish the particular function which caused the operation of relay GT of FIG. 11. In the meantime, in the originating preference circuit of FIG. 9, upon the operation of relay DOA of FIG. 10, circuits are completed for causing the operation of relay TKA extending in FIG. 9 from batteries, through resistances and make contacts 4 and 2 of relay DOA, thence through diodes TKA1 and TKA, to ground through both windings of relay TKA which thereupon operates, it being assumed that the grounds supplied from the marker circuit through make contacts of relays OPRA and OPRB (not shown in the marker) are not at the moment completed. These latter grounds, if present, would indicate that the marker is presently attempting to seize an ATT trunk for termination of a call; and, it will be assumed that this situation does not prevail. Relay TKA, in operating in FIG. 9, opens the circuits through its break contacts 4 and 8 to the conductors OB1 and OB extending to the marker to prevent the marker from interfering with the instant link circuit operation. The operation of relay TKA in FIG. 9 releases relays GTA and GTB in FIG. 9, relay DSO of FIG. 8 remaining locked operated in a circuit extending over break contact 1 of relay GTA in FIG. 8 to ground over make contact 6 of relay DS0. With relay DOGT of FIG. 10 operated and relay TKA of FIG. 9 operated and relay GTA of FIG. 9 released, a circuit is completed in FIG. 8 for initiating the actual selection for use of an ATT trunk. This circuit extends in FIG. 8 from ground, over make contact 12 of relay DOGT, make contact 3 of relay TKA, break contact 5 of relay GTA, thence over make contact 4 of relay Z and to the series of transfer contacts Nos. 4 on the relays DS0 through DS7. That one of the relays DS0 through DS7 which is the first one to be operated in this order will determine the trunk circuit which is selected for use. The assumed circumstances are that relay DS0 is operated, thereupon extending the ground from make contact 4 of relay Z, through make contact 4 of relay DS0, to conductor SM0 extending into the select magnet control circuit of FIG. 5. It will be noted with respect to the position trunk controller of FIG. 10 that relays W and Z function upon each operation and release of relays DOGT and CST to alternate various preferences throughout the link control circuitry. If in FIG. 8 relay Z should have been released, then the ground would have extended over break contact 5 of relay GTA and thence in parallel over break contacts 3 and 4 of relay Z to the series of No. 2 transfer contacts of relays DS7 through DS0, thereby having reversed the order of preference for the seizure of an ATT trunk. It will be assumed, as above described, that the conductor SM0 extending from FIG. 8 into the select magnet control circuit of FIG. 5 is the one which is grounded to in effect select for use the ATT trunk No. 0 of FIG. 23.

In the meantime, upon the operation of relay DO1 of FIG. 25, circuit operations were initiated for preparing the position loop circuit of FIGS. 12, 13 and 14 to cause whichever idle ATT trunk is seized to be steered to the specific loop circuit chosen by the particular attendant for placing the outward call. With reference to the position preference circuitry of FIG. 52, which has been described in detail hereinbefore, upon the operation of relay DO1 of the position calling circuit of FIG. 25, the position preference relays PP2 and PP3 will immediately be released (if operated), thus causing the release in FIG. 52 of relay PPC if it is operated, whereupon a circuit which has been described in detail hereinbefore is completed for causing the operation in FIG. 52 of the position preference relay PP1 and in turn the re-operation of the position preference control relay PPC. It will be recalled with reference to FIG. 12 that the operation of the position preference relay PP1 steers the four start leads ST, ST1, ST2, and ST3 extending thereto from the position trunk controller of FIG. 10 into the position loop circuit No. 1 of FIG. 12. In the position trunk controller of FIG. 10, upon the operation of relay DOGT ground is extended over make contacts 8 and 10 of relay DOGT, to start conductors ST3 and ST2 extending to the position loop circuitry of FIG. 12, thence over make contacts 4 and 3 of relay PP1, and thence through break contacts 2 and 3 of successive relays PUA1, PUA2, PUA3, PUA4, and PUA5, thence through make contacts 2 and 3 of relay PUA6, break contacts 9 and 3 of relay STA6 and break contacts 4 and 8 of relay LHA6 to battery through both windings of the loop hold relay PSAA6 which thereupon operates. Relay PSAA6, in operating, extends battery in FIG. 52 over its make contact 12 to provide a locking circuit for the position preference relay PP1. The operation in FIG. 12 of relay PSAA6 in effect designates loop No. 6 of position-console No. 1 of FIGS. 41 through 45 as the particular loop circuit to which the idle seized ATT trunk No. 0 of FIG. 23 is to be connected.

In effect, what has taken place to this point is that in response to the operation by the attendant at position-console No. 1 of FIGS. 41 through 45 of the No. 6 loop key, circuit operations have been initiated whereby an idle ATT trunk of FIGS. 22 and 23 when seized will actually be steered back to that particular loop of that particular attendant position. It will also be appreciated that the position trunk controller of FIGS. 10 and 11 has caused the originating preference circuit of FIG. 8 to initiate selection of an idle ATT trunk among the eight ATT trunks of FIGS. 22 and 23.

The result of the foregoing detailed circuit functions will be the operation in FIGS. 5 through 7 of the select magnets corresponding to that one of the ATT trunk circuits of FIGS. 22 and 23 which has been selected for use for this outward traffic and the operation in FIGS. 38 through 40 of the particular hold magnet associated with the specific loop circuit of the particular position-console which has been chosen to place this particular outgoing traffic. In FIG. 5, select magnets SMA00 and SMB00 (corresponding to ATT trunk No. 0 of FIG. 23) are operated in a circuit extending from battery in FIG. 5, over make contacts 9 and 10 of relay DS0, through the windings of select magnets SMA00 and SMB00, thence over conductor SM0 into FIG. 8 and upon which ground appears as has been previously described. Select magnets SMA00 and SMB00 of FIG. 5 are operated to prepare for the operation of one of the crosspoints of FIGS. 32 and 37 in the horizontal row associated with the ATT trunk No. 0 of FIG. 23. With reference to FIG. 40, upon the operation of select magnets SMA00 and SMB00 of FIG. 5 upon the operation in the position loop circuit of FIG. 12 of relay PSAA6, circuits are completed in parallel in FIG. 40 from grounds over make contacts 1 of select magnets SMA00 and SMB00, thence over make contact 1 of relay PSAA6, to battery through the winding of hold magnet HMA05 which thereupon operates; and, as will be noted in FIG. 32, hold magnet HMA05 corresponds to the No. 6 loop circuit associated with position-console No. 1 of FIGS. 41 through 45. The operation of hold magnet HMA05 in FIG. 32 with select magnets SMA00 of FIG. 32 and SMB00 of FIG. 37 operated will close the crosspoint in FIG. 32 which is at the intersection of the No. 6 loop circuit vertical and the No. 0 ATT trunk horizontal. The hold magnet HMA05, in operating, completes a locking circuit for itself extending from its winding in FIG. 40, over its make contact 1, to conductor A05 extending into FIG. 32, thence over the No. 4 contact of the closed crosspoint, to conductor TAG0 extending into the originating preference circuit of FIG. 9, over make contact 7 of relay DS0 and to ground over make contact 6 of relay Z.

Upon the closure in FIG. 32 of the crosspoint which interconnects ATT trunk No. 0 of FIG. 23 and the No. 6 loop circuit of position-console No. 1 of FIGS. 41 through 45, a circuit is completed for causing the operation in FIG. 41 of relay PA1, as has been described in detail hereinbefore, in series with the connector relay ACA10 of the ATT trunk of FIG. 23. However, before this occurs another circuit is completed for insuring the rapid operation of connector relay ACA10, this circuit extending from ground in the position-console of FIG. 41 over make contact 11 of relay DO1, thence over make contact 11 of relay PUA6, conductor TKA6 into FIG. 32, thereby grounding conductor ACA0 in the ATT trunk of FIG. 23 to cause connector relay ACA10 of FIG. 23 of the relay AC0 in series with the off-normal 41, which nevertheless will operate in series with connector ACA10 when pick-up relay PUA6 is released. It will be recalled that the operation in FIG. 41 of relay PA1 causes the operation in FIG. 41 of relay PA11, which in turn permits the operation of the connector relay ACA10 in FIG. 23, which in turn causes the operation in FIG. 23 of the relay AC0 in series with the off-normal relay ON1 of FIG. 41. The operation of relay AC0 in FIG. 23 completes a circuit in FIG. 23 for extending negative battery over its make contact 8 and break contact 1 of relay HD0 to the hold magnet lead HM0 extending into FIG. 32, thence through the winding of relay TA0 in FIG. 32 to cause the operation of relay TA0, which in turn applies ground over its make contact 12 in FIG. 32 to hold operated the hold magnet HMA05 of FIGS. 32 and 40. The operation of the various relays in the trunk circuit of FIG. 23 will be obvious from previous description and it will be apparent that the attendant at position-console No. 1 of FIGS. 41 through 45 is in connection with the ATT trunk circuit of FIG. 23 over the selected loop No. 6 of that particular attendant console. In the position loop circuit of FIG. 12, relay STA6 will operate upon the closure of make contact 2 of hold magnet HMA05. Upon the closure of the crosspoint in FIG. 32, extending the control conductors between the ATT trunk of FIG. 23 and the No. 6 loop circuit of the position-console, the attendant will receive signals at the lamps D6, S6, and LP6 of FIG. 44 which will indicate visually to her that this connection actually has become completed whereupon she may release the operated No. 6 loop key shown in FIGS. 41 and 43. Upon the release of the No. 6 loop key, relay PUA6 of FIG. 12 remains operated in a circuit extending from battery in FIG. 12, through make contact 5 of relay PUA6, through the winding of relay PUA6, over make contacts 4 of relays PUA6 and STA6, thence through diode PUGA, conductor PUGA to FIG. 43, thence through back contacts 2 of all of the released loop keys, and to ground over break contact 2 of relay RLS1. Thus, the pick-up relay PUA6 remains operated as does the END1 relay of FIG. 12 until such time as the attendant actually releases from connection with this particular loop circuit. Also in FIG. 12, upon the operation of relay STA6, relay LHA6 operates in a circuit extending from ground in FIG. 12, over make contacts 6 of relays PUA6 and STA6, to negative battery through the winding of relay LHA6. The operation of relay STA6 causes the release in FIG. 52 of the position preference relay PP1, thereby releasing the position preference control relay PPC of FIG. 52 and allowing one of the other position preference relays PP2 and PP3 of FIG. 52 to again become operated in order for attendants at the other two position-consoles to secure preference for purposes of accepting inward traffic. In FIG. 53, upon the operation of relay STA6, a circuit is completed over make contact 8 of relay STA6 and make contact 1 of relay PUA6 for causing the operation of the position preference release relay PRL1 of FIG. 53 thereby, as has been described hereinbefore, to extinguish the PA RLS lamp of FIG. 44 to indicate that this position is not available to receive calls. Upon the operation of relay LHA6 in FIG. 12, the operating circuit in FIG. 25 for relay DO1 is opened, whereupon relay DO1 releases, followed by the release of relays DOGT of FIG. 10, DOA of FIG. 10, TKA of FIG. 9, DS0 of FIG. 8, and the gate control relay GT of FIG. 11, it being assumed that the release of relay GT of FIG. 11 has taken place within the 675 milliseconds such that the delay relay DEL of FIG. 11 has not been operated. Also, upon the release in FIG. 8 of relay DS0, the operated select magnets SMA00 and SMB00 of FIG. 5 are released leaving the closed crosspoint of FIG. 32 under the control of the operated and locked hold magnet HMA05 of FIGS. 32 and 40.

At this point in the circuit operation the attendant at position-console No. 1 of FIGS. 41 through 45 is connected over loop circuit No. 6 with the ATT trunk No. 0 of FIG. 23 in precisely the same circuit fashion as was described hereinbefore with respect to an incoming call directed from the ATT trunk of FIG. 23 to an attendant. The difference between the two situations, as it will be apparent now, is principally in the use of different select and hold magnet circuits. In one case, for an incoming call the trunk circuit bids among the trunk preference relays of FIGS. 2, 3, and 4 for control of the circuitry whereupon it completes circuits in FIGS. 5, 6, and 7 for operating the select magnets corresponding to the trunk; and, the position trunk controller of FIGS. 10 and 11 is brought into play to cause the position loop circuits of FIGS. 12, 13, and 14 to in effect select an idle atendant position and an idle loop in that position and to thereupon interconnect this idle loop with the calling trunk over a proper crosspoint of the crosspoint switch structure of FIGS. 28 through 37. On the other hand, with respect to the outward call just described, an attendant at one of the position-consoles of FIGS. 41 through 51 selects an idle loop circuit among the six available at her position: this operation automatically causes the position trunk controller of FIGS. 10 and 11 to select an idle one of the ATT trunk circuits of FIGS. 22 and 23 and to operate select magnets in FIGS. 5, 6, and 7 corresponding to this selected idle trunk; thereafter, a steering action takes place in the position loop circuits of FIGS. 12, 13, and 14 to specifically steer to the particular loop circuit of the particular console which in the first place initiated this outward traffic; and, thereafter, the connecting operation over the proper crosspoint, as has been described above, completes a connection between the attendant and the ATT trunk, whereupon the attendant may seize a marker circuit and dial another PBX station or a trunk circuit extending to whatever desired destination happens to have been the reason for placing this call in the first instance.

In order for the attendant to release from connection with this trunk circuit over this particular loop, the releasing functions are exactly the same as have been described hereinbefore, namely the operation in FIG. 42 of the position release key PA RLS to cause the operation in FIG. 42 of relay RLS1, which in turn initiates a series of operations for completely divorcing the attendant loop circuit from connection with this particular trunk. It will of course be appreciated that while the attendant is connected with the ATT trunk of FIG. 23, she may either release from connection therewith or place it on a hold condition, all as has been described hereinbefore.

*Miscellaneous functions*

There are at least six miscellaneous circuit operations which have not been described in detail hereinbefore, such as (1) an all-trunks-busy condition among the ATT trunk circuits of FIGS. 22 and 23, a timed-release with respect to the timing circuit of the position trunk controller of FIG. 11, either (2) on an incoming or (3) an outgoing call, (4) the operation of the call waiting circuit of FIG. 24, (5) the position-make-busy operation, and (6) the flexible night circuit control operations available to the attendant at position-console No. 1 of FIGS. 41 through 45.

From previous description of outward traffic control, whereby an attendant at one of the position-consoles of FIGS. 41 through 51 attempts to secure access to an idle one of the ATT trunks of FIGS. 22 and 23, it will be recalled that a circuit extends from each ATT trunk, such as the one of FIG. 23, grounding a conductor IT0 through IT7 into the originating preference circuit of FIG. 8 for the purpose of causing the operation of the corresponding relay DS0 through DS7 to indicate which one or ones of the ATT trunks is presently idle. During this outward traffic control operation, upon the operation in the position calling circuit of FIG. 25 of the dial-out relay DO1, and upon the operation in the originating preference circuit of FIG. 9 of relays GTA and GTB, a circuit for causing the operation of the idle ATT trunk indicating relay of FIG. 8 extends from ground in the ATT trunk of FIG. 23, over break contacts 3 of relays CKS0 and CKD0, over a break contact of the marker connector relay MC0, thence to conductor IT0 extending into FIG. 8, thence through break contact 7 of relay TA0, make contact 1 of relay GTA, through the winding of relay DS0 and to negative battery over make contact 3 of relay DO1. As mentioned before, ground will be present on conductor IT0 in FIG. 8 only if the ATT trunk circuit of FIG. 23 is idle. Thus, if none of the eight ATT trunks of FIGS. 22 and 23 is idle, none of the relays DS0 through DS7 of the originating preference circuit of FIG. 8 will be operated. If this situation prevails, then a circuit is completed, upon the operation of relay TKA of FIG. 9 and the release in FIG. 9 of relay GTA, extending from ground in FIG. 8, over make contact 12 of relay DOGT, make contact 3 of relay TKA and break contact 5 of relay GTA, thence over either break contacts 3 and 4 of relay Z in parallel or over make contact 4 of relay Z to one end or the other of the chain of back contacts of relays DS0 through DS7. With all of these relays DS0 through DS7 released, indicating that no ATT trunk is idle, the previously traced ground will extend over all of the break contacts 4 of these relays or over all the break contacts 2 of these relays to conductor BT extending into FIG. 26, thence over make contact 5 of relay DO1, to negative battery through the winding of the busy-tone relay BT1. Relay BT1 thereupon operates and locks to ground over its own make contact 10 under control of make contact 4 of relay END1. Upon the operation of relay BT1 in FIG. 26, with the pick-up relay PUA6, for instance, of FIG. 12 operated, a circuit is completed for supplying the busy tone signal to the attendant's telephone circuit. This circuit extends from the source of 60 i.p.m. busy tone in FIG. 26, through condenser BT, over make contact 4 of relay BT1, make contact 9 of a relay PUA6, to conductor BTA1 extending into position-console circuit No. 1 of FIG. 42, thence through the R1 resistance, through condenser R1, to the ring lead R extending through closed switch S1 to the telephone set of the attendant, thence back through switch S1, over the tip lead T, through condenser T1 and resistance T1 to conductor BTG1 extending back into FIG. 26, and thence to ground over make contact 8 of relay PUA6 and make contact 6 of relay BT1. The attendant, upon hearing the busy tone signal, will know that there are no ATT trunks available for the circuit operation that she has initiated. At the same time, ground extends from conductor BTG1 in FIG. 26, over make contact 2 of relay BT1, and over conductor BTGA into FIG. 53 to cause the operation of the position release relay PRL1, which extinguishes the PA RLS lamp in the position-console of FIG. 44 as an indication that position-console No. 1 is not available at the moment to handle any kind of traffic. It will be noted in FIG. 25 that the operation of relay BT1 opens the operating circuit of the dial-out relay DO1, thereby causing this relay to release to stop all of the circuit operations which might have become started and which have been described in detail hereinbefore to cause the selection of an idle ATT trunk. Presumably, as an incident to being alerted to the busy condition of all of the ATT trunks, the attendant will release the pick-up relay PUA6 of FIG. 12, thereby to release relay BT1 in the position calling circuit of FIG. 26 and to release the position release relay PRL1 of FIG. 53 to again return her position-console to a ready condition whereby she may initiate a call or receive one.

Timed releases take place under circumstances where the gate relay GT in the position trunk controller of FIG. 11 is allowed to remain operated longer than about 675 milliseconds. This situation could occur due to some malfunctioning of a trunk circuit which could cause the trunk preference circuit of FIGS. 2 through 4 to lock out incoming calls. Or the situation could be caused by a malfunctioning of the originating preference circuit of FIGS. 8 and 9, again thus locking out incoming calls. In FIG. 11 is shown a timing circuit comprising transistors Q1 and Q2, relay DEL and the timing capacitor-resistance combination of capacitor DEL and resistance DEL. Upon the operation of relay GT in FIG. 11, negative battery is supplied over its make contact 5 to this timing circuit to initiate the operation thereof. The net effect of the timing operation is that if relay GT remains operated for a period as long as 675 milliseconds, relay DEL will operate. Relay DEL in operating will cause the operation in FIG. 10 of relay DELA in a circuit over make contact 2 of relay DEL. The operation of relay DELA will in turn force the release in FIG. 11 of relay GT, thereby enabling incoming trunk calls to operate the corresponding trunk preference relays TP0 through TP49 of FIGS. 2, 3 and 4. It will be noted in FIG. 10 that the operation of relay DELA also forces the release of the dial-outgoing relay DOGT in the event that this relay is operated as an incident to an attendant having attempted to place an outgoing call. Thus, the forced release of relay GT in FIG. 11 at the end of 675 milliseconds is in effect a timed-release under either an incoming call or an outgoing call situation. The following circuit description of the relay circuit of FIG. 11 assumes that condenser DEL is initially without charge. When negative battery is applied to the circuit over make contact 5 of relay GT, the voltage divider consisting of resistances R1 and R2 and the limiting diodes CR3 and CR4 establish a potential of approximately −33 volts at the emitter of transistor Q1. Since the condenser DEL has no charge, the full applied voltage of −48 volts is impressed on the base of transistor Q1 thereby establishing a reverse bias of approximately 15 volts which causes transistor Q1 to be in a cut-off condition. Transistor Q1 will remain cut-off until condenser DEL has charged sufficiently to allow the base of transistor Q1 to become positive with respect to its emitter. At this time the base is effectively connected to the emitter due to the very low base-to-emitter impedance in the forward bias condition; and a base current, determined by the resistance DEL, causes transistor Q1 to conduct. When transistor Q1 conducts, it causes the base of transistor Q2 to become negative with respect to its emitter, thereby driving transistor Q2 into saturation. The saturation of transistor Q2 allows sufficient current to flow through the winding of relay DEL to cause the operation thereof. Upon removal of voltage from the circuit, such as by the operation of relay GT, relay DEL releases and the timing capacitor DEL discharges through the base-emitter junction of transistor Q1 and through diode CR1 in a time determined primarily by the capacitance of condenser DEL and by the value of resistance R1. The values of the timing capacitor DEL and the timing resistance DEL in the circuit of FIG. 11 are arranged such that the over-all timing interval is approximately 675 milliseconds from the time that the make contact 5 of relay GT closes until such time as relay DEL will become operated.

Figure 47:
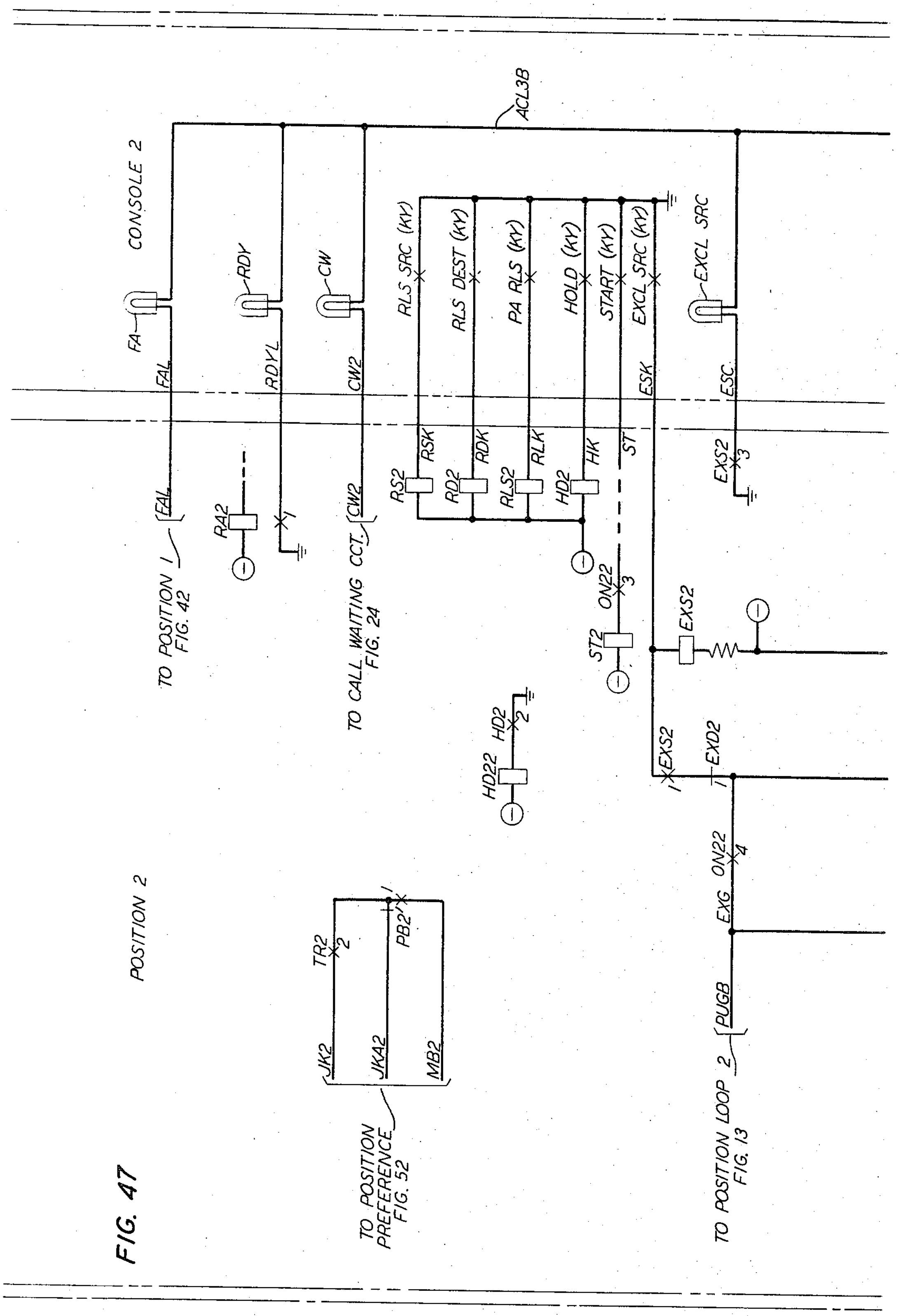
Figure 48:
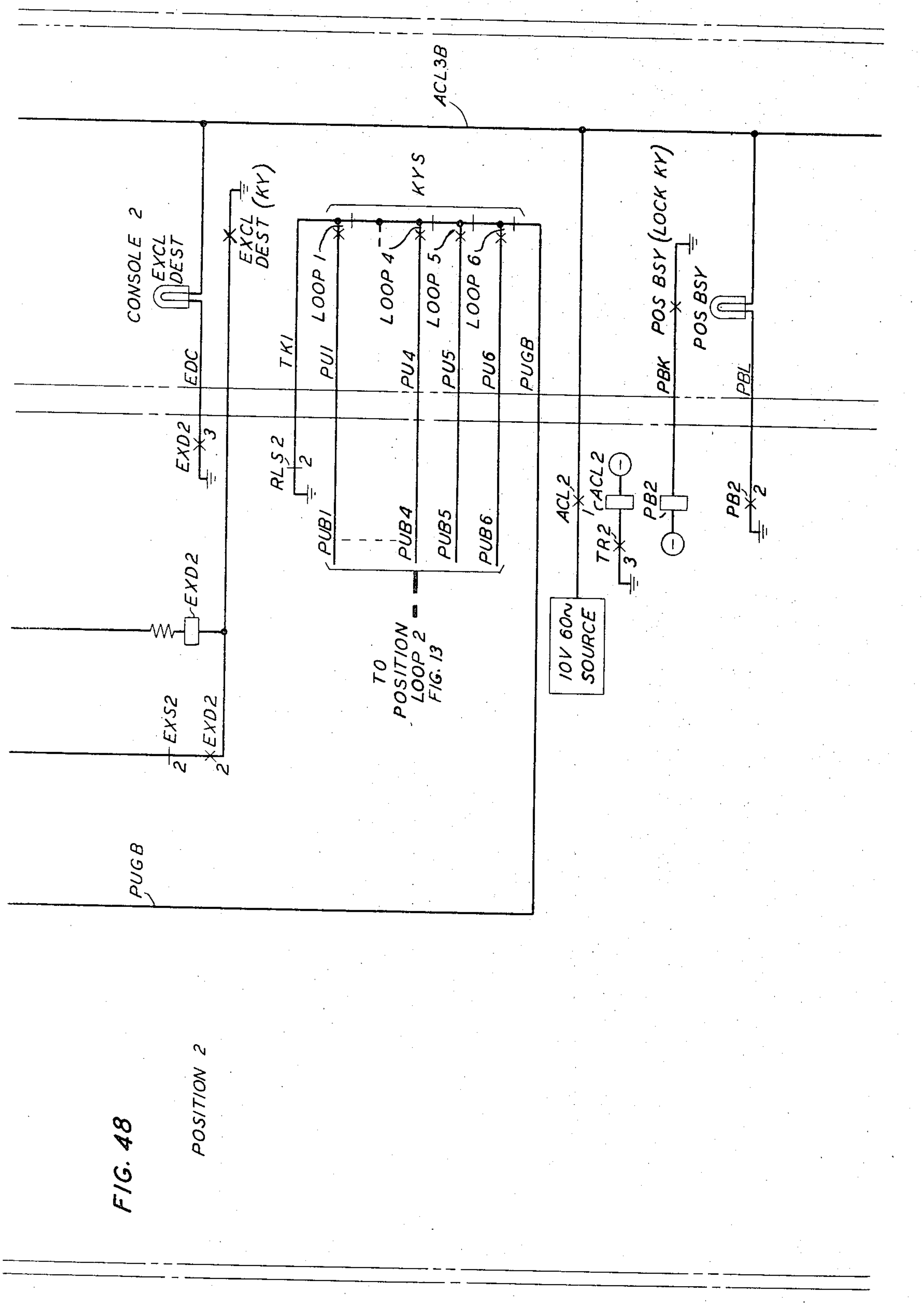
Figure 49:
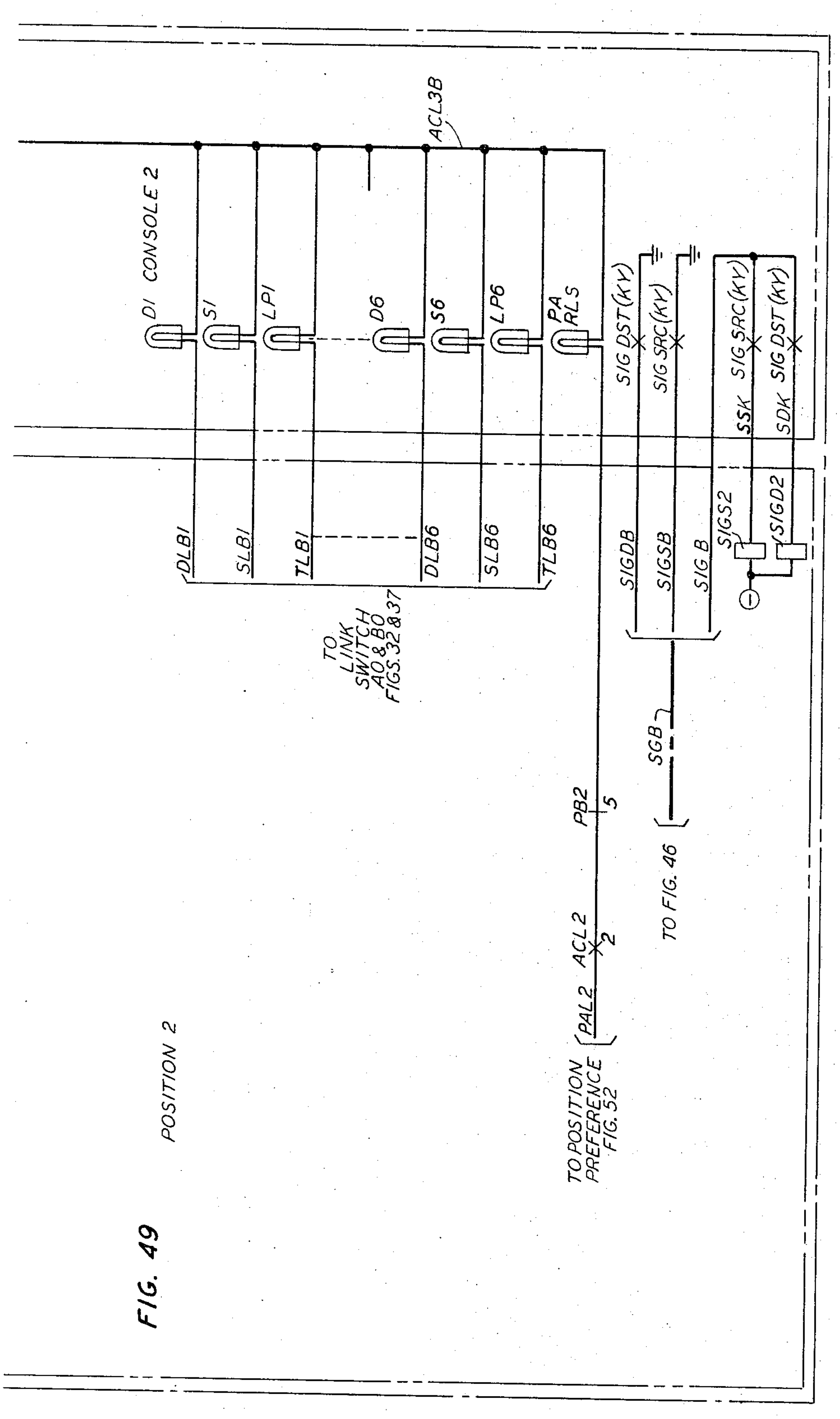

With regard to the call waiting circuitry of FIG. 24, when all of the position-consoles of FIGS. 41 through 51 are busy, as indicated by the released condition of the three position preference relays of FIG. 52, namely, relays PP1, PP2 and PP3, any incoming call condition which is waiting in the trunk preference circuit of FIGS. 2, 3 and 4, as indicated by the operation of relay GT in FIG. 11, will cause the call waiting lamps CW of FIGS. 42 and 47 et cetera to become lighted steadily as an indication to the console attendants that one call is waiting to be served. This circuit extends from ground in FIG. 24, through break contacts 11 or relays PP3, PP2 and PP1, thence over make contact 9 of relay GT and break contact 8 of relay TR to conductors CW1, CW2 and CW3, extending respectively to FIGS. 42, 47 and 50 to cause the steady lighting of the corresponding call waiting lamps CW. With respect to FIGS. 2, 3 and 4, any trunk circuit which has placed an incoming or calling condition on its trunk preference conductor TP0 through TP49 will have applied a −48 volt battery to this trunk preference conductor. This negative potential, such as with respect to trunk preference conductor TP0 in FIG. 2, will extend through resistance CTR0, thence over conductor A through FIGS. 3 and 4 and thence to FIG. 24, to ground through resistance R1 in FIG. 24. The resulting potential applied to the base of transistor T1 in FIG. 24, if only one trunk preference conductor has battery applied thereto, will be approximately −4 volts direct current. The emitter bias on transistor T1 is developed by the circuit consisting of resistance R2 and Zener diode D1 such as to be approximately −6 volts. Under these conditions, the base of transistor T1 is positive with respect to the emitter and transistor T1 is turned off. When more than one incoming call is waiting to be served there will of course be negative battery applied to more than one of the trunk preference conductors TP0 through TP49 of FIGS. 2, 3 and 4. The result of having more than one of the resistances CTR0 through CTR49 of FIGS. 2, 3 and 4 in parallel to the −48 volt supply causes the voltage on the base of transistor T1 to change from −4 volts to approximately −8 volts or more, depending upon how many incoming calls are waiting. The base of transistor T1 thereupon will become negative with respect to its emitter, causing transistor T1 to become turned on, whereupon current flows in the emitter-collector circuit to cause the operation of relay CTR in FIG. 24. The operation of relay CTR in FIG. 24 applies negative battery through its make contact 1 to the time delay circuit shown in the left-hand part of FIG. 24. This timing circuit of FIG. 24 is the same timing circuit as has been previously described in connection with timed-releases with regard to FIG. 11, except that the values in FIG. 24 of the timing capacitor TR and the timing resistance TR are such as to allow the operation of relay TR after this timing circuit has been energized for approximately five seconds. If relay TR of FIG. 24 becomes operated, indicating that more than one incoming call has been waiting in an unanswered condition for at least five seconds, a circuit operation takes place for causing the call waiting lamps CW of FIGS. 42 and 47 et cetera to change from a steady condition to a flashing condition. This circuit extends from ground in FIG. 26, through the 60 i.p.m. interrupter, thence over conductor F1, 2 extending into FIG. 24, thence over make contact 8 of relay TR to the call waiting lamp conductors CW1, CW2 and CW3, thereby to cause the call waiting lamps in the position-consoles to flash at a 60 i.p.m. rate to alert the attendants that more than one call is waiting to be answered. At such time as all of the calls except one may have been answered, transistor T1 of FIG. 24 will turn itself off, thereby releasing relay CTR to in turn immobilize the delay circuit in FIG. 24, to in turn cause the release of relay TR which, upon releasing, reverts the call waiting lamps to a steady lighted condition. When all calls have been answered, relay GT in the position trunk controller of FIG. 11 will become released, thereby extinguishing all of the call waiting lamps. In FIG. 24 a diode D2 is placed in parallel with the winding of relay CTR merely to protect transistor T1 from current surges which may occur under the releasing condition of relay CTR.

Any position-console may be made busy with respect to incoming calls and still leave the attendant with the capability of placing an outgoing call. In order to make-busy a position circuit, the attendant, for instance at position-console No. 1, operates the position busy key POS BSY in FIG. 44. This is a locking key and thereby stays operated until released. The operation of this key completes an obvious circuit in FIG. 44 to operate the position busy relay PB1. Relay PB1, in operating, completes an obvious circuit in FIG. 44 to cause the position busy lamp POS BSY to be lighted as an indication that the position is busy. Relay PB1, in operating, also causes the extinguishment of the PA RLS lamp in FIG. 44 and in FIG. 42 extends the operating circuit for the position preference relay PP1 of FIG. 52 over lead MB1 in FIG. 42 instead of lead JKA1. It will be seen in FIG. 52, that the conductor MB1 extending thereto from FIG. 42 is under the control of make contact 9 of the dial-out relay DO1, thereby placing the operation of the position preference relay PP1 of FIG. 52 under control of outgoing traffic from that particular position-console. And it will be noted in FIG. 52 that since conductor JKA1 extending thereto from FIG. 42 is no longer included in the operating circuit for relay PP1, it is necessary in order for this particular position preference relay PP1 to be operated that not only must the position release relay PRL1 of FIG. 53 be released but also the attendant must operate the dial-out relay DO1 of FIG. 25. With relay PP1 of FIG. 52 in a released condition, it will also be apparent with reference to the position loop circuitry of FIG. 12 that no incoming calls can be directed to any of the six loop circuits associated with that particular position-console No. 1 of FIGS. 41 through 45. Also in FIG. 45, it will be noted that the operation of relay PB1 partially completes over its make contact 4 a circuit whereby the night relay N1 of FIG. 45 may be operated in the event that the attendant desires to set up a night connection, the details of which will be described immediately below. Of course it will be understood that at such time as the attendant releases the operated POS BSY key of FIG. 44 the foregoing circuit operations will revert to their normal circumstances.

Night connections can be set up only by the attendant at position-console No. 1 of FIGS. 41 through 45. The flexible night connection feature permits the attendant to secure access to a specific originating register (not shown) in the PBX and for dialing into the register the number of a particular trunk which the attendant chooses to use for setting up the night connection. The register then causes that particular trunk circuit to be connected to loop No. 1 of position-console No. 1 where the trunk circuit may be fully connected to the position by the operation of the No. 1 loop pick-up key of FIGS. 41 and 43. With the attendant connected to such a trunk circuit, she may thereupon secure access to an idle originating register and dial into it the number of a particular PBX station to which the trunk is to be connected for night operation. When the PBX station is connected to the trunk, the attendant may release from connection with the trunk, leaving the trunk and the PBX station connected to each other for night operation, which does not require the assistance of an attendant for completing inward or outward calls.

In order for the attendant at position-console No. 1 to initiate the night connection operations, it is necessary for her to make the position busy, as has been described in detail above, by operating in FIG. 44 the POS BSY key which in turn releases the position preference relay PP1 of FIG. 52 to in turn prevent the position loop circuit of FIG. 12 from allowing any incoming calls to enter the position-console No. 1. It will be recalled, however, with respect to the position preference relay PP1 of FIG. 52, that the attendant may nevertheless place outward calls by causing the operation in the position calling circuit of FIG. 25 of the dial-out relay DO1. However, in the present circumstances, it will be assumed that the attendant does not initiate any dial-out operation but instead initiates a night connection function.

Upon the operation in FIG. 44 of the POS BSY key, relay PB1 in FIG. 44 is operated, which in turn extinguishes the PA RLS lamp and lights the POS BSY lamp of FIG. 44. In addition, the operation of relay PB1 partially completes over its make contact 4 in FIG. 45 a circuit for enabling the operation of relay N1 in FIG. 45. It will be noted that the POS BSY key of FIG. 44 is a locking key which will remain locked in the operated position until released by the attendant. At this point the attendant will operate the locking NITE key of FIG. 45 to initiate the night connection operations. When the NITE key is operated, a circuit is completed in FIG. 45 for lighting the NITE lamp over make contact 1 of the NITE key. Also, a circuit is completed for operating relay N1 in FIG. 45 extending from ground, over make contact 1 of the NITE key, make contact 2 of the NITE key, conductor NK2, make contact 4 of relay PB1, to battery through the winding of relay N1. Thereafter, the attendant will operate the START key of FIG. 45 which completes a circuit for operating relay NS1 of FIG. 45 extending from ground in FIG. 45, over the make contact of the START key, conductor ST, make contact 3 of relay N1, break contact 2 of relay ON1, through the winding of relay NS1, over break contact 1 of relay RD1, thence over conductor NG into Originating Register No. 0 and to battery over break contact 2 of relay NC and through resistance NC in the Originating Register circuit. Relay NS1, in operating, completes a locking circuit over its own make contact 2 to the night locking ground on conductor NK2 and initiates a bid for the services of the No. 0 Originating Register circuit by causing the operation in Originating Register No. 0 of relay NC under control of make contact 1 of relay NS1. When the No. 0 Originating Register has been seized, relay NA1 in FIG. 45 is operated in a circuit extending from battery in the No. 0 Register, over make contact 1 of relay NC, break contact 4 of relay ON11, through the winding of relay NA1, conductor N1 into FIG. 44, thence over make contact 2 of relay N1, conductor PAL1 extending into the position preference circuit of FIG. 52 and therein to ground over break contact 8 of relay PRL1. At approximately this time during the seizure of the No. 0 Originating Register, relay NS1 of FIG. 45 will be released; but, relay NC in Originating Register No. 0 will be locked up internally in the register until the register releases. In FIG. 42 the operation of relay NA1 transfers the tip and ring conductors T and R from the operator's telephone set console directly into Originating Register No. 0 over make contacts 2 and 1 of relay NA1 to provide a dialing path between the attendant telephone circuit and the No. 0 Originating Register circuit. Dial tone is returned from the No. 0 Register to the attendant to inform the latter that she may dial the trunk number to which she is requesting attachment for night connection purposes. Relay NA1 of FIG. 45, in operating, also causes the lighting of the RDY lamp in FIG. 42 in an obvious circuit over make contact 1 of relay NA1, the lighting of the RDY lamp being a visual indication to the attendant that Originating Register No. 0 has been attached and is ready for service. When the attendant has dialed the desired trunk number into the No. 0 Originating Register, such as a two-digit number identifying the central office trunk of FIG. 21, the No. 0 Originating Register will cause the release in FIG. 45 of relay NA1, thereby returning the attendant's telephone dialing and talking path of FIG. 42 to its original condition.

The No. 0 Originating Register will initiate operations for causing the central office trunk of FIG. 21 to seize the No. 1 loop in the attendant's position-console. In FIG. 21, when the No. 0 Originating Register has received the trunk number, assuming it to be a number which is individual to the central office trunk No. 8 of FIG. 21, battery will be applied in FIG. 21 over conductor TRK8 to the right-hand side of the lower winding of relay N8 of FIG. 21. Relay N8 will operate over its lower winding and, in operating, it connects ground over its make contact 1 in FIG. 21 to the trunk preference conductor TP8 extending into FIG. 31 and thence over break contact 5 of relay TA8 to conductor TP8 extending into the trunk preference circuit of FIG. 2 where at the moment it accomplishes no function. During the trunk seizure by the No. 0 Originating Register, relay operations take place within the trunk circuit including the operation of relay SR8 (not shown) which in turn causes the operation of relay R18 in a circuit extending from ground in FIG. 21, over make contact 2 of relay SR8, through break contact 2 of relay S18, thence over make contact 6 of relay N8, to battery through the winding of relay R18. The operation in FIG. 21 of relay R18 causes negative battery to be applied to conductor FNC8 into FIG. 31 under control of make contact 2 of relay R18 and make contact 2 of relay N8 in FIG. 21, thence over conductor FNC8 into FIG. 31, through the winding of relay NS8, to ground over break contact 4 of relay TA8. Relay NS8 in FIG. 31 operates in the latter-described circuit. It will be noted in FIGS. 30 and 31 that all of the central office trunk circuits Nos. 8 through 18 are equipped with equivalent relays NS8 through NS18 which are in turn connected by respective conductors FNC8 through FNC18 to the corresponding trunk circuits; and, it will be noted that all of the tie trunks of FIGS. 29 and 30 and all of the DID trunks of FIGS. 28 and 29, while being equipped with relays NS19 through NS49, do not have these relays connected by corresponding FNC-conductors with their trunk circuits. Therefore, the only trunk circuits of the present disclosure which are shown with sufficient circuitry to enable them to be used for night circuit operations are the central office trunks of FIGS. 30 and 31.

Upon the operation in FIG. 31 of relay NS8, relay NSC of FIG. 11 is operated in an obvious circuit over make contact 4 of relay NS8, thereby to cause the operation in the position trunk controller of FIG. 11 of the gating relay GT, the operation of which will prevent any incoming trunk circuit calls from securing control of the trunk preference circuitry of FIGS. 2, 3 and 4. The operation in FIG. 11 of the relay NSC also prevents the operation in FIG. 10 of the call start relay CST and of the dial-outgoing relay DOGT to immobilize the traffic regulating portion of the position trunk controller circuit in preference to the night operation. The operation of relay NSC also completes a circuit in FIG. 12 for forcing the operation of relay PSAA1 over make contacts 2 and 4 of relay NSC, thereby to designate the first loop in position-console No. 1 as the loop circuit to which this selected trunk is to be connected for night connection operation.

In the meantime, in the select magnet control circuitry of FIGS. 5, 6 and 7, with relays DOGT and CST of FIG. 10 released, and with relay NS8 of FIG. 31 operated, a circuit is completed for causing the operation of select magnet SMA08 of FIGS. 6 and 31, corresponding to the horizontal position of central office trunk No. 8 (of FIG. 21) in the switch A0 of FIGS. 31 and 36, which switch in turn contains the No. 1 loop circuit for position-console No. 1. This circuit extends from ground in FIG. 7, over break contact 7 of relay CST, break contact 6 of relay DOGT, conductor NSCA into FIG. 6, thence over make contact 2 of relay NS8, through the winding of select magnet SMA08, make contact 1 of relay NS8, conductor NSCB into FIG. 7, and thence to negative battery over break contact 3 of relay DOGT and break contact 6 of relay CST. Upon the operation of select magnet SMA08 of FIGS. 6 and 31, a circuit is completed in the hold magnet control circuitry of FIG. 40 for causing the operation of hold magnet HMA00 of FIGS. 40 and 32 corresponding with the No. 1 loop circuit of position-console No. 1. This circuit extends from ground in FIG. 40, over make contact 1 of select magnet SMA08, thence through make contact 1 of relay PSAA1, thence to negative battery through the winding of hold magnet HMA00. The operation of hold magnet HMA00 of FIGS. 40 and 32 completes the crosspoint connection in FIG. 31 between the central office trunk No. 8 of FIG. 21 and the No. 1 loop circuit associated with position-console No. 1 of FIGS. 41 through 45.

When the crosspoint closes in FIG. 31, the lamp lead SL8 extending from the trunk circuit of FIG. 21 to the lamp circuit of FIG. 44 causes the source lamp S1 of FIG. 44 to flash at a 60 i.p.m. rate as an indication that the trunk has been connected as a calling trunk. When the crosspoint closes, a circuit is completed for causing the operation in FIG. 31 of relay TA8, this circuit extending from battery in FIG. 21, over make contact 3 of relay R18, break contact 2 of relay HD8, the hold magnet lead HM8 extending into FIG. 31, thence through the winding of relay TA8, over the No. 4 crosspoint connection in FIG. 31, thence to conductor A00 extending into FIG. 40, and over make contact 1 of hold magnet HMA00 to the operating ground for the hold magnet. Relay TA8, in operating, supplies ground over its own make contact 4 to hold itself operated and extends this ground back over the No. 4 crosspoint contact to provide a locking circuit for hold magnet HMA00 of FIGS. 40 and 32. At this time a checking circuit extends from ground in FIG. 21, over make contact 1 of relay N8, the trunk preference conductor TP8 into FIG. 31, over make contact 5 of relay TA8, thence over conductor AUD8 to the No. 0 crosspoint contact, through this crosspoint contact to conductor AUD1 extending into FIG. 32 and thence into FIG. 45, and therein over make contact 4 of relay N1, to conductor NX extending back into the trunk circuit of FIG. 21, thence over make contact 4 of relay N8, break contact 2 of relay N18, through diode N8 and over conductor TRK8 to the No. 0 Originating Register circuit, to cause this register to release. This same ground is applied to the right-hand side of the upper winding of relay N8 in FIG. 21, thereby to hold operated relay N8 over its upper winding. The operation of relay TA8 also causes the release in FIG. 31 of relay NS8, which in turn releases relay NSC of FIG. 11 to in turn release the gate relay GT of FIG. 11 and revert the position trunk controller circuit of FIGS. 10 and 11 to its normal operating condition.

The attendant at position-console No. 1 may now connect the trunk to the position by operating the No. 1 loop key adjacent to the flashing source lamp S1 of FIG. 44, just as in the case of answering any other incoming call condition on a trunk circuit, as has been described in detail hereinbefore. Upon the operation of the No. 1 loop key of FIGS. 41 and 43 the connector relays in the trunk circuit of FIG. 21, namely, relays ACA18, AC8 and AC18 are operated in the same manner in which they would be if a call had been answered by the attendant at the No. 1 loop on a regular incoming call basis. Relay ON1 of FIG. 41 will be operated as usual and at its make contact 2 in FIG. 45 (with relay N1 operated) transfers the start circuit from the START key back to its normal situation whereby it will cause the operation in FIG. 45 of relay ST1 instead of causing the operation of relay NS1 as in the present instance.

With the attendant connected to the trunk circuit in a normal manner, the attendant may now operate the START key, thereby causing the operation in FIG. 45 of relay ST1 to call in an idle originating register circuit. The attendant may dial the digits of the called PBX station into the register and thereby cause the register to connect the called PBX station to the destination end of the trunk circuit. When the station is connected to this trunk circuit, the destination lamp D1 of FIG. 44 will be lighted to indicate that the station has been connected. In the trunk circuit of FIG. 21 relay RS8 (not shown) is operated temporarily upon the ringing of the called party. Upon the operation of relay RS8, relay N18 of FIG. 21 is operated in a circuit extending from ground in FIG. 21, over make contact 2 of relay RS8, make contact 5 of relay N8, and to negative battery through the winding of relay NA18, which locks to ground over its own make contact 1 and make contact 2 of the connector relay AC18. And, when connector relay AC18 of FIG. 21 subsequently releases, upon the release of the attendant from this connection, relay N18 of FIG. 21 will become locked in a circuit extending from the left-hand side of its winding, through make contact 1 of relay N18, over break contact 2 of relay AC18, conductor NLK extending into FIG. 45, thence over make contact 2 of relay TR1 and over make contacts 3 and 1 of the NITE key to ground. Relay N8 of FIG. 21 holds operated to ground under control of operated relay S18. The station ringer of the called PBX station will not ring under these circumstances.

When the position release key PA RLS of FIG. 42 is operated to release the position circuit, as has been described in detail hereinbefore, ground is removed by the release of relay AC8 of FIG. 21 from the hold magnet conductor HM8 extending into FIG. 31 to the winding of relay TA8, thereby causing relay TA8 to become released to initiate a series of operations for completely releasing all of the interconnections between this trunk circuit and the attendant. The trunk circuit and the connected PBX station will now be locked together in a connection under control of the NITE key of FIG. 45 which is locked in the operated position. When relay ON1 of FIG. 41 releases during the release operation of the position circuit, again in FIG. 45 circuits are completed for making another night connection possible by enabling the START key of FIG. 45 to call in the No. 0 Originating Register circuit. By this means the attendant may secure access to a second one of the central office trunks of FIGS. 19, 20 and 21 in order to set up a second night connection if it is desired.

When the attendant has completed all of the desired night connections, she can unplug her telephone set from the console, as symbolized in FIG. 42 by the opening of switch S1, and by leaving the POS BSY key of FIG. 44 and the NITE key of FIG. 45 locked in the operated position. When switch S1 of FIG. 42 is opened, relay TR1 of FIG. 42 is allowed to become released, thereby returning the position-console No. 1 of FIGS. 41 through 45 to a completely unattached status, with all lamps extinguished and all relays released, the break contact 2 in FIG. 45 of relay TR1 holding ground on the night locking conductor NLK extending into the trunk circuit of FIG. 21 and thence to all of the central office trunk circuits of FIGS. 19 through 21 to act as a locking ground for all of the night connections.

In order to remove night connections when the operator is plugged into the console (relay TR1 of FIG. 42 operated), the attendant must release the NITE key and the POS BSY key to unlock all of the trunks then involved with night connections to PBX stations. Of course the trunk circuits will be arranged not to completely release until any off-hook station conditions have been removed. The release of the NITE and POS BSY keys of FIGS. 45 and 44, followed by the eventual release of any trunk circuits presently being held off-normal by an off-hook station, will return the position-console of FIGS. 41 through 45 to a ready condition for handling regular traffic.

In order to remove existing night connections when the attendant is unplugged from the console (relay TR1 of FIG. 42 released) it is necessary for the attendant to plug her telephone circuit back into the console, thereby to cause reoperation of relay TR1 of FIG. 42, followed by the release of the NITE and POS BSY keys.

In the description of the flexible night operations associated with position-console No. 1 of FIGS. 41 through 45, it will be appreciated that a considerable number of details have been left out concerning specific operations of the originating register circuits, the marker circuit, the trunk circuits, and other circuits which are not of immediate concern to the instant disclosure of the link circuits for establishing and controlling connections between the trunks and the attendant position. These details are considered unnecessary to an understanding of the present invention.

It is to be understood that the above-described arrangements are illustrative of the application of the principles of the invention. Numerous other arrangements may be devised by those skilled in the art without departing from the spirit and the scope of the invention.

What is claimed is:

1. A two-way switching arrangement comprising:
a plurality of trunks;
a plurality of operator positions;
a separate group of operator lines per position;
means individual to each line whereby an operator may connect the corresponding position to the corresponding line;
a single switching stage terminating said trunks and said lines and selectively operable to interconnect a designated trunk with a designated line;
stage control means controlled by a calling trunk to operate said stage to interconnect said calling trunk with an idle available line as a called line
and by connection of a position to an idle available line as a calling line to operate said stage to interconnect said calling line with an idle available trunk;
and, regulating means for permitting said control means to be controlled by only one at a time of said trunks and lines.

2. A two-way switching arrangement comprising:
a plurality of trunks;
a plurality of operator positions;
a separate group of operator lines per position;
means individual to each line whereby an operator may connect the corresponding position to the corresponding line;
a single switching stage terminating said trunks and said lines and selectively operable to interconnect a designated trunk with a designated line;
stage control means
controlled by a calling trunk to operate said stage to interconnect said calling trunk with an idle available line
and to identify to the corresponding operator the said interconnected line as a called line,
and controlled by connection of a position to an idle available line as a calling line to operate said stage to interconnect said calling line with an idle available trunk;
and, regulating means for permitting said control means to be controlled by only one at a time of said trunks and lines.

3. A two-way switching arrangement comprising:
a plurality of trunks;
a plurality of operator positions;
a separate group of operator lines per position;
means individual to each line whereby an operator may connect the corresponding position to the corresponding line;
a single switching stage terminating said trunks and said lines and selectively operable to interconnect a designated trunk with a designated line;
terminating stage control means controlled by a calling trunk
to operate said stage to interconnect said calling trunk with an idle available line and to identify to the corresponding operator the said interconnected line as a called line;
originating stage control means controlled by connection of a position to an idle available line as a calling line to operate said stage to interconnect said calling line with an idle available trunk;
said terminating control means and said originating control means including means common thereto;
and, regulating means for establishing a preference between said originating control means and said terminating control means as to use of said common means.

4. A two-way switching arrangement comprising:
a plurality of trunks;
a plurality of operator positions;
a separate group of operator lines per position;
means individual to each line
whereby an operator may connect the corresponding position to the corresponding line to answer an incoming call when said line is identified as a call line,
and whereby an operator may connect the corresponding position to the corresponding line to initiate an outgoing call when said line is idle and available as a calling line;
a single switching stage terminating said trunks and said lines and selectively operable to interconnect a designated trunk with a designated line;

stage control means
controlled by a calling trunk to operate said stage to interconnect said calling trunk with an idle available line and to identify to the corresponding operator the said interconnected line as a called line,
and controlled by connection of a position to an idle available line as a calling line to operate said stage to interconnect said calling line with an idle available trunk;
and, regulating means for establishing a preference between calling lines and calling trunks as to control of said stage control means.

5. The invention defined in claim 4
wherein said stage control means comprises
a position-trunk controller for operating said stage to interconnect a calling trunk with an idle called line and to interconnect a calling line with an idle trunk,
terminating control means for allowing a calling trunk to control said position-trunk controller,
and originating control means for allowing a calling line to control said position-trunk controller;
and, wherein said regulating means is controlled by said originating control means to allow calling lines to have preference over calling trunks as to control of said position-trunk controller.

6. A two-way switching arrangement comprising:
a plurality of trunks;
a plurality of operator positions;
a separate group of operator lines per position;
means individual to each line whereby an operator may connect the corresponding position to the corresponding line;
a single switching stage terminating said trunks and said lines and selectively operable to interconnect a designated trunk with a designated line; terminating stage control means controlled by a calling trunk
to designate said calling trunk for interconnection with an idle available line, to designate an idle available line for interconnection with said calling trunk, to operate said stage according to said designation,
and to identify to the corresponding operator the said interconnected line as a called line;
originating stage control means controlled by connection of a position to an idle available line as a calling line
to designate said calling line for interconnection with an idle available trunk, to designate an idle available trunk for interconnection with said calling line, and to operate said stage according to said designations;
said terminating control means and said originating control means including means common thereto;
and, regulating means for establishing a preference between said originating control means and said terminating control means as to use of said common means.

7. The invention defined in claim 6
wherein said terminating control means comprises
a trunk preference circuit for allowing only one calling trunk at a time to be designated for interconnection with an idle available line
and a position preference circuit for allowing only one idle available line at a time to be designated for interconnection with said calling trunk;
wherein said originating control means comprises
a position calling circuit for allowing only one calling line at a time to be designated for interconnection with an idle available trunk
and a position originating circuit for allowing only one idle available trunk at a time to be designated for interconnection with said calling line;
wherein said common means comprises a position-trunk controller circuit
controlled by said trunk preference circuit and by said position preference circuit to designate a calling trunk and an idle line for interconnection and to operate said stage according to said designations and controlled by said position calling circuit and by said position originating circuit to designate an idle trunk and a calling line for interconnection and to operate said stage according to said designations;
and, wherein said regulating means is controlled by said position calling circuit to allow said originating control means to have preference over said terminating control means as to control of said position-trunk controller circuit.

8. The invention defined in claim 6
wherein said terminating control means comprises
a trunk preference circuit for allowing only one calling trunk at a time to be designated for interconnection with an idle available line,
a position preference circuit for allowing only one idle available line at a time to be designated for interconnection with said calling trunk
and a position-trunk controller circuit controlled by said trunk preference circuit and by said position preference circuit to designate a calling trunk and an idle line for interconnection and to operate said stage according to said designations;
wherein said originating control means comprises
a position calling circuit for allowing only one calling line at a time to be designated for interconnection with an idle available trunk,
a position originating circuit for allowing only one idle available trunk at a time to be designated for interconnection with said calling line
and the said same position-trunk controller circuit controlled by said position calling circuit and by said position originating circuit to designate an idle trunk and a calling line for interconnection and to operate said stage according to said designations;
and, wherein said regulating means is controlled by said position calling circuit to allow said position calling circuit and said position originating circuit to have preference over said trunk preference circuit and said position preference circuit as to control of said position-trunk controller circuit.

9. A switching link comprising:
a plurality of primary lines;
a plurality of secondary lines;
switching apparatus
terminating said primary and secondary lines and selectively controllable to interconnect a designated pair of lines consisting of a primary line and a secondary line;
apparatus control means
settable to designate a said pair of lines for interconnection,
and effective when so set to selectively control said apparatus accordingly;
a first gate circuit controlled by calling primary lines and effective when enabled to set said control means according to a calling primary line;
a second gate circuit controlled by calling secondary lines and effective when enabled to set said control means according to a calling secondary line;
a first selecting circuit effective when enabled to select an idle primary line and to set said control means according to said selected primary line;
a second selecting circuit effective when enabled to select an idle secondary line and to set said control means according to said selected secondary line;

and, traffic regulating means controlled alternatively by a calling primary line and by a calling secondary line
for enabling only said first gate circuit and said second selecting circuit under control of a calling primary line and for enabling only said second gate circuit and said first selecting circuit under control of a calling secondary line.

10. The invention defined in claim 9
wherein said first gate circuit comprises a first preference-lockout circuit for permitting only one calling primary line at a time to control said first gate circuit;
wherein said second gate circuit comprises a second preference-lockout circuit for permitting only one calling secondary line at a time to control said second gate circuit;
and, wherein said regulating means comprises a regulating preference-lockout circuit for permitting only one calling line at a time to control said regulating means.

11. A coordinate switch link comprising:
a plurality of primary lines;
a plurality of secondary lines;
a coordinate switch having at least two sets of coordinate conductor groups arranged to define coordinate crosspoints,
said primary lines terminating on a first said set of coordinate conductor groups,
said secondary lines terminating on a second said set of coordinate conductor groups,
and said switch selectively controllable to interconnect at a designated crosspoint a designated pair of lines consisting of a primary line and a secondary line;
settable switch control means effective when set to selectively control said switch accordingly and comprising
first means settable to designate for interconnection one of said first conductor groups
and second means settable to designate for interconnection one of said second conductor groups;
a first gate circuit controlled by calling primary lines and effective when enabled to set said first means according to a calling primary line;
a second gate circuit controlled by calling secondary lines and effective when enabled to set said second means according to a calling secondary line;
a first selecting circuit effecive when enabled to select an idle primary line and to set said first means according to said selected primary line;
a second selecting circuit effective when enabled to select an idle secondary line and to set said second means according to said selected secondary line;
and, traffic regulating means controlled alternatively by a calling primary line and by a calling secondary line
for enabling only said first gate circuit and said second selecting circuit under control of a calling primary line
and for enabling only said second gate circuit and said first selecting circuit under control of a calling secondary line.

12. The invention defined in claim 11
wherein said first gate circuit comprises a first preference-lockout circuit for permitting only one calling primary line at a time to control said first gate circuit;
wherein said second gate circuit comprises a second preference-lockout circuit for permitting only one calling secondary line at a time to control said second gate circuit;
and, wherein said regulating means comprises a regulating preference-lockout circuit for permitting only one calling line at a time to control said regulating means.

13. A crossbar switch link comprising:
a plurality of primary lines;
a plurality of secondary lines;
a crossbar switch array having horizontal and vertical conductor groups arranged to define coordinate crosspoints,
said primary lines terminating on said horizontal conductor groups,
said secondary lines terminating on said vertical conductor groups
and said array selectively controllable to interconnect at a designated crosspoint a first and a second conductor group corresponding to a designated pair of lines consisting of a primary line and a secondary line;
operable array control means effective when operated to selectively control said array accordingly and comprising
a select magnet for each horizontal conductor group and operable to designate for interconnection the corresponding horizontal conductor group
and a hold magnet for each vertical conductor group and operable to designate for interconnection the corresponding vertical conductor group;
a first gate circuit controlled by calling primary lines and effective when enabled to operate one select magnet at a time correspoding to a calling primary line;
a second gate circuit controlled by calling secondary lines and effective when enabled to operate one hold magnet at a time corresponding to a calling secondary line;
a first selecting circuit effective when enabled to select an idle primary line and to operate one select magnet at a time corresponding to said selected primary line;
a second selecting circuit effective when enabled to select an idle secondary line and to operate one hold magnet at a time corresponding to said selected secondary line;
and, traffic regulating means controlled alternatively by a calling primary line and by a calling secondary line
for enabling only said first gate circuit and said second selecting circuit under control of a calling primary line and for enabling only said second gate circuit and said first selecting circuit under control of a calling secondary line.

14. The invention defined in claim 13
wherein said first gate circuit comprises a first preference-lockout circuit for permitting only one calling primary line at a time to control said first gate circuit;
wherein said second gate circuit comprises a second preference-lockout circuit for permitting only one calling secondary line at a time to control said second gate circuit;
and, wherein said regulating means comprises a regulating preference-lockout circuit for permitting only one calling line at a time to control said regulating means.

15. A crossbar switch link comprising:
a crossbar switch having
horizontal and vertical conductor groups arranged to define coordinate crosspoints,
a select magnet for each horizontal conductor group and energizable to prepare for operation a corresponding horizontal row of crosspoints,
and a hold magnet for each vertical conductor group and energizable to complete the operation of and to hold operated that crosspoint corresponding to the energized select and hold magnets;

trunk circuits terminating on said horizontal conductor groups;

line circuits terminating on said vertical conductor groups;

a select magnet control circuit controlled by calling trunks and effective when enabled to operate one select magnet at a time corresponding to a calling trunk;

a select magnet selecting circuit controlled by calling lines and effective when enabled to select an idle trunk and to operate one select magnet at a time corresponding to said selected trunk;

a hold magnet control circuit controlled by calling lines and effective when enabled to operate one hold magnet at a time corresponding to a calling line;

a hold magnet selecting circuit controlled by calling trunks and effective when enabled to select an idle line and to operate one hold magnet at a time corresponding to said selected line;

traffic regulating means controlled alternatively by a calling trunk and by a calling line for enabling only said select magnet control circuit and said hold magnet selecting circuit under control of a calling trunk and for enabling only said select magnet selecting circuit and said hold magnet control circuit under control of a calling line;

circuit means controlled by said select magnets for permitting said hold magnet control circuit and said hold magnet selecting circuit to be enabled only upon the operation of a select magnet;

and, circuit means controlled by said hold magnets for releasing any operated select magnet upon the operation of any hold magnet.

16. The invention defined in claim 15 wherein said select magnet control circuit comprises a trunk preference-lockout circuit for permitting only one calling trunk at a time to control said select magnet control circuit;

wherein said hold magnet control circuit comprises a line preference-lockout circuit for permitting only one calling line at a time to control said hold magnet control circuit;

wherein said select magnet selecting circuit comprises a trunk selecting circuit for selecting the first idle trunk in a prescribed order among said trunks and for operating the select magnet corresponding to said selected idle trunk;

and, wherein said hold magnet selecting circuit comprises a line selecting circuit for selecting an idle line and for operating the hold magnet corresponding to said selected line.

17. An operator-to-trunk crossbar switch link comprising:

a crossbar switch having select magnets corresponding to horizontal conductor groups and hold magnets corresponding to vertical conductor groups;

trunk circuits terminating on said horizontal conductor groups;

operator lines terminating on said vertical conductor groups, said lines arranged in a plurality of groups of lines;

a separate operator position associated with each separate group of lines, each position having manually operable means for connecting said position with any one at a time of the associated lines as a called line or as a calling line;

a select magnet control circuit controlled by calling trunks and effective when enabled to operate one select magnet at a time corresponding to a calling trunk;

a select magnet selecting circuit controlled by calling lines and effective when enabled to select an idle trunk and to operate one select magnet at a time corresponding to said selected trunk;

a hold magnet control circuit controlled by calling lines and effective when enabled to operate one hold magnet at a time corresponding to a calling line;

a hold magnet selecting circuit controlled by calling trunks and effective when enabled to select an idle called line and to operate one hold magnet at a time corresponding to said selected called line;

traffic regulating means controlled alternatively by a calling trunk and by a calling line for enabling only said select magnet control circuit and said hold magnet selecting circuit under control of a calling trunk and for enabling only said select magnet selecting circuit and said hold magnet control circuit under control of a calling line;

whereby one calling trunk at a time is connectable to an idle operator line and one calling operator line at a time is connectable to an idle trunk;

and, whereby an operator position is connectable to one operator line at a time either as a called line or as a calling line.

18. The invention defined in claim 17 wherein said select magnet control circuit comprises a trunk preference-lockout circuit for permitting only one calling trunk at a time to operate its corresponding select magnet;

wherein said hold magnet selecting circuit comprises a trunk selecting circuit for selecting the first idle trunk in a prescribed order among said trunks and for operating the select magnet corresponding to said selected idle trunk;

wherein said hold magnet selecting circuit comprises a position selecting circuit for selecting the first idle operator position in a prescribed order among said positions and a line selecting circuit for selecting the first idle line in a prescribed order among the lines associated with said selected position and for operating the hold magnet corresponding to said selected line;

and, wherein said hold magnet control circuit comprises a line preference-lockout circuit for permitting only one calling line at a time to operate its corresponding hold magnet.

19. The invention defined in claim 18 wherein said trunk preference-lockout circuit includes means operable to indicate that at least one trunk is in a calling condition;

wherein said line preference-lockout circuit includes means operable to indicate that at least one position is connected to a line in a calling condition;

and, wherein said traffic regulating means includes lockout means controlled jointly by said trunk preference-lockout circuit and by said line preference-lockout circuit for permitting control of said regulating means by only one calling trunk or one calling line at a time.

No references cited.

WILLIAM C. COOPER, *Primary Examiner.*